United States Patent
Ding et al.

(10) Patent No.: US 10,288,746 B2
(45) Date of Patent: May 14, 2019

(54) ERROR ESTIMATION METHOD, MOTION ANALYSIS METHOD, ERROR ESTIMATION APPARATUS, AND PROGRAM

(71) Applicant: Seiko Epson Corporation, Shinjuku-ku (JP)

(72) Inventors: Yimei Ding, Shiojiri (JP); Daisuke Sugiya, Chino (JP)

(73) Assignee: Seiko Epson Corporation, Tokyo (JP)

( * ) Notice: Subject to any disclaimer, the term of this patent is extended or adjusted under 35 U.S.C. 154(b) by 266 days.

(21) Appl. No.: 15/128,954

(22) PCT Filed: Mar. 12, 2015

(86) PCT No.: PCT/JP2015/001388
§ 371 (c)(1),
(2) Date: Sep. 23, 2016

(87) PCT Pub. No.: WO2015/146048
PCT Pub. Date: Jan. 10, 2015

(65) Prior Publication Data
US 2018/0172842 A1 Jun. 21, 2018

(30) Foreign Application Priority Data

Mar. 25, 2014 (JP) .................. 2014-061549
Mar. 28, 2014 (JP) .................. 2014-068226
Mar. 28, 2014 (JP) .................. 2014-068249

(51) Int. Cl.
*G01S 19/49* (2010.01)
*G01S 19/19* (2010.01)
(Continued)

(52) U.S. Cl.
CPC ............ *G01S 19/49* (2013.01); *G01C 21/165* (2013.01); *G01P 13/00* (2013.01); *G01S 19/19* (2013.01); *G08G 1/005* (2013.01)

(58) Field of Classification Search
CPC ........ G01S 19/19; G01S 19/49; G01C 21/165
(Continued)

(56) References Cited

U.S. PATENT DOCUMENTS 6,546,336 B1 4/2003 Matsuoka et al.

FOREIGN PATENT DOCUMENTS

JP 2000-097722 A 4/2000
JP 2001-174275 A 6/2001
(Continued)

*Primary Examiner* — Dao L Phan
(74) *Attorney, Agent, or Firm* — Kilpatrick Townsend & Stockton LLP

(57) ABSTRACT

Disclosed are an error estimation method capable of reducing a processing load, and estimating errors of indexes indicating a state of a moving object with high accuracy by using a signal from a positioning satellite. In one aspect, the error estimation method includes calculating a coordinate transformation matrix between a first coordinate system with a first sensor mounted on a moving object as a reference and a second coordinate system with the moving object as a reference, at a predetermined timing in a cycle of, converting one of an azimuth angle of the moving object based on a detection result in the first sensor and an azimuth angle of the moving object based on a detection result in the second sensor by using the coordinate transformation matrix in a case where the detection result in the second sensor receiving a signal from a positioning satellite is obtained, and estimating errors of indexes indicating a state of the moving object by using a difference between the converted azimuth angle and the other azimuth angle at the predetermined timing after a timing at which the detection result in the second sensor is obtained.

20 Claims, 21 Drawing Sheets

(51) Int. Cl.
*G08G 1/005* (2006.01)
*G01C 21/16* (2006.01)
*G01P 13/00* (2006.01)

(58) Field of Classification Search
USPC ............ 342/357.32, 357.35, 357.57, 357.65; 701/473, 518
See application file for complete search history.

(56) References Cited

FOREIGN PATENT DOCUMENTS

| | | |
|---|---|---|
| JP | 2011-112500 A | 6/2011 |
| JP | 2014-185955 A | 10/2014 |
| JP | 2014-190900 A | 10/2014 |

/ 310

| 311 | 312 | 313 |
|---|---|---|
| DETECTION TIME POINT | ACCELERATION | ANGULAR VELOCITY |
| t1 | (ax1, ay1, az1) | (ωx1, ωy1, ωz1) |
| t2(=t1+Δt) | (ax2, ay2, az2) | (ωx2, ωy2, ωz2) |
| t3(=t2+Δt) | (ax3, ay3, az3) | (ωx3, ωy3, ωz3) |
| ⋮ | | |

| 321 | 322 | 323 | 324 | 325 | |
|---|---|---|---|---|---|
| POSITIONING TIME POINT | POSITION | VELOCITY | POSITIONING ACCURACY (DOP) | SIGNAL INTENSITY | ... |
| t1 | (Px1, Py1, Pz1) | (Vx1, Vy1, Vz1) | DP1 | SS1 | |
| t2 | (Px2, Py2, Pz2) | (Vx2, Vy2, Vz2) | DP2 | SS2 | ... |
| t3 | (Px3, Py3, Pz3) | (Vx3, Vy3, Vz3) | DP3 | SS3 | |
| ⋮ | | | | | |

| 331 | 332 | 333 | 334 |
|---|---|---|---|
| COMPUTATION TIME | VELOCITY | POSITION | ATTITUDE ANGLE |
| t1 | (vx1, vy1, vz1) | (px1, py1, pz1) | (φ1, θ1, ψ1) |
| t2(=t1+Δt) | (vx2, vy2, vz2) | (px2, py2, pz2) | (φ2, θ2, ψ2) |
| t3(=t2+Δt) | (vx3, vy3, vz3) | (px3, py3, pz3) | (φ3, θ3, ψ3) |
| ⋮ | | | |

FIG. 5

| RELATIVE TIME POINT | COORDINATE CONVERSION MATRIX | LEFT/RIGHT IDENTIFICATION FLAG |
|---|---|---|
| $t1(=0)$ | $C_m^b[1]$ | RIGHT FOOT CYCLE |
| $t2$ | $C_m^b[2]$ | RIGHT FOOT CYCLE |
| ⋮ | | |
| $t_p$ | $C_m^b[P]$ | RIGHT FOOT CYCLE |
| $t_{p+1}(=0)$ | $C_m^b[P+1]$ | LEFT FOOT CYCLE |
| $t_{p+2}$ | $C_m^b[P+2]$ | LEFT FOOT CYCLE |
| ⋮ | | |
| $t_Q$ | $C_m^b[Q]$ | LEFT FOOT CYCLE |

FIG. 15

ERROR ESTIMATION METHOD, MOTION ANALYSIS METHOD, ERROR ESTIMATION APPARATUS, AND PROGRAM

CROSS-REFERENCES TO RELATED APPLICATIONS

This application is a National Phase of International Application No. PCT/JP2015/001388, filed Mar. 12, 2015, which claims priority to Japanese Patent Application Nos. 2014-061549, filed Mar. 25, 2014, 2014-068226, filed Mar. 28, 2014 and 2014-068249, filed Mar. 28, 2014, the entireties of which are hereby incorporated by reference.

BACKGROUND

Technical Field

The present invention relates to an error estimation method, a motion analysis method, an error estimation apparatus, and a program.

Background Art

There is a technique in which a sensor module having a plurality of sensors built thereinto is mounted on a walker, and a position or an azimuth of the walker is estimated by using a detection result in the sensor module. In estimation of a position or an azimuth using a sensor, a global positioning system (GPS) is frequently used to correct a calculation result. For example, PTL 1 proposes a method in which a movement direction is determined and a position is calculated during walking by using the highest position arrival point or a landing point of a human body as a reference, and the position is corrected by a GPS.

CITATION LIST

Patent Literature

PTL 1: JP-A-2000-97722

SUMMARY OF INVENTION

Technical Problem

However, in a case where the sensor module is mounted on the waist, the waist normally swings right and left during walking or running, and measured azimuth angles are distributed so as to be bilaterally symmetrical with respect to an advancing direction according to the swinging of the waist. In contrast, an azimuth angle calculated by using the GPS nearly matches an advancing direction of a walker, and a difference between the two azimuth angles changes every moment. For this reason, even if an azimuth angle calculated by using the GPS is used as a reference of a measured azimuth angle, it cannot be said to accurately estimate an error of the measured azimuth angle. In order to accurately estimate the error, it is necessary to calculate information regarding deviation between an azimuth angle of the waist and the advancing direction, that is, a transformation matrix between a coordinate system with a sensor as a reference and a coordinate system with a walker as a reference. However, a timing at which positioning information of the GPS is obtained is irregular, and thus a coordinate transformation matrix is required to be calculated every time on the basis of information regarding the most recent velocity at a timing at which positioning information of the GPS is obtained. Thus, not only does a processing load increase, but an error of velocity also increases due to an integration error over time, and thus a coordinate transformation matrix may not be accurately calculated. Therefore, there is a problem in that estimation accuracy of an azimuth angle error is reduced.

The present invention has been made in consideration of the above-described problems, and, according to some aspects of the present invention, it is possible to provide an error estimation method, an error estimation apparatus, and a program, capable of reducing a processing load, and estimating errors of indexes indicating a state of a moving object with high accuracy by using a signal from a positioning satellite, and a motion analysis method capable of analyzing a user's motion with high accuracy.

Solution to Problem

The present invention has been made in order to solve at least some of the above-described problems, and can be realized in the following aspects or application examples.

Application Example 1

An error estimation method according to this application example includes calculating a coordinate transformation matrix between a first coordinate system with a first sensor mounted on a moving object as a reference and a second coordinate system with the moving object as a reference, at a predetermined timing in a cycle of motion causing movement of the moving object; converting one of an azimuth angle of the moving object based on a detection result in the first sensor and an azimuth angle of the moving object based on a detection result in the second sensor by using the coordinate transformation matrix in a case where the detection result in the second sensor receiving a signal from a positioning satellite is obtained; and estimating errors of indexes indicating a state of the moving object by using a difference between the converted azimuth angle and the other azimuth angle at the predetermined timing after a timing at which the detection result in the second sensor is obtained.

The error estimation method according to the application example uses the fact that a difference between an azimuth angle based on the detection result in the first sensor and an azimuth angle based on the detection result in the second sensor is nearly constant at predetermined timing in each cycle of motion causing movement of the moving object. The errors of the indexes indicating a state of the moving object are estimated by using a difference between two azimuth angles which are calculated at a predetermined timing after the timing at which the detection result in the second sensor is obtained by using a coordinate transformation matrix calculated at the predetermined timing. Therefore, according to the error estimation method of the application example, even if a timing for obtaining a detection result in the second sensor is irregular, it is possible to estimate an error with high accuracy, and also to reduce a processing load since a coordinate transformation matrix is not required to be calculated whenever the detection result in the second sensor is obtained.

Application Example 2

In the error estimation method according to the application example, a velocity of the moving object in the first coordinate system may be calculated by using the detection result in the first sensor, and the coordinate transformation matrix may be calculated on the basis of the calculated velocity.

According to the error estimation method of the application example, it is possible to calculate a coordinate transformation matrix at a predetermined timing in a cycle of motion regardless of the presence or absence of a detection result in the second sensor.

Application Example 3

In the error estimation method according to the application example, the predetermined timing may be a timing at which the detection result in the first sensor satisfies a predetermined condition.

According to the error estimation method of the application example, a timing at which the detection result in the first sensor satisfies a predetermined condition is used as a reference, and thus it is possible to estimate an error with high accuracy at a timing corresponding to a timing at which the coordinate transformation matrix is calculated.

Application Example 4

The error estimation method according to the application example may further include detecting the cycle by using the detection result in the first sensor, and the predetermined timing may be a timing at which the cycle is detected.

According to the error estimation method of the application example, a coordinate transformation matrix is calculated at a timing at which the cycle of the motion is detected, and, then, an error can be estimated with high accuracy at the timing at which the cycle of the motion is detected.

Application Example 5

In the error estimation method according to the application example, the coordinate transformation matrix may be calculated by using the detection result in the first sensor in a predetermined time period after the moving object starts movement.

According to the error estimation method of the application example, since the coordinate transformation matrix is calculated early after the moving object starts movement, it is possible to reduce an error of a coordinate transformation matrix caused by an integration error or the like and thus to improve error estimation accuracy.

Application Example 6

The error estimation method according to the application example may further include determining whether or not the moving object is advancing straight, and, in a case where it is determined that the moving object is not advancing straight between the timing at which the detection result in the second sensor is obtained and the next predetermined timing, the error may not be estimated at the next predetermined timing.

According to the error estimation method of the application example, if the moving object changes an advancing direction thereof from the time when a detection result in the second sensor is obtained to the next predetermined timing, a difference between an azimuth angle based on a detection result in the first sensor and an azimuth angle based on a detection result in the second sensor differs from that at the time when the coordinate transformation matrix is calculated, and, in this case, an error is not estimated by taking this into consideration. Thus, it is possible to suppress a reduction in error estimation accuracy.

Application Example 7

An error estimation method according to this application example includes calculating a plurality of coordinate transformation matrices between a first coordinate system with a first sensor mounted on a moving object as a reference and a second coordinate system with the moving object as a reference, at a plurality of timings in periodical motion causing movement of the moving object; selecting the coordinate transformation matrix corresponding to a timing at which a detection result in the second sensor is obtained from among the plurality of coordinate transformation matrices in a case where a detection result in the second sensor receiving a signal from a positioning satellite is obtained, and converting one of an azimuth angle of the moving object based on a detection result in the first sensor and an azimuth angle of the moving object based on the detection result in the second sensor by using the selected coordinate transformation matrix; and estimating errors of indexes indicating a state of the moving object by using a difference between the converted azimuth angle and the other azimuth angle.

According to the error estimation method of the application example, a coordinate transformation matrix corresponding to a timing at which a detection result in the second sensor is obtained is selected from among a plurality of coordinate transformation matrices calculated at a plurality of timings in a cycle of motion causing movement of the moving object, and errors of indexes indicating a state of the moving object are estimated by using a difference between an azimuth angle based on the detection result in the first sensor and an azimuth angle based on the detection result in the second sensor, calculated by using the selected coordinate transformation matrix. Therefore, according to the error estimation method of the application example, it is possible to estimate an error with high accuracy by using a coordinate transformation matrix corresponding to a timing at which the detection result in the second sensor is obtained, and also to reduce a processing load since the coordinate transformation matrix is not required to be calculated whenever the detection result in the second sensor is obtained.

Application Example 8

In the error estimation method according to the application example, at each of the plurality of timings, a velocity of the moving object in the first coordinate system may be calculated by using the detection result in the first sensor, and the plurality of coordinate transformation matrices may be calculated by calculating a coordinate transformation matrix on the basis of the calculated velocity.

According to the error estimation method of the application example, it is possible to calculate a coordinate transformation matrix at a plurality of timings in a cycle of motion regardless of the presence or absence of a detection result in the second sensor.

Application Example 9

The error estimation method according to the application example may further include detecting the cycle of the motion by using the detection result in the first sensor, and the coordinate transformation matrix may be selected on the basis of a timing at which the detection result in the second sensor is obtained, and a timing which is closest to the timing at which the detection result in the second sensor is obtained and at which the cycle is detected.

According to the error estimation method of the application example, it is possible to select an appropriate coordinate transformation matrix on the basis of a timing at which a detection result in the second sensor is obtained and a timing at which a cycle of the motion has been detected most recently.

Application Example 10

In the error estimation method according to the application example, the plurality of coordinate transformation matrices may be calculated by using the detection result in the first sensor in a predetermined time period after the moving object starts movement.

According to the error estimation method of the application example, since a plurality of coordinate transformation matrices are calculated early after the moving object starts movement, it is possible to reduce an error of a coordinate transformation matrix caused by an integration error or the like and thus to improve error estimation accuracy.

Application Example 11

In the error estimation method according to the application example, the first sensor may include at least one of an acceleration sensor and an angular velocity sensor.

According to the error estimation method of the application example, it is possible to estimate errors of indexes indicating a state of the moving object by using a difference between an azimuth angle based on a detection result in the acceleration sensor or the angular velocity sensor and an azimuth angle based on a detection result in the second sensor.

Application Example 12

In the error estimation method according to the application example, the first sensor may be a geomagnetic sensor.

According to the error estimation method of the application example, it is possible to estimate errors of indexes indicating a state of the moving object by using a difference between an azimuth angle based on a detection result in the geomagnetic sensor and an azimuth angle based on a detection result in the second sensor.

Application Example 13

A motion analysis method according to this application example includes estimating the errors by using any one of the error estimation methods; correcting the indexes by using the estimated errors; and analyzing motion of the moving object by using the corrected indexes.

According to the motion analysis method of the application example, it is possible to analyze motion of the moving object with high accuracy by using the indexes which are corrected with high accuracy by using the errors of the indexes indicating a state of the moving object, the state of the moving object being estimated by using the error estimation methods according to the application examples.

Application Example 14

An error estimation apparatus according to this application example includes a coordinate transformation matrix calculation portion that calculates a coordinate transformation matrix between a first coordinate system with a first sensor mounted on a moving object as a reference and a second coordinate system with the moving object as a reference, at a predetermined timing in a cycle of motion causing movement of the moving object; an azimuth angle transformation portion that converts one of an azimuth angle of the moving object based on a detection result in the first sensor and an azimuth angle of the moving object based on a detection result in the second sensor by using the coordinate transformation matrix in a case where the detection result in the second sensor receiving a signal from a positioning satellite is obtained; and an error estimation portion that estimates errors of indexes indicating a state of the moving object by using a difference between the converted azimuth angle and the other azimuth angle at the predetermined timing after a timing at which the detection result in the second sensor is obtained.

The error estimation apparatus according to the application example uses the fact that a difference between an azimuth angle based on the detection result in the first sensor and an azimuth angle based on the detection result in the second sensor is nearly constant at predetermined timing in each cycle of motion causing movement of the moving object. The errors of the indexes indicating a state of the moving object are estimated by using a difference between two azimuth angles which are calculated at a predetermined timing after the timing at which the detection result in the second sensor is obtained by using a coordinate transformation matrix calculated at the predetermined timing. Therefore, according to the error estimation apparatus of the application example, even if a timing for obtaining a detection result in the second sensor is irregular, it is possible to estimate an error with high accuracy, and also to reduce a processing load since a coordinate transformation matrix is not required to be calculated whenever the detection result in the second sensor is obtained.

Application Example 15

An error estimation apparatus according to this application example includes a coordinate transformation matrix calculation portion that calculates a plurality of coordinate transformation matrices between a first coordinate system with a first sensor mounted on a moving object as a reference and a second coordinate system with the moving object as a reference, at a plurality of timings in periodical motion causing movement of the moving object; an azimuth angle transformation portion that selects the coordinate transformation matrix corresponding to a timing at which a detection result in the second sensor is obtained from among the plurality of coordinate transformation matrices in a case where a detection result in the second sensor receiving a signal from a positioning satellite is obtained, and converts one of an azimuth angle of the moving object based on a detection result in the first sensor and an azimuth angle of the moving object based on the detection result in the second sensor by using the selected coordinate transformation matrix; and an error estimation portion that estimates errors of indexes indicating a state of the moving object by using a difference between the converted azimuth angle and the other azimuth angle.

According to the error estimation apparatus of the application example, a coordinate transformation matrix corresponding to a timing at which a detection result in the second sensor is obtained is selected from among a plurality of coordinate transformation matrices calculated at a plurality of timings in a cycle of motion causing movement of the moving object, and errors of indexes indicating a state of the moving object are estimated by using a difference between an azimuth angle based on the detection result in the first sensor and an azimuth angle based on the detection result in the second sensor, calculated by using the selected coordinate transformation matrix. Therefore, according to the error estimation apparatus of the application example, it is possible to estimate an error with high accuracy by using a coordinate transformation matrix corresponding to a timing at which the detection result in the second sensor is obtained, and also to reduce a processing load since the coordinate transformation matrix is not required to be calculated whenever the detection result in the second sensor is obtained.

Application Example 16

A program according to this application example causes a computer to execute calculating a coordinate transformation matrix between a first coordinate system with a first sensor mounted on a moving object as a reference and a second coordinate system with the moving object as a reference, at a predetermined timing in a cycle of motion causing movement of the moving object; converting one of an azimuth angle of the moving object based on a detection result in the first sensor and an azimuth angle of the moving object based on a detection result in the second sensor by using the coordinate transformation matrix in a case where the detection result in the second sensor receiving a signal from a positioning satellite is obtained; and estimating errors of indexes indicating a state of the moving object by using a difference between the converted azimuth angle and the other azimuth angle at the predetermined timing after a timing at which the detection result in the second sensor is obtained.

The program according to the application example uses the fact that a difference between an azimuth angle based on the detection result in the first sensor and an azimuth angle based on the detection result in the second sensor is nearly constant at predetermined timing in each cycle of motion causing movement of the moving object. The errors of the indexes indicating a state of the moving object are estimated by using a difference between two azimuth angles which are calculated at a predetermined timing after the timing at which the detection result in the second sensor is obtained by using a coordinate transformation matrix calculated at the predetermined timing. Therefore, according to the program of the application example, even if a timing for obtaining a detection result in the second sensor is irregular, it is possible to estimate an error with high accuracy, and also to reduce a processing load since a coordinate transformation matrix is not required to be calculated whenever the detection result in the second sensor is obtained.

Application Example 17

A program according to this application example causes a computer to execute calculating a plurality of coordinate transformation matrices between a first coordinate system with a first sensor mounted on a moving object as a reference and a second coordinate system with the moving object as a reference, at a plurality of timings in periodical motion causing movement of the moving object; selecting the coordinate transformation matrix corresponding to a timing at which a detection result in the second sensor is obtained from among the plurality of coordinate transformation matrices in a case where a detection result in the second sensor receiving a signal from a positioning satellite is obtained, and converting one of an azimuth angle of the moving object based on a detection result in the first sensor and an azimuth angle of the moving object based on the detection result in the second sensor by using the selected coordinate transformation matrix; and estimating errors of indexes indicating a state of the moving object by using a difference between the converted azimuth angle and the other azimuth angle.

According to the program of the application example, a coordinate transformation matrix corresponding to a timing at which a detection result in the second sensor is obtained is selected from among a plurality of coordinate transformation matrices calculated at a plurality of timings in a cycle of motion causing movement of the moving object, and errors of indexes indicating a state of the moving object are estimated by using a difference between an azimuth angle based on the detection result in the first sensor and an azimuth angle based on the detection result in the second sensor, calculated by using the selected coordinate transformation matrix. Therefore, according to the program of the application example, it is possible to estimate an error with high accuracy by using a coordinate transformation matrix corresponding to a timing at which the detection result in the second sensor is obtained, and also to reduce a processing load since the coordinate transformation matrix is not required to be calculated whenever the detection result in the second sensor is obtained.

Application Example 18

An error estimation method according to this application example is an error estimation method using a first sensor and a second sensor, the method including selecting one of a first mode and a second mode on the basis of a detection result in the second sensor; and estimating errors of indexes indicating a state of a moving object, in which the estimating of the errors includes predicting the errors; correcting the predicted errors by using a first reference value based on the detection result in the second sensor and a first error among the errors without using a second reference value based on a detection result in the first sensor in a case where the first mode is selected; and correcting the predicted errors by using the second reference value and the first error without using the first reference value in a case where the second mode is selected.

According to the error estimation method of the application example, one of two different modes is selected in order to correct errors of indexes indicating a state of the moving object by using different kinds of reference values and the same kind of error. Correction in the first mode and correction in the second mode are not duplicated, and thus it is possible to estimate the errors with high accuracy.

Application Example 19

In the error estimation method according to the application example, the first sensor may include at least one of an acceleration sensor and an angular velocity sensor.

According to the error estimation method of the application example, in the second mode, it is possible to estimate errors by using a reference value based on a detection result in the acceleration sensor or the angular velocity sensor.

Application Example 20

In the error estimation method according to the application example, the second sensor may be a sensor receiving a signal from a positioning satellite, or a geomagnetic sensor.

According to the error estimation method of the application example, in the first mode, it is possible to estimate errors by using a reference value based on a detection result in the sensor receiving a signal from a positioning satellite, or the geomagnetic sensor.

Application Example 21

In the error estimation method according to the application example, in a case where the detection result in the second sensor is obtained, the first mode may be selected, and, in a case where the detection result in the second sensor is not obtained, the second mode may be selected.

According to the error estimation method of the application example, in a case where the detection result in the second sensor is obtained, the first mode can be selected.

Application Example 22

In the error estimation method according to the application example, in a case where the accuracy of the detection result in the second sensor is equal to or more than a standard value, the first mode may be selected, and, in a case where the accuracy of the detection result in the second sensor is less than the standard value, the second mode may be selected.

According to the error estimation method of the application example, in a case where the accuracy of the reference value based on the detection result in the second sensor is less than the standard value, the second mode is selected, and thus it is possible to suppress a reduction in error estimation accuracy.

Application Example 23

The error estimation method according to the application example may further include correcting the predicted errors by using a third reference value based on the detection result in the first sensor, and a second error which is different from the first error among the errors, in a case where the first mode is selected.

According to the error estimation method of the application example, in the first mode, it is possible to perform error estimation using the first reference value based on a detection result in the second sensor and the third reference value based on a detection result in the first sensor, and thus to further improve error estimation accuracy in the first mode.

Application Example 24

A motion analysis method according to this application example includes estimating the errors by using any one of the error estimation methods; correcting the indexes by using the estimated errors; and analyzing motion of the moving object by using the corrected indexes.

According to the motion analysis method of the application example, it is possible to analyze motion of the moving object with high accuracy by using the indexes which are corrected with high accuracy by using the errors of the indexes indicating a state of the moving object, the state of the moving object being estimated by using the error estimation methods according to the application examples.

Application Example 25

An error estimation apparatus according to this application example includes a mode selection portion that selects one of a first mode and a second mode on the basis of a detection result in a second sensor; and an error estimation portion that estimates errors of indexes indicating a state of a moving object, in which the error estimation portion predicts the errors, corrects the predicted errors by using a first reference value based on the detection result in the second sensor and a first error among the errors without using a second reference value based on a detection result in the first sensor in a case where the first mode is selected, and corrects the predicted errors by using the second reference value and the first error without using the first reference value in a case where the second mode is selected.

According to the error estimation apparatus of the application example, one of two different modes is selected in order to correct errors of indexes indicating a state of the moving object by using different kinds of reference values and the same kind of error. Correction in the first mode and correction in the second correction are not duplicated, and thus it is possible to estimate the errors with high accuracy.

Application Example 26

A program according to this application example causes a computer to execute selecting one of a first mode and a second mode on the basis of a detection result in a second sensor; and estimating errors of indexes indicating a state of a moving object, in which the estimating of the errors includes predicting the errors; correcting the predicted errors by using a first reference value based on the detection result in the second sensor and a first error among the errors without using a second reference value based on a detection result in the first sensor in a case where the first mode is selected; and correcting the predicted errors by using the second reference value and the first error without using the first reference value in a case where the second mode is selected.

According to the program of the application example, one of two different modes is selected in order to correct errors of indexes indicating a state of the moving object by using different kinds of reference values and the same kind of error. Correction in the first mode and correction in the second mode are not duplicated, and thus it is possible to estimate the errors with high accuracy.

BRIEF DESCRIPTION OF DRAWINGS

FIG. 3 is a diagram illustrating a configuration example of a sensing data table.

FIG. 4 is a diagram illustrating a configuration example of a GPS data table.

FIG. 5 is a diagram illustrating a configuration example of a calculated data table.

FIG. 15 is a diagram illustrating a configuration example of a coordinate transformation matrix table.

DESCRIPTION OF EMBODIMENTS

First Embodiment

1. Outline of Motion Analysis System

A first embodiment of the present invention will be described in detail with reference to the drawings.

Figure 1:
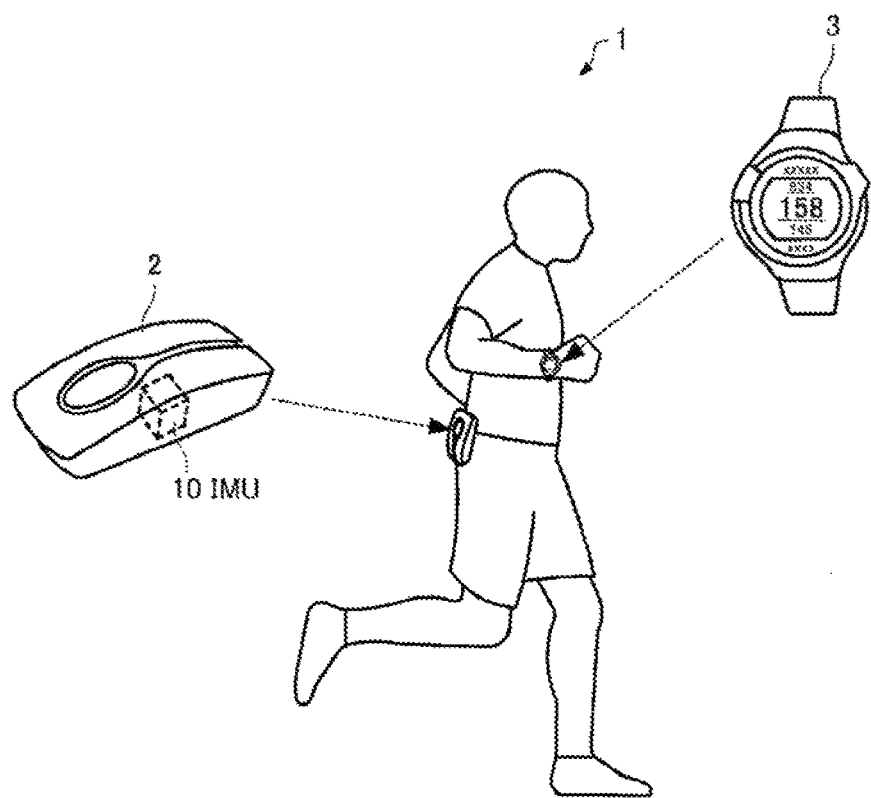
FIG. 1 is a diagram illustrating an outline of a motion analysis system according to a first embodiment.

FIG. 1 is a diagram for explaining an outline of a motion analysis system 1 according to a first embodiment. As illustrated in FIG. 1, the motion analysis system 1 of the first embodiment includes a motion analysis apparatus 2 and a display apparatus 3.

The motion analysis apparatus 2 is mounted on a body part (for example, a right-side waist or a left-side waist) of a user (an example of a moving object). The motion analysis apparatus 2 has an inertial measurement unit (IMU) 10 built thereinto, recognizes motion of the user in walking (including running), computes velocity, a position, attitude angles (a roll angle, a pitch angle, and a yaw angle), and the like, and analyzes a user's motion so as to generate motion analysis information. In the present embodiment, the motion analysis apparatus 2 is mounted on the user so that one detection axis (hereinafter, referred to as a z axis) of the inertial measurement unit (IMU) 10 substantially matches the gravitational acceleration direction (vertically downward direction) in a state in which the user stands still. The motion analysis apparatus 2 transmits the generated motion analysis information to the display apparatus 3.

The display apparatus 3 is a wrist type (wristwatch type) portable information apparatus and is mounted on a user's wrist or the like. However, the display apparatus 3 may be a portable information apparatus such as a head mounted display (HMD) or a smart phone. The user operates the display apparatus 3 so as to instruct the motion analysis apparatus 2 to start or finish measurement. The display apparatus 3 transmits a command for instructing measurement to be started or finished, to the motion analysis apparatus 2. If a command for starting measurement has been received, the motion analysis apparatus 2 causes the inertial measurement unit (IMU) 10 to start measurement, and analyzes the user's motion on the basis of a measurement result so as to generate motion analysis information. The motion analysis apparatus 2 transmits the generated motion analysis information to the display apparatus 3. The display apparatus 3 receives the motion analysis information, and presents the received motion analysis information to the user in various forms such as text, graphics, and sound. The user can recognize the motion analysis information via the display apparatus 3.

Data communication between the motion analysis apparatus 2 and the display apparatus 3 may be wireless communication or wired communication.

In the present embodiment, hereinafter, as an example, a detailed description will be made of a case where the motion analysis apparatus 2 generates motion analysis information including a movement path, a movement time period, or the like by estimating a walking speed of the user, but the motion analysis system 1 of the present embodiment is also applicable to a case where motion analysis information is generated in motion causing movement other than walking.

2. Coordinate System

Coordinate systems necessary in the following description are defined.

Figure 2:
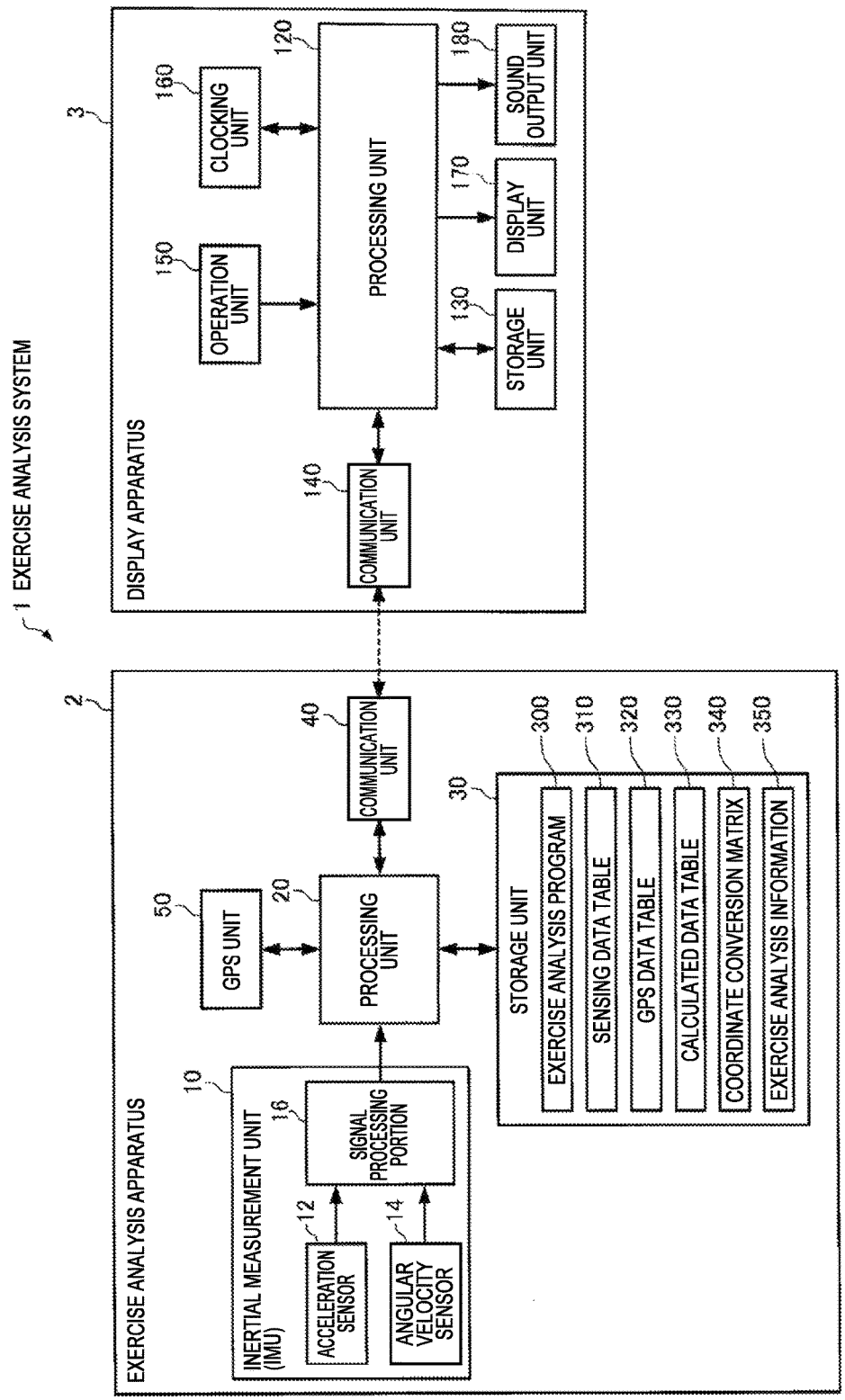
FIG. 2 is a functional block diagram illustrating configuration examples of a motion analysis apparatus and a display apparatus.

Earth centered earth fixed frame (e frame): right handed three-dimensional orthogonal coordinates in which the center of the earth is set as an origin, and a z axis is taken so as to be parallel to the axis of the earth Navigation frame (n frame): three-dimensional orthogonal coordinate system in which a moving object (user) is set as an origin, and an x axis is set to the north, a y axis is set to the east, and a z axis is set to the gravitational direction Body frame (b frame): three-dimensional orthogonal coordinate system using a sensor (the inertial measurement unit (IMU) 10) as a reference Moving frame (m frame): right handed three-dimensional orthogonal coordinate system in which a moving object (user) is set as an origin, and an advancing direction of the moving object (user) is set as an x axis 3. Configuration of Motion Analysis System FIG. 2 is a functional block diagram illustrating configuration examples of the motion analysis apparatus 2 and the display apparatus 3. As illustrated in FIG. 2, the motion analysis apparatus 2 (an example of an error estimation apparatus) includes the inertial measurement unit (IMU) 10, a processing unit 20, a storage unit 30, a communication unit 40, and a GPS unit 50. However, the motion analysis apparatus 2 of the present embodiment may have a configuration in which some of the constituent elements are deleted or changed, or other constituent elements may be added thereto.

The inertial measurement unit 10 (an example of a first sensor) includes an acceleration sensor 12, an angular velocity sensor 14, and a signal processing portion 16.

The acceleration sensor 12 detects respective accelerations in the three-axis directions which intersect each other (ideally, orthogonal to each other), and outputs a digital signal (acceleration data) corresponding to magnitudes and directions of the detected three-axis accelerations.

The angular velocity sensor 14 detects respective angular velocities in the three-axis directions which intersect each other (ideally, orthogonal to each other), and outputs a digital signal (angular velocity data) corresponding to magnitudes and directions of the detected three-axis angular velocities.

The signal processing portion 16 receives the acceleration data and the angular velocity data from the acceleration sensor 12 and the angular velocity sensor 14, respectively, adds time information thereto, stores the data items and the time information in a storage unit (not illustrated), generates sensing data in which the stored acceleration data, angular velocity data and time information conform to a predetermined format, and outputs the sensing data to the processing unit 20.

The acceleration sensor 12 and the angular velocity sensor 14 are ideally installed so that three axes thereof match three axes of a sensor coordinate system (b frame) with the inertial measurement unit 10 as a reference, but, in practice, an error occurs in an installation angle. Therefore, the signal processing portion 16 performs a process of converting the acceleration data and the angular velocity data into data of the sensor coordinate system (b frame) by using a correction parameter which is calculated in advance according to the installation angle error. Instead of the signal processing portion 16, the processing unit 20 which will be described later may perform the process.

The signal processing portion 16 may perform a temperature correction process on the acceleration sensor 12 and the angular velocity sensor 14. Instead of the signal processing portion 16, the processing unit 20 to be described later may perform the temperature correction process, and a temperature correction function may be incorporated into the acceleration sensor 12 and the angular velocity sensor 14.

The acceleration sensor 12 and the angular velocity sensor 14 may output analog signals, and, in this case, the signal processing portion 16 may A/D convert an output signal from the acceleration sensor 12 and an output signal from the angular velocity sensor 14 so as to generate sensing data.

The GPS unit 50 (an example of a second sensor) receives a GPS satellite signal which is transmitted from a GPS satellite which is one type of positioning satellite, performs positioning computation by using the GPS satellite signal so as to calculate a position and velocity (which is a vector including a magnitude and a direction) of the user in n frames, and outputs GPS data in which time information or positioning accuracy information is added to the calculated results to the processing unit 20. A method of calculating a position or velocity or a method of generating time information by using GPS is well known, and thus detailed description thereof will be omitted.

The processing unit 20 is constituted of, for example, a central processing unit (CPU), a digital signal processor (DSP), or an application specific integrated circuit (ASIC), and performs various calculation processes or control processes according to various programs stored in the storage unit 30. Particularly, the processing unit 20 receives sensing data from the inertial measurement unit 10, and receives GPS data from the GPS unit 50, so as to calculate a velocity, a position, an attitude angle, and the like of the user by using the sensing data and the GPS data. The processing unit 20 performs various calculation processes by using the calculated information so as to analyze motion of the user and to generate motion analysis information (image data, text data, sound data, and the like) including a movement path or a movement time period. The processing unit 20 transmits the generated motion analysis information to the display apparatus 3 via the communication unit 40.

The storage unit 30 is constituted of, for example, recording media including various IC memories such as a read only memory (ROM), a flash ROM, and a random access memory (RAM), a hard disk, and a memory card.

Figure 10:
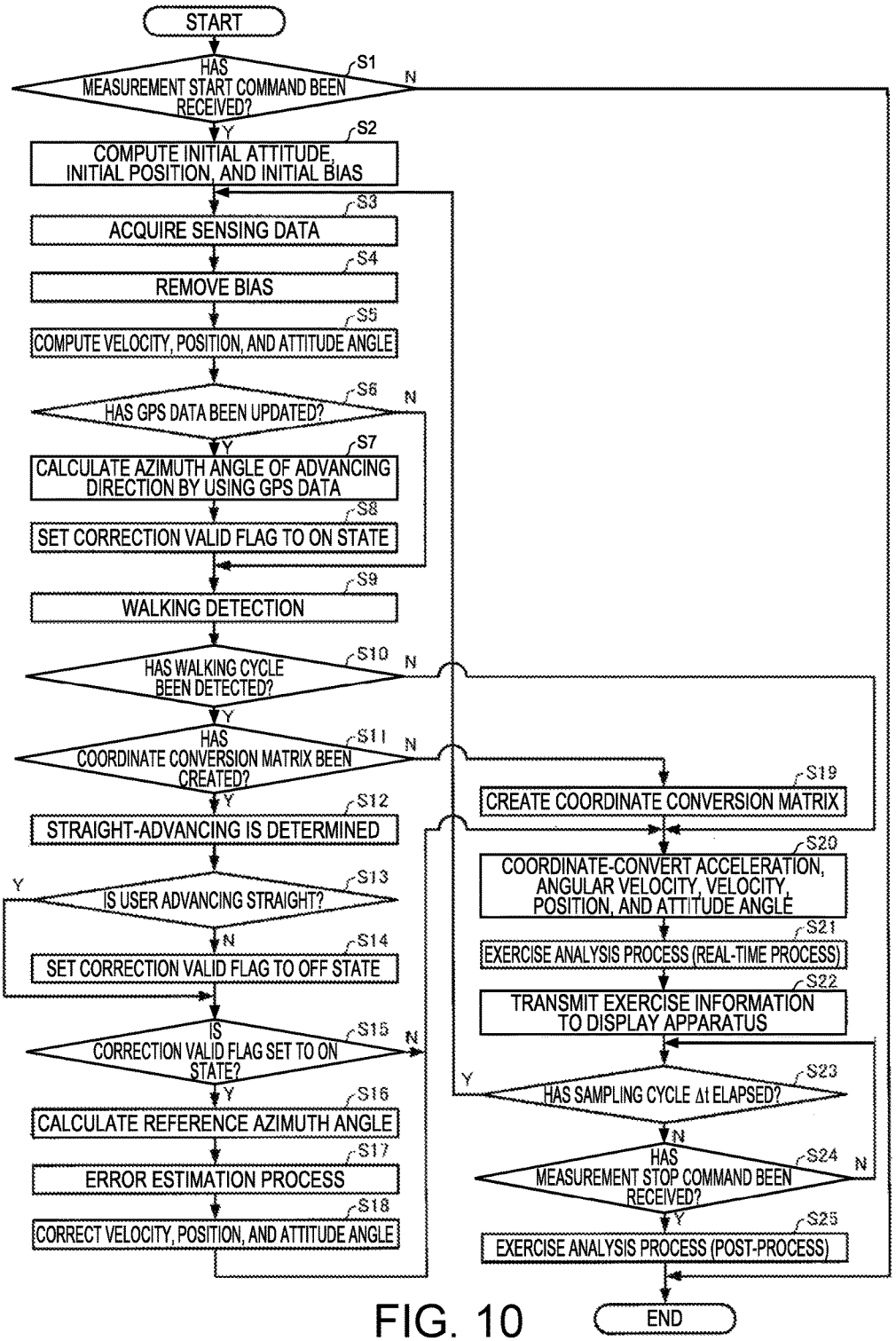
FIG. 10 is a flowchart illustrating examples of procedures of a motion analysis process.

The storage unit 30 stores a motion analysis program 300 which is read by the processing unit 20 and is used to perform a motion analysis process (refer to FIG. 10).

The storage unit 30 stores a sensing data table 310, a GPS data table 320, a calculated data table 330, a coordinate transformation matrix 340, motion analysis information 350, and the like.

The sensing data table 310 is a data table which stores sensing data (a detection result in the inertial measurement unit 10) received by the processing unit 20 from the inertial measurement unit 10 in a time series. FIG. 3 is a diagram illustrating a configuration example of the sensing data table 310. As illustrated in FIG. 3, the sensing data table 310 is configured so that sensing data items in which the detection time point 311 in the inertial measurement unit 10, an acceleration 312 detected by the acceleration sensor 12, and an angular velocity 313 detected by the angular velocity sensor 14 are correlated with each other are arranged in a time series. When measurement is started, the processing unit 20 adds new sensing data to the sensing data table 310 whenever a sampling cycle Δt (for example, 20 ms) elapses. The processing unit 20 corrects an acceleration and an angular velocity bias by using an acceleration bias and an angular bias which are estimated according to error estimation (which will be described later) using the extended Karman filter, and updates the sensing data table 310 by overwriting the corrected acceleration and angular velocity to the sensing data table.

The GPS data table 320 is a data table which stores GPS data (a detection result in the GPS unit (GPS sensor) 50) received by the processing unit 20 from the GPS unit 50 in a time series. FIG. 4 is a diagram illustrating a configuration example of the GPS data table 320. As illustrated in FIG. 4, the GPS data table 320 is configured so that GPS data items in which the positioning time point 321 at which the GPS unit 50 performs positioning computation, a position 322 calculated through the positioning computation, a velocity 323 calculated through the positioning computation, positioning accuracy (dilution of precision (DOP)) 324, a signal intensity 325 of a received GPS satellite signal, and the like are correlated with each other are arranged in a time series. When measurement is started, the processing unit 20 adds new GPS data whenever the GPS data is acquired (for example, in an asynchronous manner with acquisition timing of sensing data) so as to update the GPS data table 320.

The calculated data table 330 is a data table which stores a velocity, a position, and an attitude angle calculated by the processing unit 20 by using the sensing data in a time series. FIG. 5 is a diagram illustrating a configuration example of the calculated data table 330. As illustrated in FIG. 5, the calculated data table 330 is configured so that calculated data items in which the time 331 at which the processing unit 20 performs computation, a velocity 332, a position 333, and an attitude angle 334 are correlated with each other are arranged in a time series. When measurement is started, the processing unit 20 calculates a velocity, a position, and an attitude angle whenever new sensing data is acquired, that is, the sampling cycle Δt elapses, and adds new calculated data to the calculated data table 330. The processing unit 20 corrects a velocity, a position, and an attitude angle by using a velocity error, a position error, and an attitude angle error which are estimated according to error estimation using the extended Karman filter, and updates the calculated data table 330 by overwriting the corrected velocity, position and attitude angle to the calculated data table.

The coordinate transformation matrix 340 is a matrix for performing coordinate transformation between the b frame and the m frame, and, as will be described later, the processing unit 20 calculates the matrix at a predetermined timing in a cycle of the user's walking motion, and preserves (stores) the matrix in the storage unit 30.

The motion analysis information 350 is various information pieces regarding the motion of the user, and, in the present embodiment, includes information regarding movement due to walking, information regarding an evaluation index of walking motion, and information regarding advice, an instruction, and a warning for walking, calculated by the processing unit 20.

The communication unit 40 performs data communication with a communication unit 140 of the display apparatus 3, and performs a process of receiving motion analysis information generated by the processing unit 20 and transmitting the motion analysis information to the display apparatus 3, a process of receiving a command (a command for starting or finishing measurement, or the like) transmitted from the display apparatus 3 and sending the command to the processing unit 20, and the like.

The display apparatus 3 includes a processing unit 120, a storage unit 130, the communication unit 140, an operation unit 150, a clocking unit 160, a display unit 170, and a sound output unit 180. However, the display apparatus 3 of the present embodiment may have a configuration in which some of the constituent elements are deleted or changed, or other constituent elements may be added thereto.

The processing unit 120 performs various calculation processes or control processes according to a program stored in the storage unit 130. For example, the processing unit 120 performs various processes (a process of sending a command for starting or finishing measurement to the communication unit 140, a process of performing display or outputting sound corresponding to the operation data, and the like) corresponding to operation data received from the operation unit 150; a process of receiving motion analysis information from the communication unit 140 and sending the motion analysis information to the display unit 170 or the sound output unit 180; a process of generating time image data corresponding to time information received from the clocking unit 160 and sending the time image data to the display unit 170; and the like.

The storage unit 130 is constituted of various IC memories such as a ROM which stores a program or data required for the processing unit 120 to perform various processes, and a RAM serving as a work area of the processing unit 120.

The communication unit 140 performs data communication with the communication unit 40 of the motion analysis apparatus 2, and performs a process of receiving a command (a command for starting or finishing measurement, or the like) corresponding to operation data from the processing unit 120 and transmitting the command to the motion analysis apparatus 2, a process of receiving motion analysis information (image data, text data, sound data, and the like) transmitted from the motion analysis apparatus 2 and sending the information to the processing unit 120, and the like.

The operation unit 150 performs a process of acquiring operation data (operation data such as starting or finishing of measurement or selection of display content) from the user and sending the operation data to the processing unit 120. The operation unit 150 may be, for example, a touch panel type display, a button, a key, or a microphone.

The clocking unit 160 performs a process of generating time information such as year, month, day, hour, minute, and second. The clocking unit 160 is implemented by, for example, a real time clock (RTC) IC.

The display unit 170 displays image data or text data sent from the processing unit 120 as text, a graph, a table, animation, or other images. The display unit 170 is implemented by, for example, a display such as a liquid crystal display (LCD), an organic electroluminescence (EL) display, or an electrophoretic display (EPD), and may be a touch panel type display. A single touch panel type display may realize functions of the operation unit 150 and the display unit 170.

The sound output unit 180 outputs sound data sent from the processing unit 120 as sound such as voice or a buzzer sound. The sound output unit 180 is implemented by, for example, a speaker or a buzzer.

Figure 6:
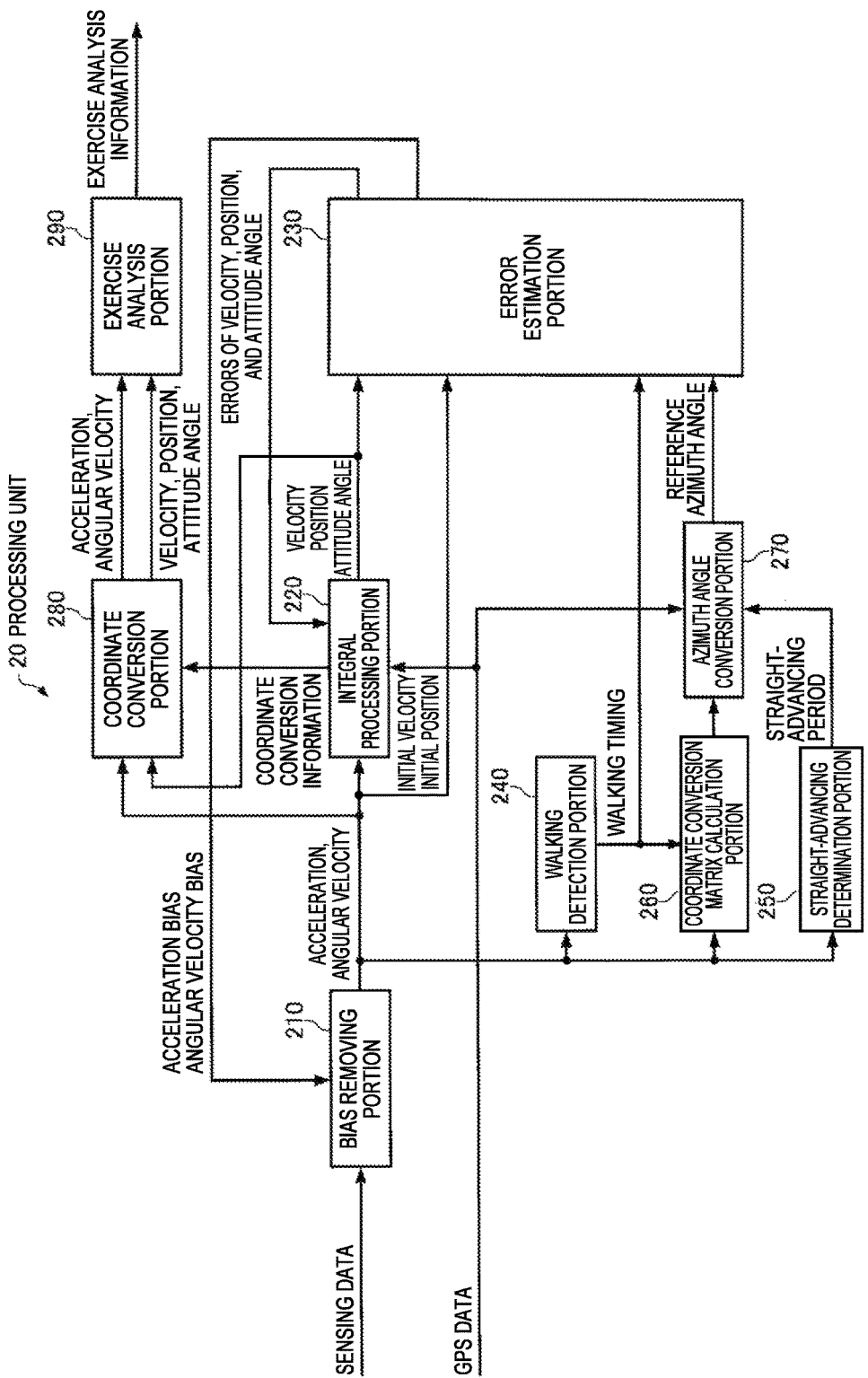
FIG. 6 is a functional block diagram illustrating a configuration example of a processing unit of the motion analysis apparatus.

FIG. 6 is a functional block diagram illustrating a configuration example of the processing unit 20 of the motion analysis apparatus 2. In the present embodiment, the processing unit 20 functions as a bias removing portion 210, an integral processing portion 220, an error estimation portion 230, a walking detection portion 240, a straight-advancing determination portion 250, a coordinate transformation matrix calculation portion 260, an azimuth angle transformation portion 270, a coordinate transformation portion 280, and a motion analysis portion 290, by executing the motion analysis program 300 stored in the storage unit 30.

The bias removing portion 210 subtracts an acceleration bias $b_a$ and an angular velocity bias $b_\omega$ estimated by the error estimation portion 230 from accelerations (three-axis accelerations) and angular velocities included in acquired new sensing data, so as to perform a process of correcting the accelerations and the angular velocities. Since the acceleration bias $b_a$ and the angular velocity bias $b_\omega$ are not present in an initial state right after measurement is started, the bias removing portion 210 computes initial biases by using sensing data from the inertial measurement unit assuming that an initial state of the user is a stationary state.

The integral processing portion 220 performs a process of calculating a velocity $v^e$, a position $p^e$, and attitude angles (a roll angle $\phi_{be}$, a pitch angle $\theta_{be}$, and a yaw angle $\psi_{be}$) of the e frame on the basis of the accelerations and the angular velocities corrected by the bias removing portion 210. Specifically, first, the integral processing portion 220 sets an initial velocity to zero assuming that an initial state of the user is a stationary state, or calculates an initial velocity by using the velocity included in the GPS data and also calculates an initial position by using the position included in the GPS data. The integral processing portion 220 specifies a gravitational acceleration direction on the basis of the three-axis accelerations of the b frame corrected by the bias removing portion 210 so as to calculate initial values of the roll angle $\phi_{be}$ and the pitch angle $\theta_{be}$, also calculates an initial value of the yaw angle $\psi_{be}$ on the basis of the velocity including the GPS data, and sets the calculated initial values as initial attitude angles of the e frame. In a case where the GPS data cannot be obtained, an initial value of the yaw angle $\psi_{be}$ is set to, for example, zero. The integral processing portion 220 calculates an initial value of a coordinate transformation matrix (rotation matrix) $C_b^e$ from the b frame into the e frame, expressed by Equation (1) on the basis of the calculated initial attitude angles.

[Expression 1]

$$C_b^e = \begin{bmatrix} \cos\theta_{be} \cdot \cos\varphi_{be} & \cos\theta_{be} \cdot \sin\varphi_{be} & -\sin\theta_{be} \\ \sin\phi_{be} \cdot \sin\theta_{be} \cdot \cos\varphi_{be} - \cos\phi_{be} \cdot \sin\varphi_{be} & \sin\phi_{be} \cdot \sin\theta_{be} \cdot \sin\varphi_{be} + \cos\phi_{be} \cdot \cos\varphi_{be} & \sin\phi_{be} \cdot \cos\theta_{be} \\ \cos\phi_{be} \cdot \sin\theta_{be} \cdot \cos\varphi_{be} + \sin\phi_{be} \cdot \sin\varphi_{be} & \cos\phi_{be} \cdot \sin\theta_{be} \cdot \sin\varphi_{be} - \sin\phi_{be} \cdot \cos\varphi_{be} & \cos\phi_{be} \cdot \cos\theta_{be} \end{bmatrix} \quad (1)$$

Then, the integral processing portion 220 performs integration (rotation calculation) of the three-axis angular velocities corrected by the bias removing portion 210 so as to calculate the coordinate transformation matrix $C_b^e$, and calculates attitude angles by using Equation (2).

[Expression 2]

$$\begin{bmatrix} \phi_{be} \\ \theta_{be} \\ \varphi_{be} \end{bmatrix} = \begin{bmatrix} \arctan2(C_b^e(2,3), C_b^e(3,3)) \\ -\arcsin C_b^e(1,3) \\ \arctan2(C_b^e(1,2), C_b^e(1,1)) \end{bmatrix} \quad (2)$$

The integral processing portion 220 converts the three-axis accelerations of the b frame corrected by the bias removing portion 210 into three-axis accelerations of the e frame by using the coordinate transformation matrix $C_b^e$, and removes a gravitational acceleration component therefrom for integration so as to calculate the velocity $v^e$ of the e frame. The integral processing portion 220 integrates the velocity $v^e$ of the e frame so as to calculate the position $p^e$ of the e frame.

The integral processing portion 220 also performs a process of correcting the velocity $v^e$, the position $p^e$, and the attitude angles by using a velocity error $\delta v^e$, a position error $\delta p^e$, and attitude angle errors $\varepsilon^e$ estimated by the error estimation portion 230.

The integral processing portion 220 also calculates a coordinate transformation matrix $C_b^m$ from the b frame into the m frame, and a coordinate transformation matrix $C_e^m$ from the e frame into the m frame. The coordinate transformation matrices are used for a coordinate transformation process in the coordinate transformation portion 280 which will be described later as coordinate transformation information.

The error estimation portion 230 estimates an error of an index indicating a state of the user by using the velocity and/or the position, and the attitude angles calculated by the integral processing portion 220, the acceleration or the angular velocity corrected by the bias removing portion 210, and a reference azimuth angle calculated by the azimuth angle transformation portion 270 which will be described later. In the present embodiment, the error estimation portion 230 uses the velocity, the attitude angles, the acceleration, the angular velocity, and the position as indexes indicating a state of the user, and estimates errors of the indexes by using the extended Karman filter. In other words, the error estimation portion 230 uses an error (velocity error) $\delta v^e$ of the velocity $v^e$ calculated by the integral processing portion 220, errors (attitude angle errors) $\varepsilon^e$ of the attitude angles calculated by the integral processing portion 220, the acceleration bias $b_a$, the angular velocity bias $b_\omega$, and an error (position error) $\delta p^e$ of the position $p^e$ calculated by the integral processing portion 220, as state variables of the extended Karman filter, and a state vector X is defined as in Equation (3).

[Expression 3]

$$X = \begin{bmatrix} \delta v^e \\ \varepsilon^e \\ b_a \\ b_\omega \\ \delta p^e \end{bmatrix} \quad (3)$$

The error estimation portion 230 predicts state variables (errors of the indexes indicating a state of the user) included in the state vector X by using prediction formulae of the extended Karman filter. The prediction formulae of the extended Karman filter are expressed as in Equation (4). In Equation (4), the matrix Φ is a matrix which associates the previous state vector X with the present state vector X, and is designed so that some elements thereof change every moment while reflecting attitude angles, a position, and the like. Q is a matrix indicating process noise, and each element thereof is set to an appropriate value. P is an error covariance matrix of the state variables.

[Expression 4]

$$X = \Phi X$$

$$P = \Phi P \Phi^T + Q \quad (4)$$

The error estimation portion 230 updates (corrects) the predicted state variables (errors of the indexes indicating a state of the user) by using update formulae of the extended Karman filter. The update formulae of the extended Karman filter are expressed as in Equation (5). Z and H are respectively an observation vector and an observation matrix, and the update formulae (5) indicate that the state vector X is corrected by using a difference between the actual observation vector Z and a vector HX predicted from the state vector X. R is a covariance matrix of observation errors, and may have predefined constant values, and may be dynamically changed. K is a Karman gain, and K increases as R decreases. From Equation (5), as K increases (R decreases), a correction amount of the state vector X increases, and thus P decreases.

[Expression 5]

$$K = PH^T(HPH^T + R)^{-1}$$

$$X = X + K(Z - HX)$$

$$P = (I - KH)P \quad (5)$$

In the present embodiment, under the condition that an azimuth angle calculated by using a detection result in the inertial measurement unit is the same as an azimuth angle of the inertial measurement unit 10 calculated by using GPS data, and the azimuth angle of the inertial measurement unit 10 calculated by using the GPS data is a true azimuth angle (reference azimuth angle), the error estimation portion 230 uses a difference between an azimuth angle calculated by using a detection result in the inertial measurement unit and an azimuth angle of the inertial measurement unit 10 calculated by using GPS data as the observation vector Z and applies the extended Karman filter thereto so as to estimate the state vector X.

Figure 7:
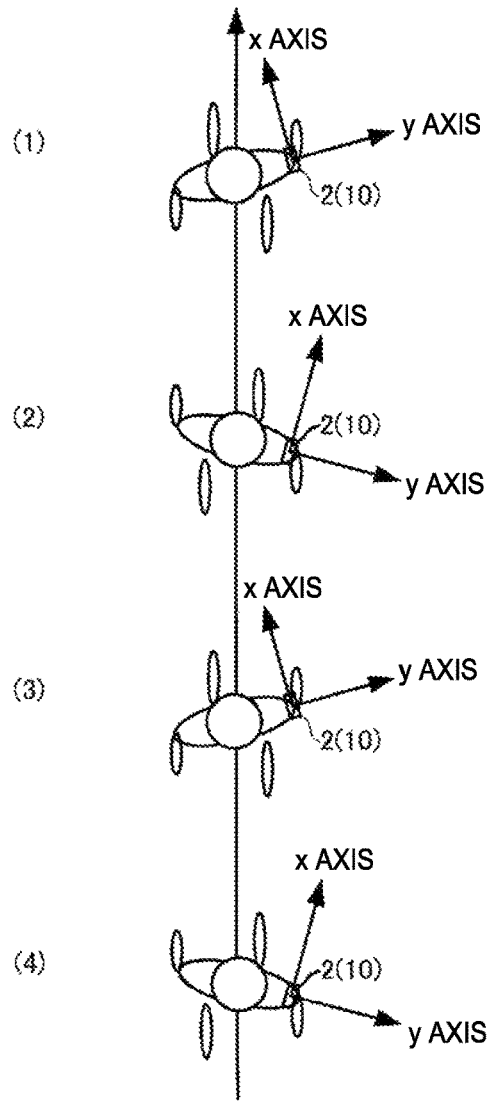
FIG. 7 is a diagram illustrating an attitude during a user's walking.

Meanwhile, in a case where the user performs a walking action (advances straight), an advancing direction is nearly constant, but an attitude of the inertial measurement unit 10 periodically changes according to motion of the user. FIG. 7 is an overhead view of movement of the user in a case where the user wearing the motion analysis apparatus 2 (IMU 10) on the user's right waist performs a walking action (advancing straight). As illustrated in FIG. 7, an attitude of the inertial measurement unit 10 relative to the user changes at any time due to the walking action of the user. In a state in which the user takes a step forward with the right foot, as illustrated in (2) or (4) of FIG. 7, the inertial measurement unit 10 is tilted to the right side with respect to the advancing direction (the x axis of the m frame). In contrast, in a state in which the user takes a step forward with the left foot, as illustrated in (1) or (3) of FIG. 7, the inertial measurement unit 10 is tilted to the left side with respect to the advancing direction (the x axis of the m frame).

Figure 8:
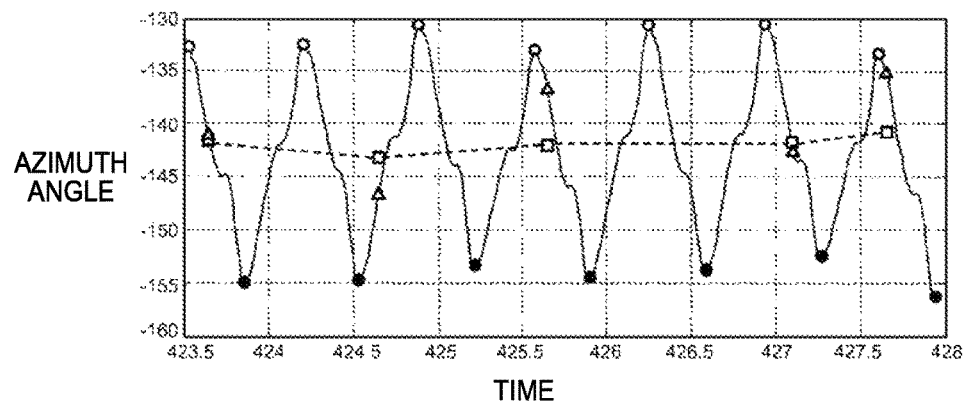
FIG. 8 is a diagram illustrating examples of an azimuth angle of an inertial measurement unit and an azimuth angle of an advancing direction in a case where the user performs a walking action (advances straight).

In other words, the azimuth angle of the inertial measurement unit 10 periodically changes every two steps including left and right steps due to the walking action of the user, and thus an azimuth angle calculated by using a detection result in the inertial measurement unit 10 also periodically changes. In contrast, an advancing direction of the user is substantially constant, and thus an azimuth angle calculated by using GPS data is also substantially constant. FIG. 8 is a diagram illustrating examples of an azimuth angle of the inertial measurement unit 10 and an azimuth angle of an advancing direction in a case where the user performs a walking action (advancing straight), in which a transverse axis expresses time, and a longitudinal axis expresses an azimuth angle. In FIG. 8, a solid line indicates an azimuth angle of the inertial measurement unit 10, and a dashed line indicates an azimuth angle of the advancing direction. As illustrated in FIG. 8, the azimuth angle of the inertial measurement unit 10 periodically changes every two steps. For example, the azimuth angle is the maximum (indicated by O) in a state in which the user takes a step forward with the right foot, and is the minimum (indicated by •) in a state in which the user takes a step forward with the left foot. On the other hand, since the azimuth angle of the advancing direction is substantially constant without greatly changing, an azimuth angle calculated by using GPS data is also substantially constant.

Therefore, in order to satisfy the above-described condition for estimating the state vector X, it is necessary to compute information regarding a difference between an azimuth angle of the inertial measurement unit and an azimuth angle of the advancing direction calculated by using GPS data, that is, a coordinate transformation matrix $C_m^b$ between the b frame and the m frame. However, as illustrated in FIG. 8, a timing for obtaining GPS data is irregular, and thus a difference between an azimuth angle (indicated by the triangular mark) of the inertial measurement unit 10 and an azimuth angle (indicated by the square mark) calculated by using the GPS data is not constant at a timing at which the GPS data is obtained. Therefore, the coordinate transformation matrix $C_m^b$ is required to be calculated whenever the GPS data is obtained in order to perform error estimation using the extended Karman filter at the timing at which the GPS data is obtained, and thus there is a problem in that a processing load increases.

Therefore, in the present embodiment, the coordinate transformation matrix $C_m^b$ is computed only once at a predetermined timing in a walking cycle by using the fact that an azimuth angle of the inertial measurement unit 10 periodically changes every two steps according to the user's walking motion, and, thereafter, a reference azimuth angle is calculated by using the coordinate transformation matrix $C_m^b$ at the next predetermined timing (the same timing as the time at which the coordinate transformation matrix $C_m^b$ has been computed) in the walking cycle whenever GPS data is obtained, so that the state vector X is estimated. In the above-described manner, it is not necessary to compute the coordinate transformation matrix $C_m^b$ again whenever GPS data is obtained, and thus it is possible to considerably reduce a processing load.

In a case where the user changes an advancing direction between the timing at which GPS data is obtained and the next predetermined timing in the waking cycle, a difference between a GPS azimuth angle and an azimuth angle of the inertial measurement unit differs from the time when the coordinate transformation matrix has been calculated. Thus, if the reference azimuth angle calculated by using the most recently obtained GPS data is used at the predetermined timing, there is a concern that estimation accuracy of the state vector X may be considerably reduced. Therefore, in the present embodiment, it is determined whether or not the user advances straight, and, in a case where the user changes an advancing direction between the timing at which GPS data has been obtained and the next predetermined timing in the waking cycle, estimation of the state vector X is not performed at the predetermined timing.

Figure 9:
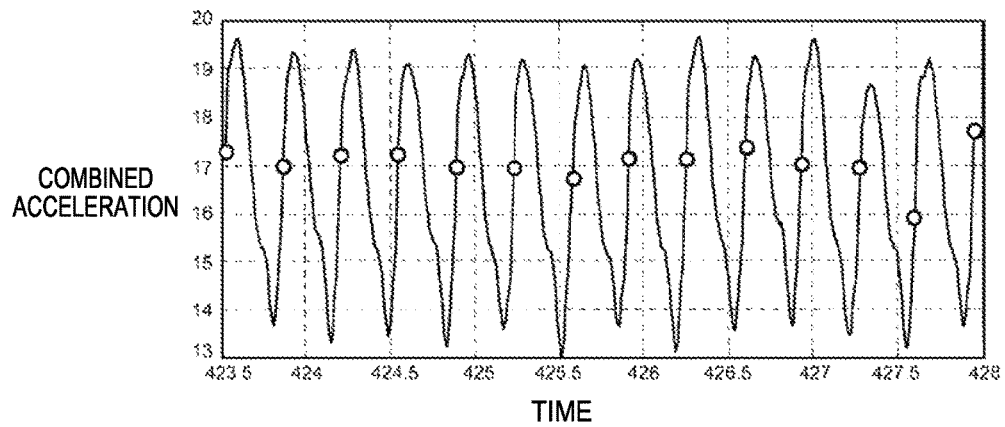
FIG. 9 is a diagram illustrating an example of a combined acceleration of three-axis accelerations detected by the inertial measurement unit during the user's walking.

Referring to FIG. 6 again, the walking detection portion 240 performs a process of detecting a cycle of two steps (including left and right steps) as a walking cycle (walking timing) by using a detection result (specifically, sensing data corrected by the bias removing portion 210) in the inertial measurement unit 10. FIG. 9 is a diagram illustrating an example of a combined acceleration of three-axis accelerations detected by the inertial measurement unit 10 during the user's walking. In FIG. 9, a transverse axis expresses time, and a longitudinal axis expresses a value of the combined acceleration. As illustrated in FIG. 9, the combined acceleration periodically changes, and an intermediate timing between the minimum value and the maximum value of the combined acceleration matches the timing at which the azimuth angle in FIG. 8 becomes the maximum or the minimum. Therefore, for example, in a case where a difference (amplitude) of the maximum value and the minimum value of the combined acceleration is equal to or more than a threshold value, the walking detection portion 240 can detect a walking cycle every other time at timings at which an intermediate value between the minimum value and the maximum value of the combined acceleration is obtained. For example, the walking detection portion 240 may preserve an intermediate value obtained at the time at which the combined acceleration has most recently changed from the minimum value to the maximum value (or from the maximum value to the minimum value), and may detect a walking cycle every other time whenever the intermediate value is exceeded (O in FIG. 9).

The straight-advancing determination portion 250 performs a process of determining whether or not the user is advancing straight. For example, the straight-advancing determination portion 250 may determine straight advancing on the basis of whether or not a change in a direction of the acceleration corrected by the bias removing portion 210 is within a predetermined range, and may determine straight advancing on the basis of a change in a direction of a velocity or a change in an attitude angle calculated by the integral processing portion 220.

The coordinate transformation matrix calculation portion 260 performs a process of calculating the coordinate transformation matrix $C_m^b$ between the b frame (an example of a first coordinate system) and the m frame (an example of a second coordinate system) at a predetermined timing in the walking cycle of the user, and of storing the calculated coordinate transformation matrix $C_m^b$ in the storage unit 30 as the coordinate transformation matrix 340 in FIG. 2. Here, the predetermined timing is a timing at which a detection result in the inertial measurement unit 10 satisfies a predetermined condition, and, specifically, a timing at which the walking detection portion 240 detects a walking cycle. In the present embodiment, the coordinate transformation matrix calculation portion 260 removes the gravitational acceleration from the detection result (specifically, the acceleration corrected by the bias removing portion 210) in the inertial measurement unit 10, and integrates a removal result so as to calculate the user's velocity Vb=(Vbx,Vby,Vbz) in the advancing direction of the user in the b frame. The coordinate transformation matrix calculation portion 260 calculates the coordinate transformation matrix $C_m^b$ as follows on the basis of the calculated velocity Vb.

A relationship between the velocity Vb=(Vbx,Vby,Vbz) in the b frame and the velocity Vm=(Vmx,Vmy,Vmz) in the m frame is expressed as in Equation (6) by using the coordinate transformation matrix $C_m^b$. Since the user is walking straight, Vmy=Vmz=0 is set in Equation (6).

[Expression 6]

$$\begin{bmatrix} Vbx \\ Vby \\ Vbz \end{bmatrix} = C_m^b \begin{bmatrix} Vmx \\ 0 \\ 0 \end{bmatrix} \quad (6)$$

A roll angle $\phi_{bm}$, a pitch angle $\theta_{bm}$, and a yaw angle $\psi_{bm}$ of the inertial measurement unit 10 in the m frame are expressed as in Equation (7) on the basis of Equation (6). In the present embodiment, the roll angle $\phi_{bm}$ is not calculated, and a change in the roll angle $\phi_{bm}$ is sufficiently smaller than a change in the yaw angle $\psi_{bm}$, and thus the roll angle $\phi_{bm}$ is approximate to 0 in Equation (7).

[Expression 7]

$$\phi_{bm} = 0 \quad (7)$$

$$\theta_{bm} = a\tan\left(\frac{-Vb_s}{\sqrt{Vb_s^2 + Vb_y^2}}\right)$$

$$\varphi_{bm} = a\tan2(Vb_y, Vb_x)$$

The coordinate transformation matrix $C_m^b$ may be calculated according to Equation (8) by using the roll angle $\phi_{bm}$, the pitch angle $\theta_{bm}$, and the yaw angle $\psi_{bm}$ in Equation (7). In Equation (8), $R_z(-\psi_{bm})$ is a rotation matrix which rotates by $-\psi_{bm}$ about the z axis. $R_y(-\theta_{bm})$ is a rotation matrix which rotates by $-\theta_{bm}$ about the y axis. $R_x(-\phi_{bm})$ is a rotation matrix which rotates by $-\phi_{bm}$ about the x axis.

[Expression 8]

$$C_m^b = (C_b^m)^T = R_z(-\varphi_{bm}) \cdot R_y(-\theta_{bm}) \cdot R_x(-\phi_{bm}) \quad (8)$$

$$= \begin{pmatrix} \cos\varphi_{bm} & -\sin\varphi_{bm} & 0 \\ \sin\varphi_{bm} & \cos\varphi_{bm} & 0 \\ 0 & 0 & 1 \end{pmatrix} \begin{pmatrix} \cos\theta_{bm} & 0 & \sin\theta_{bm} \\ 0 & 1 & 0 \\ -\sin\theta_{bm} & 0 & \cos\theta_{bm} \end{pmatrix}$$

$$\begin{pmatrix} 1 & 0 & 0 \\ 0 & \cos\phi_{bm} & -\sin\phi_{bm} \\ 0 & \sin\phi_{bm} & \cos\phi_{bm} \end{pmatrix}$$

$$= \begin{pmatrix} \cos\theta_{bm} \cdot \cos\varphi_{bm} & -\cos\phi_{bm} \cdot \sin\varphi_{bm} + \sin\phi_{bm} \cdot \sin\theta_{bm} \cdot \cos\varphi_{bm} & \sin\phi_{bm} \cdot \sin\varphi_{bm} + \cos\phi_{bm} \cdot \sin\theta_{bm} \cdot \cos\varphi_{bm} \\ \cos\theta_{bm} \cdot \sin\varphi_{bm} & \cos\phi_{bm} \cdot \cos\varphi_{bm} + \sin\phi_{bm} \cdot \sin\theta_{bm} \cdot \sin\varphi_{bm} & -\sin\phi_{bm} \cdot \cos\varphi_{bm} + \cos\phi_{bm} \cdot \sin\theta_{bm} \cdot \sin\varphi_{bm} \\ -\sin\theta_{bm} & \sin\phi_{bm} \cdot \cos\theta_{bm} & \cos\phi_{bm} \cdot \cos\theta_{bm} \end{pmatrix}$$

In the present embodiment, the coordinate transformation matrix calculation portion 260 calculates the coordinate transformation matrix $C_m^b$ by using a detection result in the inertial measurement unit 10 in a predetermined time period after the user starts walking. Here, the predetermined time period is, for example, a time period in which the user takes several steps forward. The coordinate transformation matrix calculation portion 260 calculates the velocity Vb at any timing at which the walking detection portion 240 detects a walking cycle in the several steps after the user starts walking, so as to calculate the coordinate transformation matrix $C_m^b$ which is then stored in the storage unit 30. In the above-described manner, it is possible to prevent the accuracy of the velocity Vb from being reduced due to repetition of integration of acceleration and thus it is also possible to increase the reliability of the coordinate transformation matrix $C_m^b$.

In a case where GPS data (a detection result in the GPS unit 50) is obtained (updated), the azimuth angle transformation portion 270 converts an azimuth angle (an azimuth angle calculated by using the GPS data) of the user based on the GPS data so as to generate a reference azimuth angle by using the coordinate transformation matrix $C_m^b$ stored as the coordinate transformation matrix 340 in the storage unit 30. Specifically, first, the azimuth angle transformation portion 270 calculates an azimuth angle of the advancing direction of the user by using the GPS data. For example, the azimuth angle transformation portion 270 may calculate the azimuth angle of the advancing direction on the basis of a direction of a velocity included in the GPS data, and may calculate the azimuth angle of the advancing direction on the basis of two positions included in two GPS data items. In a case where information regarding an azimuth angle is included in the GPS data, the azimuth angle may be used as the azimuth angle of the advancing direction.

If the azimuth angle calculated by using the GPS data is indicated by gpsYaw($\psi_{nm}$), next, the azimuth angle transformation portion 270 calculates a coordinate transformation matrix $C_n^m$ from the n frame into the m frame according to Equation (9).

[Expression 9]

$$C_n^m = \begin{pmatrix} \cos\varphi_{nm} & \sin\varphi_{nm} & 0 \\ -\sin\varphi_{nm} & \cos\varphi_{nm} & 0 \\ 0 & 0 & 1 \end{pmatrix} \quad (9)$$

Next, the azimuth angle transformation portion 270 calculates a coordinate transformation matrix $C_n^b$ from the n frame into the b frame according to Equation (10) on the basis of the coordinate transformation matrix $C_m^b$ stored in the storage unit 30 and the coordinate transformation matrix $C_n^m$ calculated by using Equation (9).

[Expression 10]

$$C_n^b = C_m^b \cdot C_n^m \qquad (10)$$

The azimuth angle transformation portion 270 calculates a reference azimuth angle gpsYaw($\psi_{nb}$) according to Equation (11) on the basis of a transposed matrix $C_b^n$ of the coordinate transformation matrix $C_n^b$ calculated according to Equation (10).

[Expression 11]

$$\text{gpsYaw}(\varphi_{nb}) = a\tan 2(C_b^n(2,1), C_b^n(1,1)) \qquad (11)$$

The error estimation portion 230 estimates the state vector X by using the extended Karman filter at a timing at which the walking detection portion 240 detects a walking cycle (specifically, a timing at which a walking cycle is detected next) after the timing at which the GPS data is obtained (a timing at which the azimuth angle transformation portion 270 calculates the reference azimuth angle). However, in a case where the straight-advancing determination portion 250 determines that the user does not advance straight between the timing at which the GPS data is obtained and the timing at which the walking detection portion 240 detects a walking cycle next, the error estimation portion 230 does not perform estimation of the state vector X using the extended Karman filter at the timing at which the walking cycle is detected. In this case, since a reference azimuth angle is useless even if the reference azimuth angle is calculated, the azimuth angle transformation portion 270 may perform a process of calculating a reference azimuth angle only in a case where the straight-advancing determination portion 250 determines that the user advances straight between the timing at which the GPS data is obtained and the timing at which the walking detection portion 240 detects a walking cycle next.

The error estimation portion 230 calculates the observation vector Z and the observation matrix H as follows, for example. First, the error estimation portion 230 calculates a coordinate transformation matrix $c_b^n$ (rotation matrix) from the b frame into the n frame on the basis of the coordinate transformation matrix (rotation matrix) $C_b^e$ from the b frame into the e frame, calculated by the integral processing portion 220, according to Equation (12). In Equation (12), $C_e^n$ indicates a coordinate transformation matrix from the e frame into the n frame, and is thus known. In addition, $E^\varepsilon$ indicates an alternative matrix of an attitude error in the e frame, and is expressed as in Equation (13).

[Expression 12]

$$\hat{C}_b^n = C_\varepsilon^n \cdot \hat{C}_b^e = C_e^n \cdot (I - E^\varepsilon) C_b^e \qquad (12)$$

[Expression 13]

$$E^\varepsilon = (\varepsilon^e x) = \begin{pmatrix} 0 & -\varepsilon_z & \varepsilon_y \\ \varepsilon_z & 0 & -\varepsilon_x \\ -\varepsilon_y & \varepsilon_x & 0 \end{pmatrix} \qquad (13)$$

Next, the error estimation portion 230 computes an azimuth angle insYaw($\psi_{nb}$) in the n frame of the inertial measurement unit 10 according to Equation (14) on the basis of the coordinate transformation matrix (rotation matrix) $C_b^n$ computed according to Equation (12).

[Expression 14]

$$\hat{\varphi} = \text{insYaw}(\varphi_{nb}) = \tan^{-1}\left(\frac{\hat{C}_b^n(2,1)}{\hat{C}_b^n(1,1)}\right) \qquad (14)$$

If Equation (14) is developed, and $C_b^n(2,1)$ and $C_b^n(1,1)$ are expressed by a misalignment error ($\varepsilon_x, \varepsilon_y, \varepsilon_z$), insYaw ($\psi_{nb}$) is expressed as in Equation (15). Here, $n_1$, $n_2$, $n_3$, $d_1$, $d_2$, and $d_3$ in Equation (15) are computed according to Equation (16).

[Expression 15]

$$\hat{\varphi} = \text{insYaw}(\varphi_{nb}) = \tan^{-1}\left(\frac{n_1\varepsilon_x + n_2\varepsilon_y + n_3\varepsilon_y + n_4}{d_1\varepsilon_x + d_2\varepsilon_y + d_3\varepsilon_y + d_4}\right) \qquad (15)$$

[Expression 16]

$$\begin{aligned}
n_1 &= C_e^n(2,2) \cdot C_b^e(3,1) - C_e^n(2,3) \cdot C_b^e(2,1) \\
n_2 &= C_e^n(2,3) \cdot C_b^e(1,1) - C_e^n(2,1) \cdot C_b^e(3,1) \\
n_3 &= C_e^n(2,1) \cdot C_b^e(2,1) - C_e^n(2,2) \cdot C_b^e(1,1) \\
d_1 &= C_e^n(1,2) \cdot C_b^e(3,1) - C_e^n(1,3) \cdot C_b^e(2,1) \\
d_2 &= C_e^n(1,3) \cdot C_b^e(1,1) - C_e^n(1,1) \cdot C_b^e(3,1) \\
d_3 &= C_e^n(1,1) \cdot C_b^e(2,1) - C_e^n(1,3) \cdot C_b^e(1,1)
\end{aligned} \qquad (16)$$

The error estimation portion 230 calculates the observation vector Z and the observation matrix H according to Equation (17) by using insYaw($\psi_{nb}$) and the reference azimuth angle gpsYaw($\psi_{nb}$). In Equation (17), $O_{1,3}$ is a zero matrix of one row and three columns, and $O_{1,9}$ is a zero matrix of one row and nine columns. Each partial differentiation in Equation (17) is computed as in Equation (18).

[Expression 17]

$$Z = \text{insYaw}(\varphi_{nb}) - \text{gpsYaw}(\varphi_{nb}) \qquad (17)$$

$$H = \begin{bmatrix} O_{1,3} & \frac{\partial \hat{\varphi}}{\partial \varepsilon_x} & \frac{\partial \hat{\varphi}}{\partial \varepsilon_y} & \frac{\partial \hat{\varphi}}{\partial \varepsilon_z} & O_{1,9} \end{bmatrix}$$

[Expression 18]

$$\frac{\partial \hat{\varphi}}{\partial \varepsilon_x} = \frac{n_1 \cdot \hat{C}_b^n(1,1) - d_1 \cdot \hat{C}_b^n(2,1)}{\hat{C}_b^n(2,1)^2 + \hat{C}_b^n(1,1)^2} \qquad (18)$$

$$\frac{\partial \hat{\varphi}}{\partial \varepsilon_y} = \frac{n_2 \cdot \hat{C}_b^n(1,1) - d_2 \cdot \hat{C}_b^n(2,1)}{\hat{C}_b^n(2,1)^2 + \hat{C}_b^n(1,1)^2}$$

$$\frac{\partial \hat{\varphi}}{\partial \varepsilon_z} = \frac{n_3 \cdot \hat{C}_b^n(1,1) - d_3 \cdot \hat{C}_b^n(2,1)}{\hat{C}_b^n(2,1)^2 + \hat{C}_b^n(1,1)^2}$$

The coordinate transformation portion 280 performs a coordinate transformation process of converting the accelerations and the angular velocities of the b frame corrected by the bias removing portion 210 into accelerations and angular velocities of the m frame, respectively, by using the coordinate transformation information (coordinate transformation matrix $C_b^m$) from the b frame into the m frame, calculated by the integral processing portion 220. The coordinate transformation portion 280 performs a coordinate transformation process of converting the velocities, the position, and the attitude angles of the e frame calculated by the integral processing portion 220 into velocities, a position, and attitude angles of the m frame, respectively, by using the coordinate transformation information (coordinate transformation matrix $C_e^m$) from the e frame into the m frame, calculated by the integral processing portion 220.

The motion analysis portion 290 performs a process of various calculations by using the accelerations, the angular velocities, the velocities, the position, and the attitude angles of the m frame obtained through coordinate transformation in the coordinate transformation portion 280, so as to analyze the user's motion and to generate the motion analysis information 350. In the present embodiment, the motion analysis portion 290 generates the motion analysis information 350 including information regarding movement such as a movement path, a movement velocity, and a movement time in the user's walking, information regarding an evaluation index of walking motion such as the extent of forward tilt, a difference between left and right motions, propulsion efficiency, an amount of energy consumption, and energy efficiency, information regarding advice or an instruction for better walking, warning information (information for causing the display apparatus 3 to output warning display or warning sound) indicating that an attitude is bad, and the like.

The processing unit 20 transmits the motion analysis information 350 to the display apparatus 3, and the motion analysis information 350 is displayed on the display unit 170 of the display apparatus 3 as text, images, graphics, or the like, or is output as voice or a buzzer sound from the sound output unit 180. Fundamentally, the motion analysis information 350 is displayed on the display unit 170, and thus the user can view the display unit 170 and check the motion analysis information when the user wants to know the motion analysis information. Information (warning information) which is desired to attract the user's attention is output as at least sound, and thus the user is not required to walk while normally viewing the display unit 170.

4. Procedure of Process

FIG. 10 is a flowchart illustrating examples (an example of a motion analysis method) of procedures of the motion analysis process performed by the processing unit 20. The processing unit 20 performs the motion analysis process according to the procedures of the flowchart illustrated in FIG. 10 by executing the motion analysis program 300 stored in the storage unit 30.

As illustrated in FIG. 10, if a command for starting measurement has been received (Y in step S1), first, the processing unit 20 computes an initial attitude, an initial position, and an initial bias by using sensing data and GPS data measured by the inertial measurement unit 10 assuming that the user stands still (step S2).

Next, the processing unit 20 acquires the sensing data from the inertial measurement unit 10, and adds the acquired sensing data to the sensing data table 310 (step S3).

Next, the processing unit 20 removes biases from acceleration and angular velocity included in the sensing data acquired in step S3 by using the initial bias (by using the acceleration bias $b_a$ and an angular velocity bias $b_\omega$ after the acceleration bias $b_a$ and the angular velocity bias $b_\omega$ are estimated in step S17) so as to correct the acceleration and the angular velocity, and updates the sensing data table 310 by using the corrected acceleration and angular velocity (step S4).

Next, the processing unit 20 integrates the sensing data corrected in step S4 so as to compute a velocity, a position, and an attitude angle, and adds calculated data including the computed velocity, position, and attitude angle to the calculated data table 330 (step S5).

Next, in a case where GPS data has been updated (Y in step S6), the processing unit 20 calculates an azimuth angle gpsYaw($\psi_{nm}$) of the advancing direction on the basis of the GPS data (step S7), and sets a correction valid flag to an ON state (step S8). On the other hand, in a case where GPS data has not been updated (N in step S6), the processing unit 20 does not perform the processes in steps S7 and S8.

Next, the processing unit 20 performs walking detection (step S9), and performs straight-advancing determination (step S12) if the coordinate transformation matrix $C_m^b$ has been created (calculated) (Y in step S11) in a case where a walking cycle has been detected (Y in step S10).

In a case where it is determined that the straight-advancing is not performed (N in step S13), the processing unit 20 sets the correction valid flag to an OFF state (step S14).

Next, if the correction valid flag is set to an ON state (Y in step S15), the processing unit 20 calculates the reference azimuth angle gpsYaw($\psi_{nb}$) by using the coordinate transformation matrix $C_m^b$ (step S16).

Next, the processing unit 20 performs an error estimation process by using the reference azimuth angle gpsYaw($\psi_{nb}$) calculated in step S16 (step S17), so as to estimate a velocity error $\delta v^e$, an attitude angle error $\varepsilon^e$, an acceleration bias $b_a$, an angular velocity bias $b_\omega$, and a position error $\delta p^e$.

Next, the processing unit 20 corrects the velocity, the position, and the attitude angle by using the velocity error $\delta v^e$, the attitude angle error $\varepsilon^e$, and the position error $\delta p^e$ estimated in step S17, and updates the calculated data table 330 by using the corrected velocity, position, and the attitude angle (step S18).

In a case where a walking cycle has not been detected (N in step S10), the processing unit 20 does not perform the processes in steps S11 to S18.

Next, the processing unit 20 performs coordinate transformation of the sensing data (the acceleration and the angular velocity of the b frame) stored in the sensing data table 310 and the calculated data (the velocity, the position, and the attitude angle of the e frame) stored in the calculated data table 330 into acceleration, angular velocity, velocity, a position, and an attitude angle of the m frame (step S20). The processing unit 20 stores the acceleration, the angular velocity, the velocity, the position, and the attitude angle of the m frame in the storage unit 30 in a time series.

In a case where the correction valid flag is not set to an ON state in step S15 (N in step S15), the processing unit 20 does not perform the processes in steps S16 to S18, and performs a process in step S20. In a case where the coordinate transformation matrix $C_m^b$ has not been created (calculated) in step S11 (N in step S11), the processing unit 20 creates (calculates) the coordinate transformation matrix $C_m^b$ (step S19), and performs the process in step S20.

Next, the processing unit 20 analyzes the user's motion in real time by using the acceleration, the angular velocity, the velocity, the position, and the attitude angle of the m frame obtained through the coordinate transformation in step S20, so as to generate motion analysis information (step S21).

Next, the processing unit 20 transmits the motion analysis information generated in step S21 to the display apparatus 3 (step S22). The motion analysis information transmitted to the display apparatus 3 is fed back in real time during the user's walking. In the present specification, the "real time" indicates that processing is started at a timing at which processing target information is acquired. Therefore, the "real time" also includes some time difference between acquisition of information and completion of processing of the information.

The processing unit 20 repeatedly performs the processes in step S3 and the subsequent steps whenever the sampling cycle Δt elapses (Y in step S23) from the acquisition of the previous sensing data until a command for finishing the measurement has been received (N in step S23 and N in step S24). If the command for finishing the measurement has been received (Y in step S24), the processing unit analyzes motion performed by the user by using the acceleration, the angular velocity, the velocity, the position, and the attitude angle of the m frame which are obtained through the coordinate transformation in step S20 and are stored in a time series, or the analysis result in step S21, so as to generate motion analysis information (step S25). If the command for finishing the measurement has been received, in step S25, the processing unit 20 may immediately perform the motion analysis process, and may perform the motion analysis process in a case where a motion analysis command has been received through a user's operation. The processing unit 20 may transmit the motion analysis information generated in step S25 to the display apparatus 3, may transmit the motion analysis information to an apparatus such as a personal computer or a smart phone, and may record the motion analysis information in a memory card.

In FIG. 10, if a command for starting measurement has not been received (N in step S1), the processing unit 20 does not perform the processes in steps S1 to S25, but may perform the process in step S25 by using the acceleration, the angular velocity, the velocity, the position, and the attitude angle of the m frame stored in the past, or the analysis result in step S21.

Figure 11:
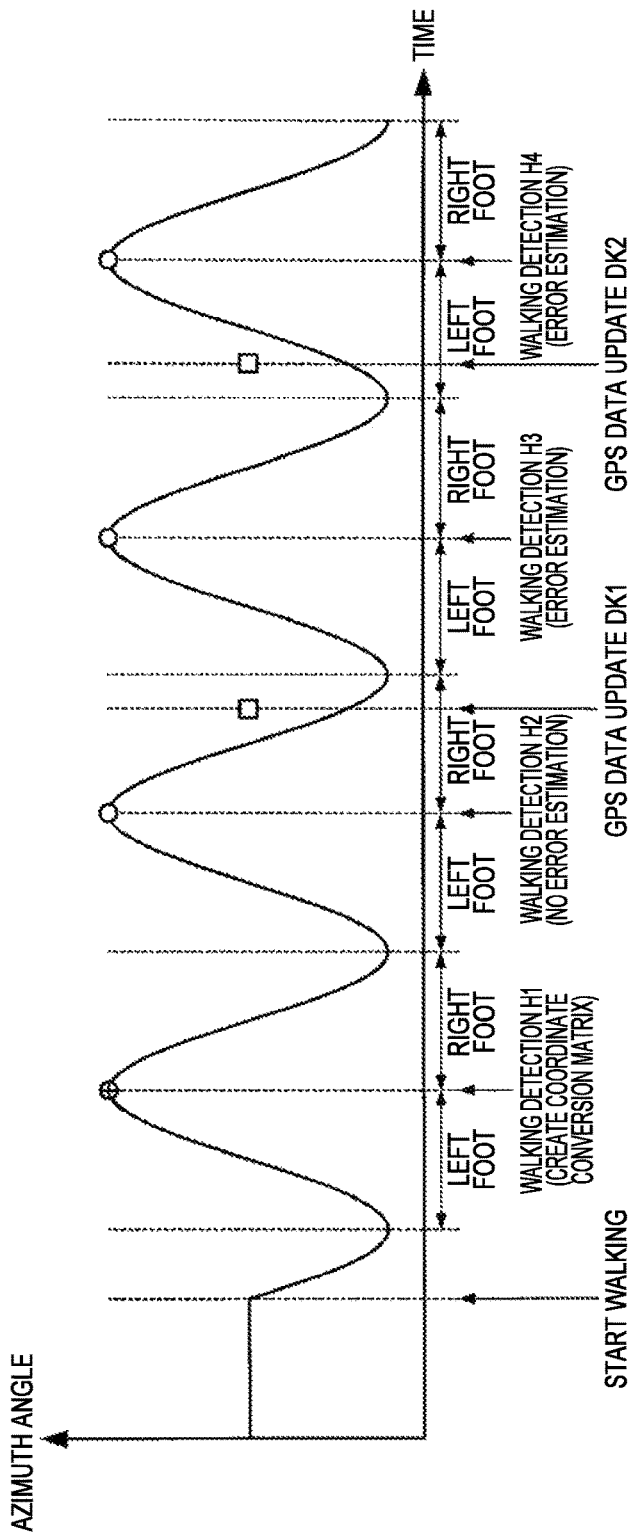
FIG. 11 is a diagram illustrating an example of a relationship between an azimuth angle of the inertial measurement unit and a timing of processing performed by the processing unit in a case where the user is walking straight.

FIG. 11 is a diagram illustrating an example of a relationship between an azimuth angle of the inertial measurement unit 10 and a timing of a process performed by the processing unit 20 in a case where the user is walking straight, in which a transverse axis expresses time, and a longitudinal axis expresses an azimuth angle. In FIG. 11, an azimuth angle insYaw($\psi_{nb}$) of the inertial measurement unit 10 when a walking cycle is detected is indicated by a circular mark, and an azimuth angle gpsYaw($\psi_{nm}$) of the advancing direction calculated by using GPS data is indicated by a square mark.

In FIG. 11, the coordinate transformation matrix calculation portion 260 creates (calculates) the coordinate transformation matrix $C_m^b$ at a timing (walking detection H1) at which the walking detection portion 240 initially detects a walking cycle after the user starts walking. In FIG. 11, the azimuth angle insYaw($\psi_{nb}$) of the inertial measurement unit 10 when the coordinate transformation matrix $C_m^b$ is calculated is indicated by "+". At a timing (walking detection H2) at which the walking detection portion 240 detects a walking cycle next, GPS data is not updated between the walking detection H1 and the walking detection H2, and thus the error estimation portion 230 does not perform an estimation process of the state vector X (that is, the velocity, the position, the attitude angle, the acceleration bias, and the angular velocity bias are not corrected). At a timing (walking detection H3) at which the walking detection portion 240 detects a walking cycle next, GPS data is updated between the walking detection H2 and the walking detection H3, and the advancing direction does not change between the update timing of the GPS data (GPS data update DK1) and the walking detection H3. Thus, the error estimation portion 230 performs an estimation process of the state vector X.

Similarly, at a timing (walking detection H4) at which the walking detection portion 240 detects a walking cycle next, GPS data is updated between the walking detection H3 and the walking detection H4, and the advancing direction does not change between the update timing of the GPS data (GPS data update DK2) and the walking detection H4. Thus, the error estimation portion 230 performs an estimation process of the state vector X. A difference between the azimuth angle insYaw($\psi_{nb}$) of the inertial measurement unit 10 at the walking detection H3 and the walking detection H4 and the azimuth angle gpsYaw($\psi_{nm}$) of the advancing direction at the GPS data update DK1 (or the GPS data update DK2) is substantially the same as a difference between the azimuth angles at the walking detection H1 at which the coordinate transformation matrix $C_m^b$ has been calculated, and thus it is not necessary to calculate the coordinate transformation matrix $C_m^b$ again.

If the user changes the advancing direction between the GPS data update DK1 and the walking detection H3 (or between the GPS data update DK2 and the walking detection H4), a difference between the azimuth angle insYaw($\psi_{nb}$) of the inertial measurement unit 10 at the walking detection H3 (or the walking detection H4) and the azimuth angle gpsYaw($\psi_{nm}$) of the advancing direction at the GPS data update DK1 (or the GPS data update DK2) is not the same as a difference between the azimuth angles at the walking detection H1 at which the coordinate transformation matrix $C_m^b$ has been calculated. Thus, in this case, the error estimation portion 230 does not perform an estimation process of the state vector X at the walking detection H3 (or the walking detection H4). However, since an azimuth angle of the inertial measurement unit 10 swings to be substantially laterally symmetrical with respect to the advancing direction, a difference between the azimuth angle of the inertial measurement unit 10 and the azimuth angle of the advancing direction does not change before and after the advancing direction is changed even in a case where the user changes the advancing direction. Therefore, if the user advances straight again after changing the advancing direction, it is possible to perform an estimation process of the state vector X without computing the coordinate transformation matrix $C_m^b$ again in the same manner as before the user changes the advancing direction, at a timing at which a walking cycle is detected next after GPS data is initially updated from starting of the straight-advancing.

5. Effects

As described above, in the present embodiment, the coordinate transformation matrix $C_m^b$ is calculated at a detection timing of a walking cycle by using the fact that a difference between an azimuth angle of the inertial measurement unit 10 and an azimuth angle of an advancing direction of the user is nearly constant at the timing at which the walking cycle of the user is detected, and, then, a difference between an azimuth angle based on a detection result in the inertial measurement unit 10 and an azimuth angle based on a detection result in the GPS unit 50 is made to be close to 0 by using the coordinate transformation matrix $C_m^b$ at the next detection timing of a walking cycle at which GPS data is obtained, and thus an error of an index indicating a state of the user is estimated. Therefore, according to the present embodiment, even if a timing for obtaining a detection result in the GPS unit 50 is irregular, it is possible to estimate an error with high accuracy, and also to reduce a processing load since the coordinate transformation matrix $C_m^b$ is not required to be calculated whenever the detection result in the GPS unit 50 is obtained.

According to the present embodiment, since the coordinate transformation matrix $C_m^b$ is calculated by using a detection result in the inertial measurement unit 10 in a predetermined time period (for example, a time period of several steps) from starting of the user's walking, it is possible to reduce an error of a coordinate transformation matrix caused by an integration error or the like and thus to improve error estimation accuracy.

According to the present embodiment, if the user changes an advancing direction from the time when a detection result in the GPS unit 50 is obtained to the next detection timing of a walking cycle, a difference between an azimuth angle based on a detection result in the inertial measurement unit 10 and an azimuth angle based on a detection result in the GPS unit 50 differs from that at the time when the coordinate transformation matrix $C_m^b$ is calculated, and, in this case, an error is not estimated by taking this into consideration. Thus, it is possible to suppress a reduction in error estimation accuracy.

According to the present embodiment, it is possible to correct information such as a velocity, a position, and an attitude angle of the user with high accuracy by using an error which is estimated with high accuracy. According to the present embodiment, it is possible to analyze the user's walking motion with high accuracy by using the information such as the velocity, the position, and the attitude angle which are corrected with high accuracy.

Second Embodiment

1. Outline of Motion Analysis System

A second embodiment of the present invention will be described in detail with reference to the drawings. In the present embodiment, the same constituent elements as those of the first embodiment are given the same reference numerals and may not be described or may be described briefly.

Figure 12:
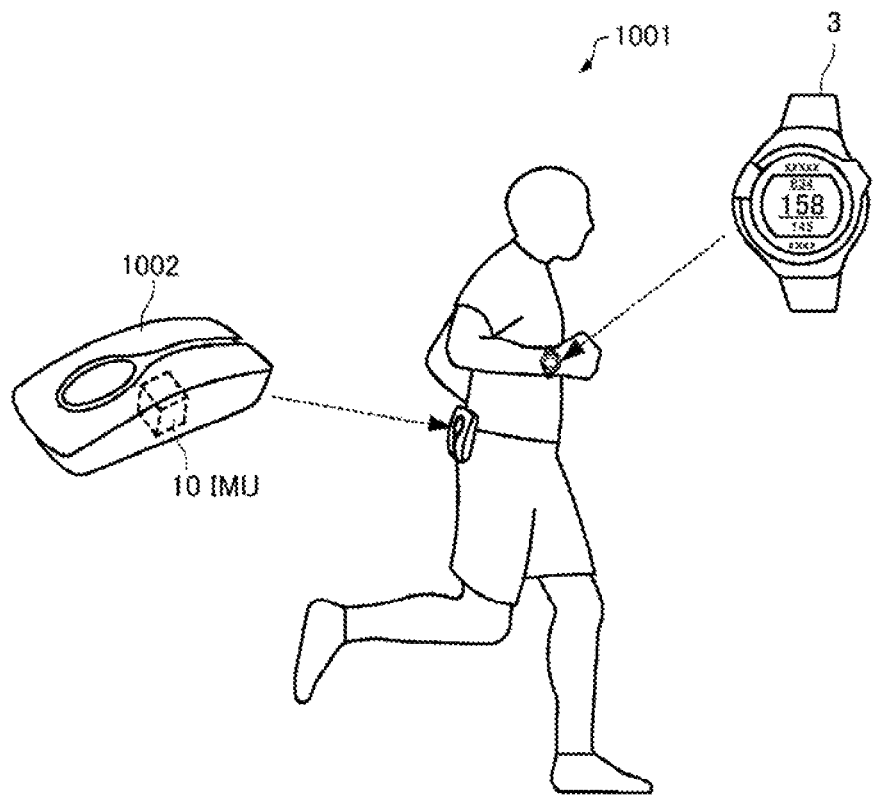
FIG. 12 is a diagram illustrating an outline of a motion analysis system according to a second embodiment.

FIG. 12 is a diagram for explaining an outline of a motion analysis system 1001 of the present embodiment. As illustrated in FIG. 12, the motion analysis system 1001 of the present embodiment includes a motion analysis apparatus 1002 and a display apparatus 3.

The motion analysis apparatus 1002 is mounted on a body part (for example, a right waist or a left waist) of a user (an example of a moving object). The motion analysis apparatus 1002 has an inertial measurement unit (IMU) 10 built thereinto, recognizes motion of the user in walking (including running), computes velocity, a position, attitude angles (a roll angle, a pitch angle, and a yaw angle), and the like, and analyzes a user's motion so as to generate motion analysis information. In the present embodiment, the motion analysis apparatus 1002 is mounted on the user so that one detection axis (hereinafter, referred to as a z axis) of the inertial measurement unit (IMU) 10 substantially matches the gravitational acceleration direction (vertically downward direction) in a state in which the user stands still. The motion analysis apparatus 1002 transmits the generated motion analysis information to the display apparatus 3.

The display apparatus 3 is a wrist type (wristwatch type) portable information apparatus and is mounted on a user's wrist or the like. However, the display apparatus 3 may be a portable information apparatus such as a head mounted display (HMD) or a smart phone. The user operates the display apparatus 3 so as to instruct the motion analysis apparatus 1002 to start or finish measurement. The display apparatus 3 transmits a command for instructing measurement to be started or finished, to the motion analysis apparatus 1002. If a command for starting measurement is received, the motion analysis apparatus 1002 causes the inertial measurement unit (IMU) 10 to start measurement, and analyzes the user's motion on the basis of a measurement result so as to generate motion analysis information. The motion analysis apparatus 1002 transmits the generated motion analysis information to the display apparatus 3. The display apparatus 3 receives the motion analysis information, and presents the received motion analysis information to the user in various forms such as text, graphics, and sound. The user can recognize the motion analysis information via the display apparatus 3.

Data communication between the motion analysis apparatus 1002 and the display apparatus 3 may be wireless communication or wired communication.

In the present embodiment, hereinafter, as an example, a detailed description will be made of a case where the motion analysis apparatus 1002 generates motion analysis information including a movement path, a movement time period, or the like by estimating a walking speed of the user, but the motion analysis system 1001 of the present embodiment is also applicable to a case where motion analysis information is generated in motions causing movement other than walking.

2. Coordinate System

Definition of coordinate systems necessary in the following description is the same as that in the first embodiment, and description thereof will not be repeated.

3. Configuration of Motion Analysis System

Figure 13:
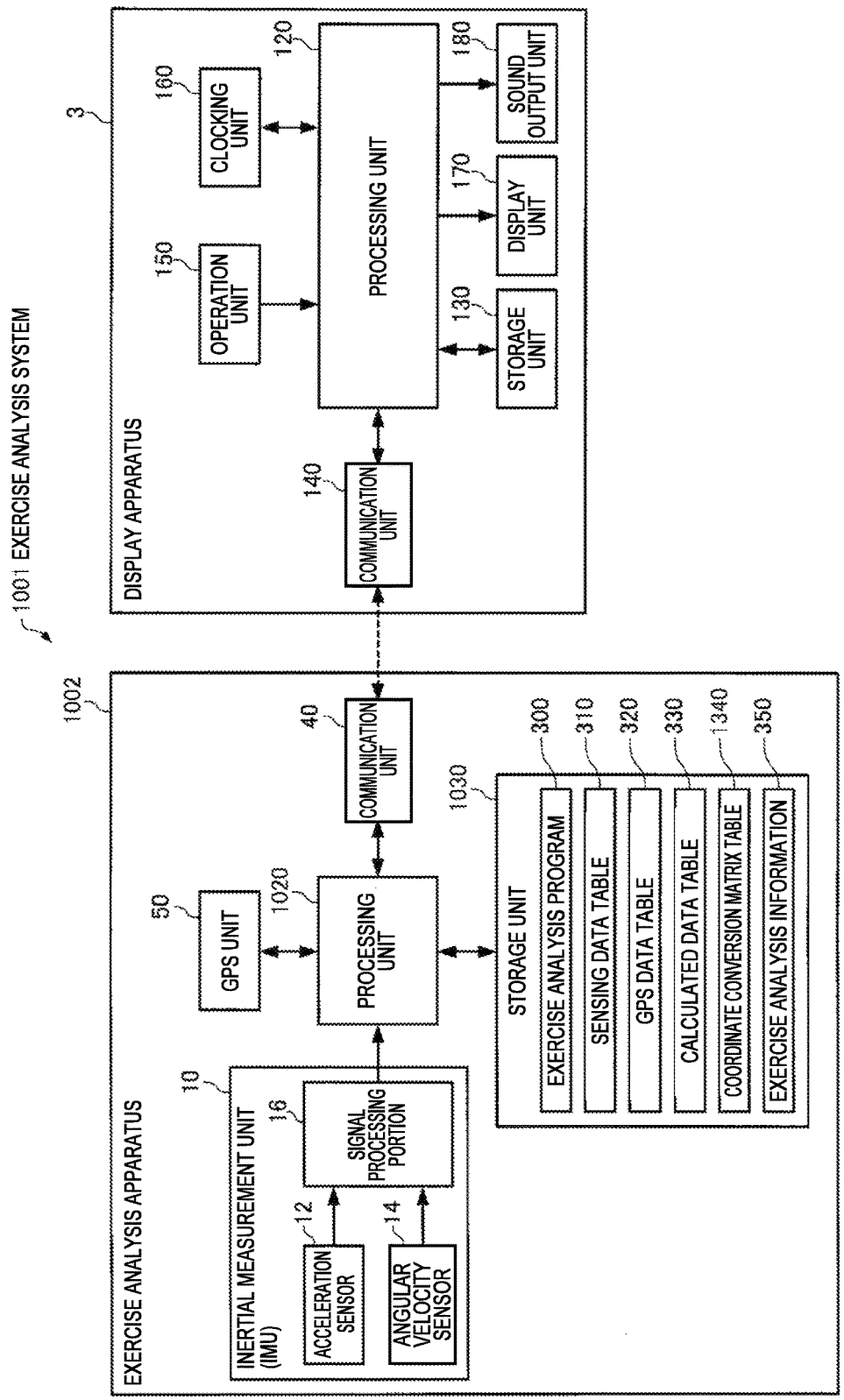
FIG. 13 is a functional block diagram illustrating configuration examples of a motion analysis apparatus and a display apparatus.

FIG. 13 is a functional block diagram illustrating configuration examples of the motion analysis apparatus 1002 and the display apparatus 3. As illustrated in FIG. 13, the motion analysis apparatus 1002 (an example of an error estimation apparatus) includes the inertial measurement unit (IMU) 10, a processing unit 1020, a storage unit 1030, a communication unit 40, and a GPS unit 50. However, the motion analysis apparatus 1002 of the present embodiment may have a configuration in which some of the constituent elements are deleted or changed, or other constituent elements may be added thereto.

The inertial measurement unit 10 (an example of a first sensor) includes an acceleration sensor 12, an angular velocity sensor 14, and a signal processing portion 16.

The acceleration sensor 12 detects respective accelerations in the three-axis directions which intersect each other (ideally, orthogonal to each other), and outputs a digital signal (acceleration data) corresponding to magnitudes and directions of the detected three-axis accelerations.

The angular velocity sensor 14 detects respective angular velocities in the three-axis directions which intersect each other (ideally, orthogonal to each other), and outputs a digital signal (angular velocity data) corresponding to magnitudes and directions of the detected three-axis angular velocities.

The signal processing portion 16 receives the acceleration data and the angular velocity data from the acceleration sensor 12 and the angular velocity sensor 14, respectively, adds time information thereto, stores the data items and the time information in a storage unit (not illustrated), generates sensing data in which the stored acceleration data, angular velocity data and time information conform to a predetermined format, and outputs the sensing data to the processing unit 1020.

The acceleration sensor 12 and the angular velocity sensor 14 are ideally installed so as to match three axes of a sensor coordinate system (b frame) with the inertial measurement unit 10 as a reference, but, in practice, an error occurs in an installation angle. Therefore, the signal processing portion

16 performs a process of converting the acceleration data and the angular velocity data into data of the sensor coordinate system (b frame) by using a correction parameter which is calculated in advance according to the installation angle error. Instead of the signal processing portion 16, the processing unit 1020 which will be described later may perform the process.

The signal processing portion 16 may perform a temperature correction process on the acceleration sensor 12 and the angular velocity sensor 14. Instead of the signal processing portion 16, the processing unit 1020 to be described later may perform the temperature correction process, and a temperature correction function may be incorporated into the acceleration sensor 12 and the angular velocity sensor 14.

The acceleration sensor 12 and the angular velocity sensor 14 may output analog signals, and, in this case, the signal processing portion 16 may A/D convert an output signal from the acceleration sensor 12 and an output signal from the angular velocity sensor 14 so as to generate sensing data.

The GPS unit 50 (an example of a second sensor) receives a GPS satellite signal which is transmitted from a GPS satellite which is one type of positioning satellite, performs positioning computation by using the GPS satellite signal so as to calculate a position and velocity (which is a vector including a magnitude and a direction) of the user in n frames, and outputs GPS data in which time information or positioning accuracy information is added to the calculated results to the processing unit 1020. A method of calculating a position or velocity or a method of generating time information by using GPS is well known, and thus detailed description thereof will be omitted.

The processing unit 1020 is constituted of, for example, a central processing unit (CPU), a digital signal processor (DSP), or an application specific integrated circuit (ASIC), and performs various calculation processes or control processes according to various programs stored in the storage unit 1030. Particularly, the processing unit 1020 receives sensing data from the inertial measurement unit 10, and receives GPS data from the GPS unit 50, so as to calculate a velocity, a position, an attitude angle, and the like of the user by using the sensing data and the GPS data. The processing unit 1020 performs various calculation processes by using the calculated information so as to analyze motion of the user and to generate motion analysis information (image data, text data, sound data, and the like) including a movement path or a movement time period. The processing unit 1020 transmits the generated motion analysis information to the display apparatus 3 via the communication unit 40.

The storage unit 1030 is constituted of, for example, recording media including various IC memories such as a read only memory (ROM), a flash ROM, and a random access memory (RAM), a hard disk, and a memory card.

Figure 16:
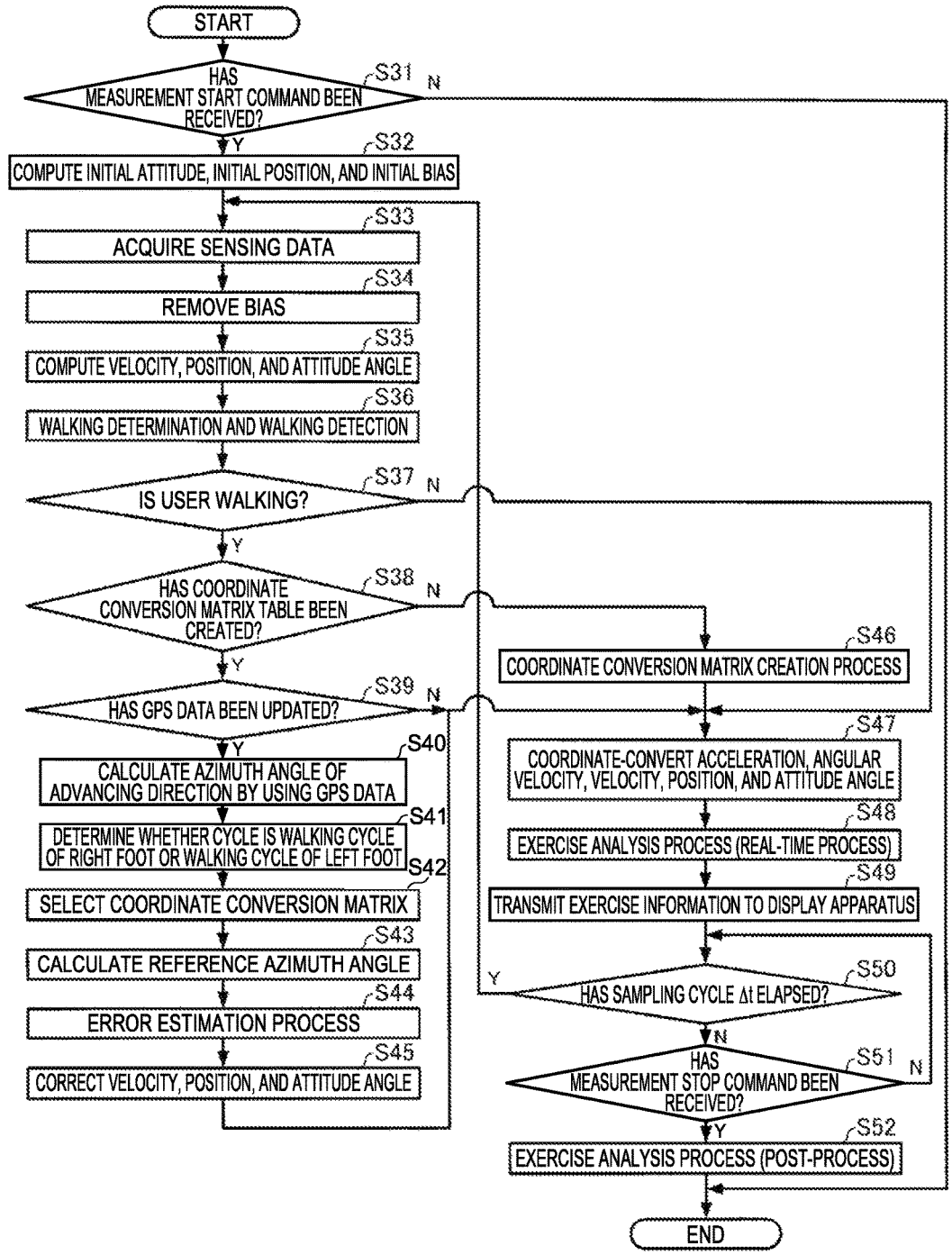
FIG. 16 is a flowchart illustrating examples of procedures of a motion analysis process.

The storage unit 1030 stores a motion analysis program 300 which is read by the processing unit 1020 and is used to perform a motion analysis process (refer to FIG. 16).

The storage unit 1030 stores a sensing data table 310, a GPS data table 320, a calculated data table 330, a coordinate transformation matrix table 1340, motion analysis information 350, and the like.

The sensing data table 310 is used by the processing unit 1020 instead of the processing unit 20 of the first embodiment, and remaining configurations thereof are the same as those in the first embodiment.

The sensing data table 310 is a data table which stores sensing data (a detection result in the inertial measurement unit 10) received by the processing unit 1020 from the inertial measurement unit 10 in a time series (refer to FIG. 3). When measurement is started, the processing unit 1020 adds new sensing data to the sensing data table 310 whenever a sampling cycle Δt (for example, 20 ms) elapses. The processing unit 1020 corrects an acceleration and an angular velocity by using an acceleration bias and an angular velocity bias which are estimated according to error estimation (which will be described later) using the extended Karman filter, and updates the sensing data table 310 by overwriting the corrected acceleration and angular velocity to the sensing data table.

The GPS data table 320 is used by the processing unit 1020 instead of the processing unit 20 of the first embodiment, and remaining configurations thereof are the same as those in the first embodiment.

The GPS data table 320 is a data table which stores GPS data (a detection result in the GPS unit (GPS sensor) 50) received by the processing unit 1020 from the GPS unit 50 in a time series (refer to FIG. 4). When measurement is started, the processing unit 1020 adds new GPS data whenever the GPS data is acquired (for example, in an asynchronous manner with acquisition timing of sensing data) so as to update the GPS data table 320.

The calculated data table 330 is used by the processing unit 1020 instead of the processing unit 20 of the first embodiment, and remaining configurations thereof are the same as those in the first embodiment.

The calculated data table 330 is a data table which stores a velocity, a position, and an attitude angle calculated by the processing unit 1020 by using the sensing data in a time series (refer to FIG. 5). When measurement is started, the processing unit 1020 calculates a velocity, a position, and an attitude angle whenever new sensing data is acquired, that is, the sampling cycle Δt elapses, and adds new calculated data to the calculated data table 330. The processing unit 1020 corrects a velocity, a position, and an attitude angle by using a velocity error, a position error, and an attitude angle error which are estimated according to error estimation using the extended Karman filter, and updates the calculated data table 330 by overwriting the corrected velocity, position and attitude angle to the calculated data table.

The coordinate transformation matrix table 1340 is a table storing a plurality of coordinate transformation matrices for performing coordinate transformation between the b frame and the m frame. Details of the coordinate transformation matrix table 1340 will be described later.

The motion analysis information 350 is various information pieces regarding the motion of the user, and, in the present embodiment, includes information regarding movement due to walking, information regarding an evaluation index of walking motion, and information regarding advice, an instruction, and a warning for walking, calculated by the processing unit 1020.

The communication unit 40 performs data communication with a communication unit 140 of the display apparatus 3, and performs a process of receiving motion analysis information generated by the processing unit 1020 and transmitting the motion analysis information to the display apparatus 3, a process of receiving a command (a command for starting or finishing measurement, or the like) transmitted from the display apparatus 3 and sending the command to the processing unit 1020, and the like.

The display apparatus 3 includes a processing unit 120, a storage unit 130, the communication unit 140, an operation unit 150, a clocking unit 160, a display unit 170, and a sound output unit 180. The display apparatus 3 is the same as that of the first embodiment except that data communication is performed with the motion analysis apparatus 1002 by using the motion analysis apparatus 1002 instead of the motion analysis apparatus 2 of the first embodiment, and thus detailed description thereof will not be repeated. In addition, the display apparatus 3 of the present embodiment may have a configuration in which some of the constituent elements are deleted or changed, or other constituent elements may be added thereto.

Figure 14:
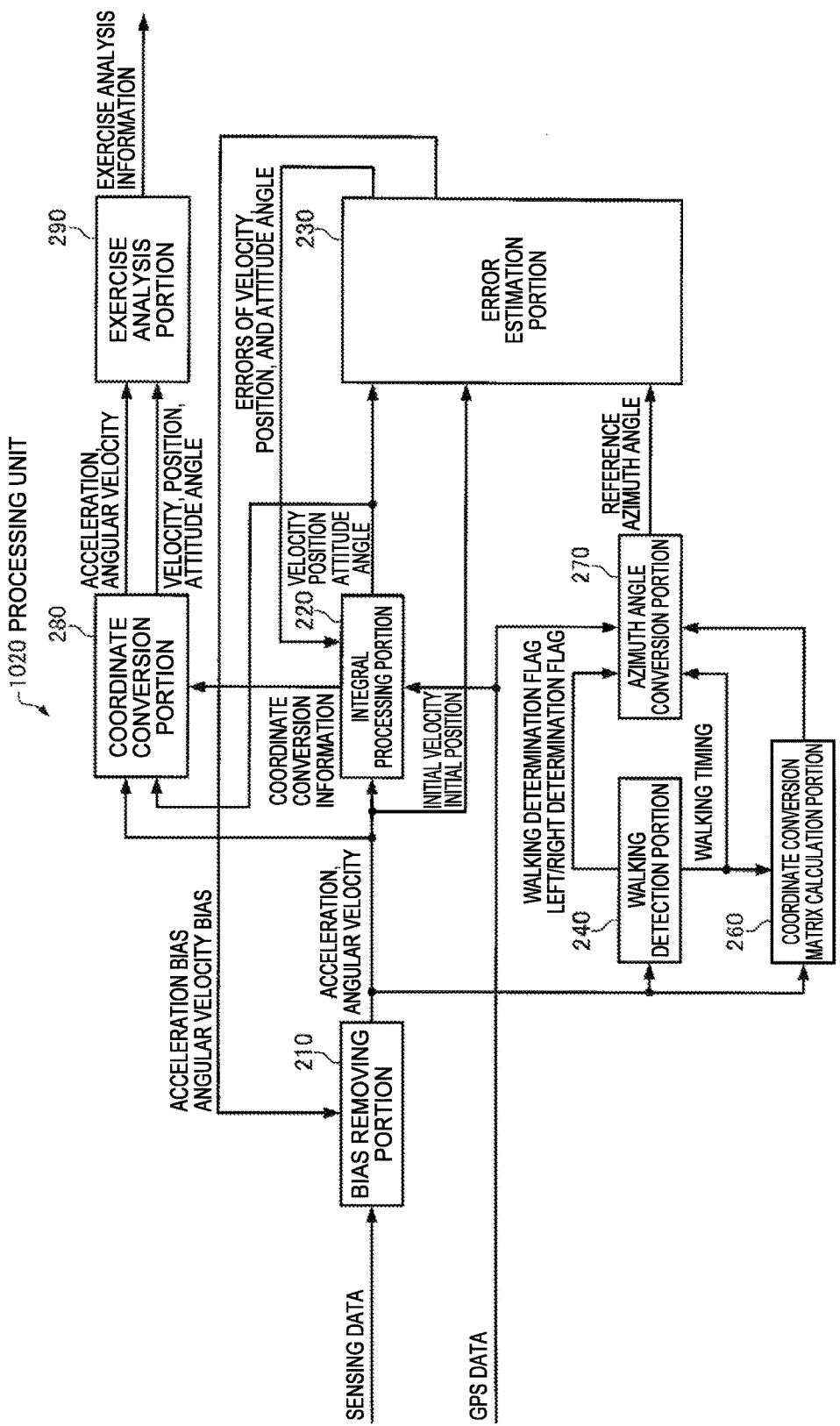
FIG. 14 is a functional block diagram illustrating a configuration example of a processing unit of the motion analysis apparatus.

FIG. 14 is a functional block diagram illustrating a configuration example of the processing unit 1020 of the motion analysis apparatus 1002. In the present embodiment, the processing unit 1020 functions as a bias removing portion 210, an integral processing portion 220, an error estimation portion 230, a walking detection portion 240, a coordinate transformation matrix calculation portion 260, an azimuth angle transformation portion 270, a coordinate transformation portion 280, and a motion analysis portion 290, by executing the motion analysis program 300 stored in the storage unit 1030.

The bias removing portion 210 subtracts an acceleration bias $b_a$ and an angular velocity bias $b_\omega$ estimated by the error estimation portion 230 from accelerations (three-axis accelerations) and angular velocities included in acquired new sensing data, so as to perform a process of correcting the accelerations and the angular velocities. Since the acceleration bias $b_a$ and the angular velocity bias $b_\omega$ are not present in an initial state right after measurement is started, the bias removing portion 210 computes initial biases by using sensing data from the inertial measurement unit assuming that an initial state of the user is a stationary state.

The integral processing portion 220 performs a process of calculating a velocity $v^e$, a position $p^e$, and attitude angles (a roll angle $\phi_{be}$, a pitch angle $\theta_{be}$, and a yaw angle $\psi_{be}$) of the e frame on the basis of the accelerations and the angular velocities corrected by the bias removing portion 210. Specifically, first, the integral processing portion 220 sets an initial velocity to zero assuming that an initial state of the user is a stationary state, or calculates an initial velocity by using the velocity included in the GPS data and also calculates an initial position by using the position included in the GPS data. The integral processing portion 220 specifies a gravitational acceleration direction on the basis of the three-axis accelerations of the b frame corrected by the bias removing portion 210 so as to calculate initial values of the roll angle $\phi_{be}$ and the pitch angle $\theta_{be}$, also calculates an initial value of the yaw angle $\psi_{be}$ on the basis of the velocity including the GPS data, and sets the calculated initial values as initial attitude angles of the e frame. In a case where the GPS data cannot be obtained, an initial value of the yaw angle $\psi_{be}$ is set to, for example, zero. The integral processing portion 220 calculates an initial value of a coordinate transformation matrix (rotation matrix) $C_b^e$ from the b frame into the e frame, expressed by Equation (1) on the basis of the calculated initial attitude angles.

[Expression 19]

$$C_b^e = \begin{bmatrix} \cos\theta_{be}\cdot\cos\varphi_{be} & \cos\theta_{be}\cdot\sin\varphi_{be} & -\sin\theta_{be} \\ \sin\phi_{be}\cdot\sin\theta_{be}\cdot\cos\varphi_{be} - \cos\phi_{be}\cdot\sin\varphi_{be} & \sin\phi_{be}\cdot\sin\theta_{be}\cdot\sin\varphi_{be} + \cos\phi_{be}\cdot\cos\varphi_{be} & \sin\phi_{be}\cdot\cos\theta_{be} \\ \cos\phi_{be}\cdot\sin\theta_{be}\cdot\cos\varphi_{be} + \sin\phi_{be}\cdot\sin\varphi_{be} & \cos\phi_{be}\cdot\sin\theta_{be}\cdot\sin\varphi_{be} - \sin\phi_{be}\cdot\cos\varphi_{be} & \cos\phi_{be}\cdot\cos\theta_{be} \end{bmatrix} \quad (1)$$

Then, the integral processing portion 220 performs integration (rotation calculation) of the three-axis angular velocities corrected by the bias removing portion 210 so as to calculate the coordinate transformation matrix $C_b^e$, and calculates attitude angles by using Equation (2).

[Expression 20]

$$\begin{bmatrix} \phi_{be} \\ \theta_{be} \\ \varphi_{be} \end{bmatrix} = \begin{bmatrix} \arctan2(C_b^e(2,3), C_b^e(3,3)) \\ -\arcsin C_b^e(1,3) \\ \arctan2(C_b^e(1,2), C_b^e(1,1)) \end{bmatrix} \quad (2)$$

The integral processing portion 220 converts the three-axis accelerations of the b frame corrected by the bias removing portion 210 into three-axis accelerations of the e frame by using the coordinate transformation matrix $C_b^e$, and removes an gravitational acceleration component therefrom for integration so as to calculate the velocity $v^e$ of the e frame. The integral processing portion 220 integrates the velocity $v^e$ of the e frame so as to calculate the position $p^e$ of the e frame.

The integral processing portion 220 also performs a process of correcting the velocity $v^e$, the position $p^e$, and the attitude angles by using a velocity error $\delta v^e$, a position error $\delta p^e$, and attitude angle errors $\varepsilon^e$ estimated by the error estimation portion 230.

The integral processing portion 220 also calculates a coordinate transformation matrix $C_b^m$ from the b frame into the m frame, and a coordinate transformation matrix $C_e^m$ from the e frame into the m frame. The coordinate transformation matrices are used for a coordinate transformation process in the coordinate transformation portion 280 which will be described later as coordinate transformation information.

The error estimation portion 230 estimates an error of an index indicating a state of the user by using the velocity and/or the position, and the attitude angles calculated by the integral processing portion 220, the acceleration or the angular velocity corrected by the bias removing portion 210, and a reference azimuth angle calculated by the azimuth angle transformation portion 270 which will be described later. In the present embodiment, the error estimation portion 230 uses the velocity, the attitude angles, the acceleration, the angular velocity, and the position as indexes indicating a state of the user, and estimates errors of the indexes by using the extended Karman filter. In other words, the error estimation portion 230 uses an error (velocity error) $\delta v^e$ of the velocity $v^e$ calculated by the integral processing portion 220, errors (attitude angle errors) $\varepsilon^e$ of the attitude angles calculated by the integral processing portion 220, the acceleration bias $b_a$, the angular velocity bias $b_\omega$, and an error (position error) $\delta p^e$ of the position $p^e$ calculated by the integral processing portion 220, as state variables of the extended Karman filter, and a state vector X is defined as in Equation (3).

[Expression 21]

$$X = \begin{bmatrix} \delta v^e \\ \varepsilon^e \\ b_a \\ b_\omega \\ \delta p^e \end{bmatrix} \quad (3)$$

The error estimation portion 230 predicts state variables (errors of the indexes indicating a state of the user) included in the state vector X by using the prediction formulae of the extended Karman filter. The prediction formulae of the extended Karman filter are expressed as in Equation (4). In Equation (4), the matrix Φ is a matrix which associates the previous state vector X with the present state vector X, and is designed so that some elements thereof change every moment while reflecting attitude angles, a position, and the like. Q is a matrix indicating process noise, and each element thereof is set to an appropriate value. P is an error covariance matrix of the state variables.

[Expression 22]

$$X = \Phi X$$

$$P = \Phi P \Phi^T + Q \quad (4)$$

The error estimation portion 230 updates (corrects) the predicted state variables (errors of the indexes indicating a state of the user) by using update formulae of the extended Karman filter. The update formulae of the extended Karman filter are expressed as in Equation (5). Z and H are respectively an observation vector and an observation matrix, and the update formulae (5) indicate that the state vector X is corrected by using a difference between the actual observation vector Z and a vector HX predicted from the state vector X. R is a covariance matrix of observation errors, and may have predefined constant values, and may be dynamically changed. K is a Karman gain, and K increases as R decreases. From Equation (5), as K increases (R decreases), a correction amount of the state vector X increases, and thus P decreases.

[Expression 23]

$$K = PH^T(HPH^T + R)^{-1}$$

$$X = X + K(Z - HX)$$

$$P = (I - KH)P \quad (5)$$

In the present embodiment, under the condition that an azimuth angle calculated by using a detection result in the inertial measurement unit is the same as an azimuth angle of the inertial measurement unit 10 calculated by using GPS data, and the azimuth angle of the inertial measurement unit 10 calculated by using the GPS data is a true azimuth angle (reference azimuth angle), the error estimation portion 230 uses a difference between an azimuth angle calculated by using a detection result in the inertial measurement unit and an azimuth angle of the inertial measurement unit 10 calculated by using GPS data as the observation vector Z and applies the extended Karman filter thereto so as to estimate the state vector X.

Meanwhile, in a case where the user performs a walking action (advances straight), an advancing direction is nearly constant, but an attitude of the inertial measurement unit 10 periodically changes according to motion of the user. Also in a case where the user wearing the motion analysis apparatus 1002 (IMU 10) of the present embodiment on the user's right waist performs a walking action (advancing straight), an attitude of the inertial measurement unit 10 relative to the user changes at any time due to the walking action of the user in the same manner as in the motion analysis apparatus 2 (IMU 10) of the first embodiment. In a state in which the user takes a step forward with the right foot, the inertial measurement unit 10 is tilted to the right side with respect to the advancing direction (the x axis of the m frame) (refer to (2) and (4) of FIG. 7). In contrast, in a state in which the user takes a step forward with the left foot, the inertial measurement unit 10 is tilted to the left side with respect to the advancing direction (the x axis of the m frame) (refer to (1) and (3) of FIG. 7).

In other words, the azimuth angle of the inertial measurement unit 10 periodically changes every two steps including left and right steps due to the walking action of the user, and thus an azimuth angle calculated by using a detection result in the inertial measurement unit 10 also periodically changes. In contrast, an advancing direction of the user is substantially constant, and thus an azimuth angle calculated by using GPS data is also substantially constant. Also in this case, in the same manner as in the motion analysis apparatus 2 (IMU 10) of the first embodiment (refer to FIG. 8), the azimuth angle of the inertial measurement unit 10 periodically changes every two steps. For example, the azimuth angle is the maximum (indicated by O) in a state in which the user takes a step forward with the right foot, and is the minimum (indicated by •) in a state in which the user takes a step forward with the left foot. On the other hand, since the azimuth angle of the advancing direction is substantially constant without greatly changing, an azimuth angle calculated by using GPS data is also substantially constant.

Therefore, in order to satisfy the above-described condition for estimating the state vector X, it is necessary to compute information regarding a difference between an azimuth angle of the inertial measurement unit and an azimuth angle of the advancing direction calculated by using GPS data, that is, a coordinate transformation matrix $C_m^b$ between the b frame and the m frame.

However, as illustrated in FIG. 8, a timing for obtaining GPS data is irregular, and thus a difference between an azimuth angle (indicated by the triangular mark) of the inertial measurement unit 10 and an azimuth angle (indicated by the square mark) calculated by using the GPS data is not constant at a timing at which the GPS data is obtained. Therefore, the coordinate transformation matrix $C_m^b$ is required to be calculated whenever the GPS data is obtained if any action is not taken, in order to perform error estimation using the extended Karman filter at the timing at which the GPS data is obtained, and thus there is a problem in that a processing load increases.

Therefore, in the present embodiment, a plurality of coordinate transformation matrices $C_m^b$ for the right foot are computed only once at a plurality of timings in a cycle corresponding to one step of the right foot, and a plurality of coordinate transformation matrices $C_m^b$ for the left foot are computed only once at a plurality of timings in a cycle corresponding to one step of the left foot, by using the fact that an azimuth angle of the inertial measurement unit 10 periodically changes every two steps according to the user's walking motion. Thereafter, at a timing at which GPS data is obtained, if the timing is included in a walking cycle of the right foot, a coordinate transformation matrix $C_m^b$, in which a difference between a time point at which the coordinate transformation matrix $C_m^b$ is calculated and a time point at which the most recent walking cycle has been started is closest to a difference between the time point at which the GPS data is obtained and a time point at which the most recent walking cycle has been started, is selected from among the plurality of coordinate transformation matrices $C_m^b$ for the right foot. In addition, at a timing at which GPS data is obtained, if the timing is included in a walking cycle of the left foot, a coordinate transformation matrix $C_m^b$, in which a difference between a time point at which the coordinate transformation matrix $C_m^b$ is calculated and a time point at which the most recent walking cycle has been started is closest to a difference between the time point at which the GPS data is obtained and a time point at which the most recent walking cycle has been started, is selected from among the plurality of coordinate transformation matrices $C_m{}^b$ for the left foot. A reference azimuth angle is calculated by using the selected coordinate transformation matrix $C_m{}^b$, and thus the state vector X is estimated. In the above-described manner, it is not necessary to compute the coordinate transformation matrix $C_m{}^b$ again whenever GPS data is obtained, and thus it is possible to considerably reduce a processing load.

In the present embodiment, a reference azimuth angle is immediately calculated whenever GPS data is obtained, the state vector X can be accurately estimated unless a timing at which the GPS data is updated and a timing at which the user changes an advancing direction overlap each other. In other words, even if the user is walking while frequently changing the advancing direction, there is no concern that estimation accuracy of the state vector X may be considerably reduced.

Referring to FIG. 14 again, the walking detection portion 240 performs a process of detecting a cycle of one step (of the left foot or the right foot) as a walking cycle (walking timing) by using a detection result (specifically, sensing data corrected by the bias removing portion 210) in the inertial measurement unit 10. Also in the processing unit 1020 of the present embodiment, in the same manner as in the processing unit 20 of the first embodiment, a combined acceleration illustrated in FIG. 9 periodically changes, and an intermediate timing between the minimum value and the maximum value of the combined acceleration matches the timing at which the azimuth angle in FIG. 8 becomes the maximum or the minimum. Therefore, for example, in a case where a difference (amplitude) of the maximum value and the minimum value of the combined acceleration is equal to or more than a threshold value, the walking detection portion 240 can detect a walking cycle of one step at an intermediate timing between the minimum value and the maximum value of the combined acceleration. For example, the walking detection portion 240 may preserve an intermediate value obtained at the time at which the combined acceleration has most recently changed from the minimum value to the maximum value (or from the maximum value to the minimum value), and may detect a walking cycle when the intermediate value is exceeded (O in FIG. 9).

The walking detection portion 240 outputs a left/right determination flag indicating whether the detected walking cycle is a walking cycle of the right foot or a walking cycle of the left foot. For example, in a case where a walking cycle is detected in a state in which the left/right determination flag is set to an ON state (a walking cycle of the right foot), the walking detection portion 240 may determine that the walking cycle is a left foot cycle, and thus sets the left/right determination flag to an OFF state. In a case where a walking cycle is detected in a state in which the left/right determination flag is set to an OFF state (a walking cycle of the left foot), the walking detection portion may determine that the walking cycle is a right foot cycle, and thus sets the left/right determination flag to an ON state. Alternatively, the walking detection portion 240 may determine whether a walking cycle is a walking cycle of the right foot or a walking cycle of the left foot on the basis of acceleration, angular velocity, an azimuth angle, and the like when the walking cycle is detected.

The walking detection portion 240 determines whether or not the user is walking, and outputs a walking determination flag indicating whether or not the user is walking. For example, in a case where a walking cycle is detected in a state in which the walking determination flag is set to an OFF state (a state in which the user is not walking), the walking detection portion 240 sets the walking determination flag to an ON state. In a case where a walking cycle is not detected for a predetermined time period in a state in which the walking determination flag is set to an ON state (a state in which the user is walking), the walking detection portion may set the walking determination flag to an OFF state. Alternatively, the walking detection portion 240 may determine whether or not the user is walking on the basis of acceleration, angular velocity, an azimuth angle, and the like.

The coordinate transformation matrix calculation portion 260 performs a process of calculating the coordinate transformation matrix $C_m{}^b$ between the b frame (an example of a first coordinate system) and the m frame (an example of a second coordinate system) at a plurality of timings in a walking cycle corresponding to two steps (including left and right steps) of the user. For example, the coordinate transformation matrix calculation portion 260 may calculate the coordinate transformation matrix $C_m{}^b$ in each sampling cycle Δt after the walking detection portion 240 detects a walking cycle of the right foot until a walking cycle of the right foot is detected next.

The coordinate transformation matrix calculation portion 260 attaches a calculation time point (a relative time point with a detection timing of the most recent walking cycle as 0) and a flag indicating whether the walking cycle is a right foot cycle or a left foot cycle to the coordinate transformation matrix, wherever each of plurality of the coordinate transformation matrix $C_m{}^b$ is calculated, and adds the coordinate transformation matrix to the coordinate transformation matrix table 1340 in FIG. 13 which is then stored in the storage unit 1030. FIG. 15 is a diagram illustrating a configuration example of the coordinate transformation matrix table 1340. As illustrated in FIG. 15, the coordinate transformation matrix table 1340 is configured so that coordinate transformation matrix data items in which a relative time point 1341 at which the coordinate transformation matrix calculation portion 260 computes a coordinate transformation matrix, a coordinate transformation matrix 1342, and a left/right identification flag 1343 indicating whether a walking cycle is a right foot cycle or a left foot cycle are correlated with each other are arranged in a time series. Initial P coordinate transformation matrices are calculated in the right foot cycles, and remaining (Q-P) coordinate transformation matrices are calculated in the left foot cycles. Since a first coordinate transformation matrix $C_m{}^b[1]$ is calculated at a timing at which a walking cycle of the right foot is detected, a calculation time point $t_1$ thereof is 0, and thus time points $t_2$ to $t_P$ are relative time points with $t_1$ as a reference. Similarly, since a (P+1)-th coordinate transformation matrix $C_m{}^b[P+1]$ is calculated at a timing at which a walking cycle of the left foot is detected, a calculation time point $t_{P+1}$ thereof is 0, and thus time points $t_{P+2}$ to $t_Q$ are relative time points with $t_{P+1}$ as a reference. To summarize, for each coordinate transformation matrix $C_m{}^b$, a difference between a calculation time point of each coordinate transformation matrix $C_m{}^b$ and a detection time point of the most recent walking cycle, and whether the coordinate transformation matrix is calculated in the right foot cycle or the left foot cycle can be seen from the coordinate transformation matrix table 1340.

In the present embodiment, at a timing at which each coordinate transformation matrix $C_m{}^b$ is calculated, the coordinate transformation matrix calculation portion 260 removes the gravitational acceleration from the detection result (specifically, the acceleration corrected by the bias removing portion 210) in the inertial measurement unit 10, and integrates a removal result so as to calculate the user's velocity Vb=(Vbx,Vby,Vbz) in the advancing direction of the user in the b frame. The coordinate transformation matrix calculation portion 260 calculates each coordinate transformation matrix $C_m^b$ as follows on the basis of the calculated velocity Vb.

A relationship between the velocity Vb=(Vbx,Vby,Vbz) in the b frame and the velocity Vm=(Vmx,Vmy,Vmz) in the m frame is expressed as in Equation (6) by using the coordinate transformation matrix $C_m^b$. Since the user is walking straight, Vmy=Vmz=0 is set in Equation (6).

[Expression 24]

$$\begin{bmatrix} Vbx \\ Vby \\ Vbz \end{bmatrix} = C_m^b \begin{bmatrix} Vmx \\ 0 \\ 0 \end{bmatrix} \quad (6)$$

A roll angle $\phi_{bm}$, a pitch angle $\theta_{bm}$, and a yaw angle $\psi_{bm}$ of the inertial measurement unit 10 in the m frame are expressed as in Equation (7) on the basis of Equation (6). In the present embodiment, the roll angle $\phi_{bm}$ is not calculated, and a change in the roll angle $\phi_{bm}$ is sufficiently smaller than a change in the yaw angle $\psi_{bm}$ while user is walking, and thus the roll angle $\phi_{bm}$ is approximate to 0 in Equation (7).

[Expression 25]

$$\phi_{bm} = 0 \quad (7)$$
$$\theta_{bm} = \mathrm{atan}\left(\frac{-Vb_z}{\sqrt{Vb_x^2 + Vb_y^2}}\right)$$
$$\varphi_{bm} = \mathrm{atan2}(Vb_y, Vb_x)$$

The coordinate transformation matrix $C_m^b$ may be calculated according to Equation (8) by using the roll angle $\phi_{bm}$, the pitch angle $\theta_{bm}$, and the yaw angle $\psi_{bm}$ in Equation (7). In Equation (8), $R_z(-\psi_{bm})$ is a rotation matrix which rotates by $-\psi_{bm}$ about the z axis. $R_y(-\theta_{bm})$ is a rotation matrix which rotates by $-\theta_{bm}$ about the y axis. $R_x(-\phi_{bm})$ is a rotation matrix which rotates by $-\phi_{bm}$ about the x axis.

[Expression 26]

$$C_m^b = (C_b^m)^T \quad (8)$$
$$= R_z(\varphi_{bm}) \cdot R_y(-\theta_{bm}) \cdot R_x(-\phi_{bm})$$
$$= \begin{pmatrix} \cos\varphi_{bm} & -\sin\varphi_{bm} & 0 \\ \sin\varphi_{bm} & \cos\varphi_{bm} & 0 \\ 0 & 0 & 1 \end{pmatrix} \begin{pmatrix} \cos\theta_{bm} & 0 & \sin\theta_{bm} \\ 0 & 1 & 0 \\ -\sin\theta_{bm} & 0 & \cos\theta_{bm} \end{pmatrix} \begin{pmatrix} 1 & 0 & 0 \\ 0 & \cos\phi_{bm} & -\sin\phi_{bm} \\ 0 & \sin\phi_{bm} & \cos\phi_{bm} \end{pmatrix}$$
$$= \begin{pmatrix} \cos\theta_{bm}\cdot\cos\varphi_{bm} & \begin{array}{l}-\cos\phi_{bm}\cdot\sin\varphi_{bm} + \\ \sin\phi_{bm}\cdot\sin\theta_{bm}\cdot\cos\varphi_{bm}\end{array} & \begin{array}{l}\sin\phi_{bm}\cdot\sin\varphi_{bm} + \\ \cos\phi_{bm}\cdot\sin\theta_{bm}\cdot\cos\varphi_{bm}\end{array} \\ \cos\theta_{bm}\cdot\sin\varphi_{bm} & \begin{array}{l}\cos\phi_{bm}\cdot\cos\varphi_{bm} + \\ \sin\phi_{bm}\cdot\sin\theta_{bm}\cdot\sin\varphi_{bm}\end{array} & \begin{array}{l}-\sin\phi_{bm}\cdot\cos\varphi_{bm} + \\ \cos\phi_{bm}\cdot\sin\theta_{bm}\cdot\sin\varphi_{bm}\end{array} \\ -\sin\theta_{bm} & \sin\phi_{bm}\cdot\cos\theta_{bm} & \cos\phi_{bm}\cdot\cos\theta_{bm} \end{pmatrix}$$

In the present embodiment, the coordinate transformation matrix calculation portion 260 calculates a plurality of coordinate transformation matrices $C_m^b$ by using a detection result in the inertial measurement unit 10 in a predetermined time period after the user starts walking. Here, the predetermined time period is, for example, a time period in which the user takes several steps forward. The coordinate transformation matrix calculation portion 260 calculates the velocity Vb at a plurality of timings during a walking cycle corresponding to two steps (including left and right steps) from any timing at which the walking detection portion 240 detects a walking cycle in the several steps after the user starts walking, so as to calculate a plurality of coordinate transformation matrices $C_m^b$ which are then stored in the storage unit 1030. In the above-described manner, it is possible to prevent accuracy of the velocity Vb from being reduced due to repetition of integration of acceleration and thus to increase reliability of the coordinate transformation matrix $C_m^b$.

The azimuth angle transformation portion 270 selects a coordinate transformation matrix $C_m^b$ corresponding to a timing at which GPS data is obtained from the coordinate transformation matrix table 1340 in synchronization with the timing at which the GPS data (a detection result in the GPS unit 50) is obtained (updated), and converts an azimuth angle (an azimuth angle calculated by using the GPS data) of the user based on the GPS data so as to generate a reference azimuth angle by using the selected coordinate transformation matrix $C_m^b$. Specifically, first, in a case where walking determination flag output from the walking detection portion 240 is set to an ON state (a state in which the user is walking), if the GPS data is updated, the azimuth angle transformation portion 270 calculates an azimuth angle of the advancing direction of the user by using the updated GPS data. For example, the azimuth angle transformation portion 270 may calculate the azimuth angle of the advancing direction on the basis of a direction of a velocity included in the GPS data, and may calculate the azimuth angle of the advancing direction on the basis of two positions included in two GPS data items. In a case where information regarding an azimuth angle is included in the GPS data, the azimuth angle may be used as the azimuth angle of the advancing direction.

If the azimuth angle calculated by using the GPS data is indicated by gpsYaw($\psi_{nm}$), next, the azimuth angle transformation portion 270 calculates a coordinate transformation matrix $C_n^m$ from the n frame into the m frame according to Equation (9).

[Expression 27]

$$C_n^m = \begin{pmatrix} \cos\varphi_{nm} & \sin\varphi_{nm} & 0 \\ -\sin\varphi_{nm} & \cos\varphi_{nm} & 0 \\ 0 & 0 & 1 \end{pmatrix} \quad (9)$$

Next, the azimuth angle transformation portion 270 computes a time difference between a timing at which the walking detection portion 240 has detected a walking cycle most recently and the timing at which the GPS data has been updated. If the left/right determination flag output from the walking detection portion 240 is set to an ON state (a walking cycle of the right foot), the azimuth angle transformation portion 270 selects a coordinate transformation matrix $C_m^b$ in which the left/right identification flag 1343 is set to the right foot cycle, and the relative time point 1341 is closest to the computed time difference, from the coordinate transformation matrix table 1340.

Next, the azimuth angle transformation portion 270 calculates a coordinate transformation matrix $C_n^b$ from the n frame into the b frame according to Equation (10) on the basis of the selected coordinate transformation matrix $C_m^b$ and the coordinate transformation matrix $C_n^m$ calculated by using Equation (9).

[Expression 28]

$$C_n^b = C_m^b \cdot C_n^m \qquad (10)$$

The azimuth angle transformation portion 270 calculates a reference azimuth angle gpsYaw($\psi_{nb}$) according to Equation (11) on the basis of a transposed matrix $C_b^n$ of the coordinate transformation matrix $C_n^b$ calculated according to Equation (10).

[Expression 29]

$$\text{gpsYaw}(\varphi_{nb}) = a\tan 2(C_b^n(2,1), C_b^n(1,1)) \qquad (11)$$

The error estimation portion 230 estimates the state vector X by using the extended Karman filter at the timing at which the GPS data is obtained (the timing at which the azimuth angle transformation portion 270 calculates a reference azimuth angle).

In the same manner as the error estimation portion 230 of the first embodiment, the error estimation portion 230 of the present embodiment calculates the observation vector Z and the observation matrix H, for example.

The coordinate transformation portion 280 performs a coordinate transformation process of converting the accelerations and the angular velocities of the b frame corrected by the bias removing portion 210 into accelerations and angular velocities of the m frame, respectively, by using the coordinate transformation information (coordinate transformation matrix $C_b^m$) from the b frame into the m frame, calculated by the integral processing portion 220. The coordinate transformation portion 280 performs a coordinate transformation process of converting the velocities, the position, and the attitude angles of the e frame calculated by the integral processing portion 220 into velocities, a position, and attitude angles of the m frame, respectively, by using the coordinate transformation information (coordinate transformation matrix $C_e^m$) from the e frame into the m frame, calculated by the integral processing portion 220.

The motion analysis portion 290 performs a process of various calculations by using the accelerations, the angular velocities, the velocities, the position, and the attitude angles of the m frame obtained through coordinate transformation in the coordinate transformation portion 280, so as to analyze the user's motion and to generate the motion analysis information 350. In the present embodiment, the motion analysis portion 290 generates the motion analysis information 350 including information regarding movement such as a movement path, a movement velocity, and a movement time in the user's walking, information regarding an evaluation index of walking motion such as the extent of forward tilt, a difference between left and right motions, propulsion efficiency, an amount of energy consumption, and energy efficiency, information regarding advice or an instruction for better walking, warning information (information for causing the display apparatus 3 to output warning display or warning sound) indicating that an attitude is bad, and the like.

The processing unit 1020 transmits the motion analysis information 350 to the display apparatus 3, and the motion analysis information 350 is displayed on the display unit 170 illustrated in FIG. 3 as text, images, graphics, or the like, or is output as voice or buzzer sound from the sound output unit 180. Fundamentally, the motion analysis information 350 is displayed on the display unit 170, and thus the user can view the display unit 170 and check the motion analysis information when the user wants to know the motion analysis information. Information (warning information) which is desired to attract the user's attention is output as at least sound, and thus the user is not required to walk while normally viewing the display unit 170.

4. Procedure of Process

FIG. 16 is a flowchart illustrating examples (an example of a motion analysis method) of procedures of the motion analysis process performed by the processing unit 1020. The processing unit 1020 performs the motion analysis process according to the procedures of the flowchart illustrated in FIG. 16 by executing the motion analysis program 300 stored in the storage unit 1030.

As illustrated in FIG. 16, if a command for starting measurement has been received (Y in step S31), first, the processing unit 1020 computes an initial attitude, an initial position, and an initial bias by using sensing data and GPS data measured by the inertial measurement unit 10 assuming that the user stands still (step S32).

Next, the processing unit 1020 acquires the sensing data from the inertial measurement unit 10, and adds the acquired sensing data to the sensing data table 310 (step S33).

Next, the processing unit 1020 removes biases from acceleration and angular velocity included in the sensing data acquired in step S33 by using the initial bias (by using the acceleration bias $b_a$ and an angular velocity bias $b_\omega$ after the acceleration bias $b_a$ and the angular velocity bias $b_\omega$ are estimated in step S44) so as to correct the acceleration and the angular velocity, and updates the sensing data table 310 by using the corrected acceleration and angular velocity (step S34).

Next, the processing unit 1020 integrates the sensing data corrected in step S34 so as to compute a velocity, a position, and an attitude angle, and adds calculated data including the computed velocity, position, and attitude angle to the calculated data table 330 (step S35).

Next, the processing unit 1020 performs walking determination and walking detection (step S36). If it is determined that the user is walking (Y in step S37), the processing unit calculates an azimuth angle gpsYaw($\psi_{nm}$) of the advancing direction on the basis of the GPS data in a case where the coordinate transformation matrix table 1340 has been created (Y in step S38), and the GPS data has been updated (Y in step S39) (step S40).

Next, the processing unit 1020 determines whether a walking cycle is a walking cycle of the right foot or a walking cycle of the left foot on the basis of the left/right determination flag obtained in step S36 (step S41).

Next, the processing unit 1020 calculates a difference between a time point at which the walking cycle has been detected most recently in step S36 and the present time point, and selects a coordinate transformation matrix $C_m^b$ in which the left/right identification flag 1343 matches the determination result in step S41, and the relative time point 1341 is closest to the computed time difference from the coordinate transformation matrix table 1340 (step S42).

Next, the processing unit 1020 calculates the reference azimuth angle gpsYaw($\psi_{nb}$) by using the coordinate transformation matrix $C_m^b$ selected in step S42 (step S43).

Next, the processing unit 1020 performs an error estimation process by using the reference azimuth angle gpsYaw($\psi_{nb}$) calculated in step S43 (step S44), so as to estimate a velocity error $\delta v^e$, an attitude angle error $\varepsilon^e$, an acceleration bias $b_a$, an angular velocity bias $b_\omega$, and a position error $\delta p^e$.

Next, the processing unit 1020 corrects the velocity, the position, and the attitude angle by using the velocity error $\delta v^e$, the attitude angle error $\varepsilon^e$, and the position error $\delta p^e$ estimated in step S44, and updates the calculated data table 330 by using the corrected velocity, position, and the attitude angle (step S45).

Next, the processing unit 1020 performs coordinate transformation of the sensing data (the acceleration and the angular velocity of the b frame) stored in the sensing data table 310 and the calculated data (the velocity, the position, and the attitude angle of the e frame) stored in the calculated data table 330 into acceleration, angular velocity, velocity, a position, and an attitude angle of the m frame (step S47). The processing unit 1020 arranges and stores the acceleration, the angular velocity, the velocity, the position, and the attitude angle of the m frame in the storage unit 1030 in a time series.

In a case where it is determined that the user is not walking in step S37 (N in step S37), the processing unit 1020 does not perform the processes in steps S38 to S45, and performs a process in step S47.

In a case where it is determined that the coordinate transformation matrix table 1340 has not been created in step S38 (N in step S38), the processing unit 1020 does not perform the processes in steps S39 to S45, creates the coordinate transformation matrix table 1340 (step S46), and performs the process in step S47.

In a case where it is determined that GPS data has not been updated in step S39 (N in step S39), the processing unit 1020 does not perform the processes in steps S40 to S45, and performs the process in step S47.

Next, the processing unit 1020 analyzes (motion analysis process) the user's motion in real time by using the acceleration, the angular velocity, the velocity, the position, and the attitude angle of the m frame obtained through the coordinate conversation in step S47, so as to generate motion analysis information (step S48).

Next, the processing unit 1020 transmits the motion analysis information generated in step S48 to the display apparatus 3 (step S49). The motion analysis information transmitted to the display apparatus 3 is fed back in real time during the user's walking. In the present specification, the "real time" indicates that processing is started at a timing at which processing target information is acquired. Therefore, the "real time" also includes some time difference between acquisition of information and completion of processing of the information.

The processing unit 1020 repeatedly performs the processes in step S33 and the subsequent steps whenever the sampling cycle $\Delta t$ elapses (Y in step S50) from the acquisition of the previous sensing data until a command for finishing the measurement is received (N in step S50 and Y in step S51). If the command for finishing the measurement has been received (Y in step S51), the processing unit 1020 analyzes motion (motion analysis process) performed by the user by using the acceleration, the angular velocity, the velocity, the position, and the attitude angle of the m frame which are obtained through the coordinate transformation in step S47 and are stored in a time series, or the analysis result (motion analysis information) in step S48, so as to generate motion analysis information (step S52). If the command for finishing the measurement has been received, in step S52, the processing unit 1020 may immediately perform the motion analysis process, and may perform the motion analysis process in a case where a motion analysis command has been received through a user's operation.

The processing unit 1020 may transmit the motion analysis information generated in step S52 to the display apparatus 3, may transmit the motion analysis information to an apparatus such as a personal computer or a smart phone, and may record the motion analysis information in a memory card.

In FIG. 16, if a command for starting measurement has not been received (N in step S31), the processing unit 1020 does not perform the processes in steps S31 to S52, but may perform the process in step S52 by using the acceleration, the angular velocity, the velocity, the position, and the attitude angle of the m frame stored in the past, or the analysis result (motion analysis information) in step S48.

Figure 17:
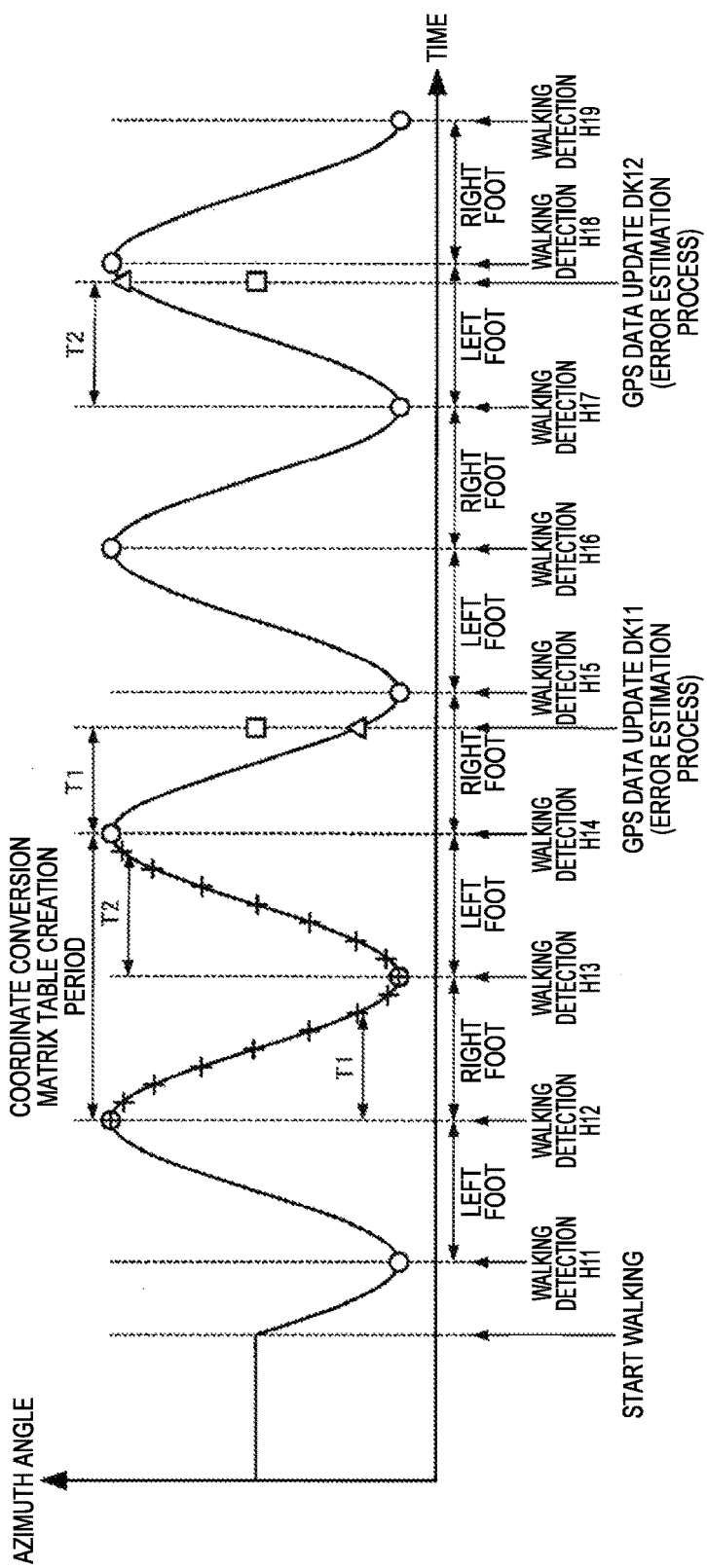
FIG. 17 is a diagram illustrating an example of a relationship between an azimuth angle of the inertial measurement unit and a timing of processing performed by the processing unit in a case where the user is walking straight.

FIG. 17 is a diagram illustrating an example of a relationship between an azimuth angle of the inertial measurement unit 10 and a timing of a process performed by the processing unit 1020, in which a transverse axis expresses time, and a longitudinal axis expresses an azimuth angle. In FIG. 17, an azimuth angle insYaw($\psi_{nb}$) of the inertial measurement unit 10 when a walking cycle is detected is indicated by a circular mark, and an azimuth angle insYaw ($\psi_{nb}$) of the inertial measurement unit 10 when GPS data is updated is indicated by a triangular mark. In addition, an azimuth angle gpsYaw($\psi_{nm}$) of the advancing direction calculated by using GPS data is indicated by a square mark.

In FIG. 17, the coordinate transformation matrix calculation portion 260 starts creating the coordinate transformation matrix table 1340 at a timing (walking detection H12) at which the walking detection portion 240 initially detects a walking cycle of the right foot after the user starts walking. Thereafter, the coordinate transformation matrix calculation portion 260 calculates the coordinate transformation matrix $C_m^b$ in each sampling cycle $\Delta t$ until a walking cycle of the right foot is detected next (walking detection H14). In FIG. 17, the azimuth angle of the inertial measurement unit 10 when the coordinate transformation matrix $C_m^b$ is calculated is indicated by "+".

At a timing (GPS data update DK11) at which GPS data is initially updated after creation of the coordinate transformation matrix table 1340 is completed (after the walking detection H14), a walking cycle of the right foot is detected at a detection timing (walking detection H14) of the most recent walking cycle, and a time difference with the detection timing (walking detection H14) of the most recent walking cycle is a time T1. Therefore, a coordinate transformation matrix $C_m^b$ which is calculated after the time T1 elapses from the timing (walking detection H12) at which the walking cycle of the right foot is detected in the creation period of the coordinate transformation matrix table 1340 is selected. In many cases, an azimuth angle of the inertial measurement unit 10 when the selected coordinate transformation matrix $C_m^b$ is calculated is closest to an azimuth angle of the inertial measurement unit 10 at the timing (GPS data update DK11) at which the GPS data is updated. The error estimation portion 230 creates the observation vector Z by using the selected coordinate transformation matrix $C_m^b$ so as to perform an estimation process of the state vector X at the timing (GPS data update DK11) at which the GPS data is updated.

At a timing (GPS data update DK12) at which GPS data is updated next, a walking cycle of the left foot is detected at a detection timing (walking detection H17) of the most recent walking cycle, and a time difference with the detection timing (walking detection H17) of the most recent walking cycle is a time T2. Therefore, a coordinate transformation matrix $C_m^b$ which is calculated after the time T2 elapses from the timing (walking detection H13) at which the walking cycle of the left foot is detected in the creation period of the coordinate transformation matrix table 1340 is selected. In many cases, an azimuth angle of the inertial measurement unit 10 when the selected coordinate transformation matrix $C_m^b$ is calculated is closest to an azimuth angle of the inertial measurement unit 10 at the timing (GPS data update DK12) at which the GPS data is updated. The error estimation portion 230 creates the observation vector Z by using the selected coordinate transformation matrix $C_m^b$ so as to perform an estimation process of the state vector X at the timing (GPS data update DK12) at which the GPS data is updated.

5. Effects

As described above, in the present embodiment, a coordinate transformation matrix $C_m^b$ corresponding to a difference between a timing at which a detection result in the GPS unit 50 is obtained and a timing at which the most recent walking cycle has been detected is selected from among a plurality of coordinate transformation matrices $C_m^b$ calculated at a plurality of timings in the walking cycle of the user, and a difference between an azimuth angle based on a detection result in the inertial measurement unit 10 and an azimuth angle based on a detection result in the GPS unit 50 is made to close to 0 by using the selected coordinate transformation matrix $C_m^b$, so that an error of an index indicating a state of the user is estimated. Therefore, according to the present embodiment, it is possible to estimate an error with high accuracy at a timing at which a detection result in the GPS unit 50 is obtained, and also to reduce a processing load since the coordinate transformation matrix $C_m^b$ is not required to be calculated whenever the detection result in the GPS unit 50 is obtained.

According to the present embodiment, since a plurality of coordinate transformation matrices $C_m^b$ are calculated by using a detection result in the inertial measurement unit 10 in a predetermined time period (for example, a time period of several steps) from starting of the user's walking, it is possible to reduce an error of a coordinate transformation matrix caused by an integration error or the like and thus to improve error estimation accuracy.

According to the present embodiment, since an error is immediately estimated at a timing at which a detection result in the GPS unit 50 is obtained, even if the user is walking while frequently changing the advancing direction, there is no concern that error estimation accuracy may be considerably reduced.

According to the present embodiment, it is possible to correct information such as a velocity, a position, and an attitude angle of the user with high accuracy by using an error which is estimated with high accuracy. According to the present embodiment, it is possible to analyze the user's walking motion with high accuracy by using the information such as the velocity, the position, and the attitude angle which are corrected with high accuracy.

Third Embodiment

1. Outline of Motion Analysis System

A third embodiment of the present invention will be described in detail with reference to the drawings. In the present embodiment, the same constituent elements as those of the first and second embodiments are given the same reference numerals and may not be described or may be described briefly.

Figure 18:
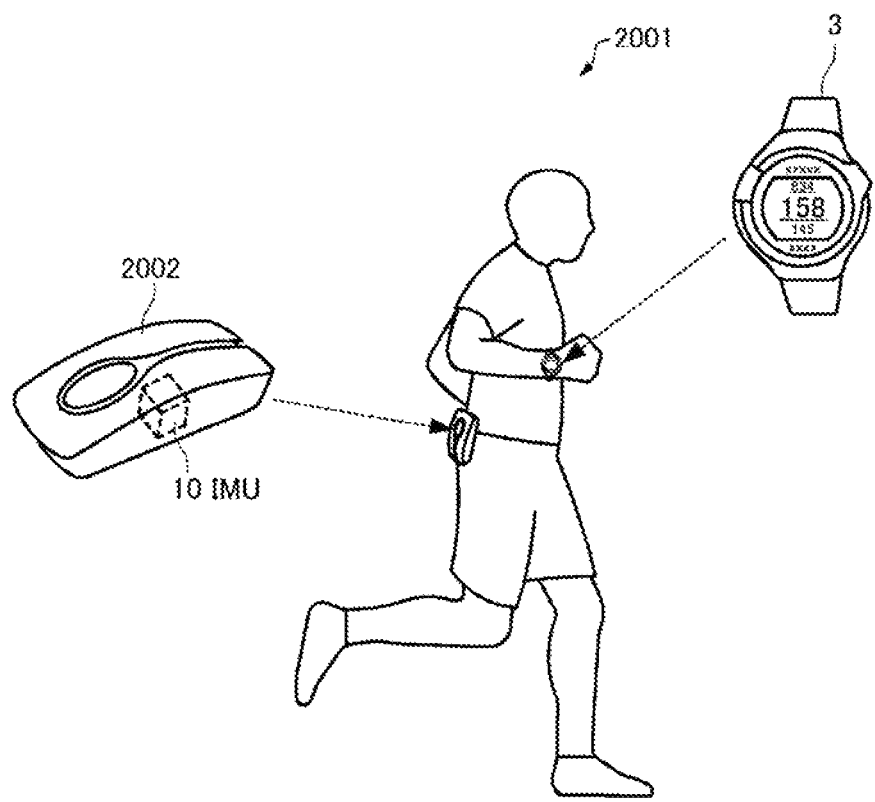
FIG. 18 is a diagram illustrating an outline of a motion analysis system according to a third embodiment.

FIG. 18 is a diagram for explaining an outline of a motion analysis system 2001 of the present embodiment. As illustrated in FIG. 18, the motion analysis system 2001 of the present embodiment includes a motion analysis apparatus 2002 and a display apparatus 3. The motion analysis apparatus 2002 is mounted on a body part (for example, a right waist or a left waist) of a user (an example of a moving object). The motion analysis apparatus 2002 has an inertial measurement unit (IMU) 10 built thereinto, recognizes motion of the user in walking (including running), computes velocity, a position, attitude angles (a roll angle, a pitch angle, and a yaw angle), and the like, and analyzes a user's motion so as to generate motion analysis information. In the present embodiment, the motion analysis apparatus 2002 is mounted on the user so that one detection axis (hereinafter, referred to as a z axis) of the inertial measurement unit (IMU) 10 substantially matches the gravitational acceleration direction (vertically downward direction) in a state in which the user stands still. The motion analysis apparatus 2002 transmits the generated motion analysis information to the display apparatus 3.

The display apparatus 3 is a wrist type (wristwatch type) portable information apparatus and is mounted on a user's wrist or the like. However, the display apparatus 3 may be a portable information apparatus such as a head mounted display (HMD) or a smart phone. The user operates the display apparatus 3 so as to instruct the motion analysis apparatus 2002 to start or finish measurement. The display apparatus 3 transmits a command for instructing measurement to be started or finished, to the motion analysis apparatus 2002. If a command for starting measurement has been received, the motion analysis apparatus 2002 causes the inertial measurement unit (IMU) 10 to start measurement, and analyzes the user's motion on the basis of a measurement result so as to generate motion analysis information. The motion analysis apparatus 2002 transmits the generated motion analysis information to the display apparatus 3. The display apparatus 3 receives the motion analysis information, and presents the received motion analysis information to the user in various forms such as text, graphics, and sound. The user can recognize the motion analysis information via the display apparatus 3.

Data communication between the motion analysis apparatus 2002 and the display apparatus 3 may be wireless communication or wired communication.

In the present embodiment, hereinafter, as an example, a detailed description will be made of a case where the motion analysis apparatus 2002 generates motion analysis information including a movement path, a movement time period, or the like by estimating a walking speed of the user, but the motion analysis system 2001 of the present embodiment is also applicable to a case where motion analysis information is generated in motions causing movement other than walking.

2. Coordinate System

Definition of coordinate systems necessary in the following description is the same as that in the first embodiment and the second embodiment, and description thereof will not be repeated.

3. Configuration of Motion Analysis System

Figure 19:
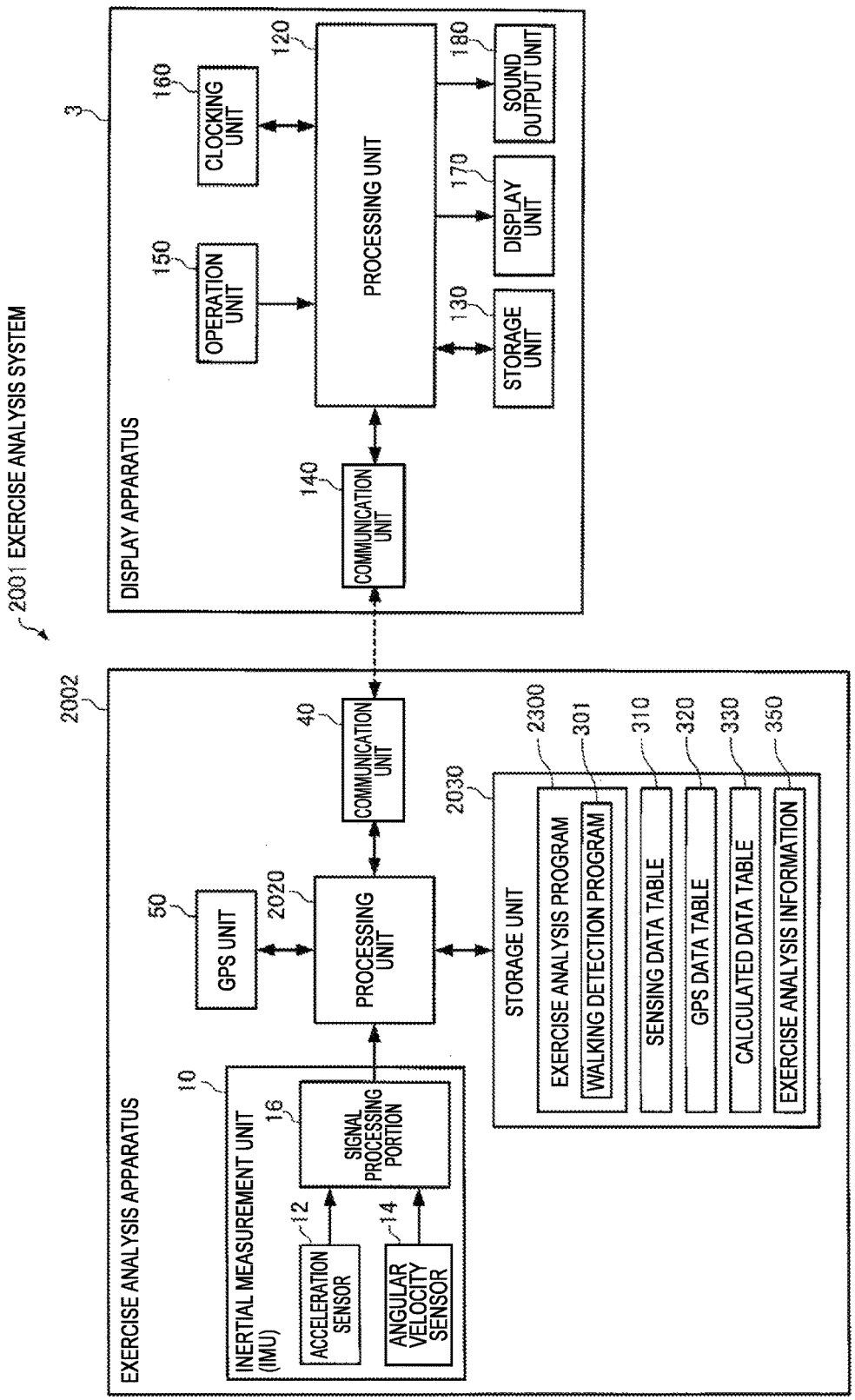
FIG. 19 is a functional block diagram illustrating configuration examples of a motion analysis apparatus and a display apparatus.

FIG. 19 is a functional block diagram illustrating configuration examples of the motion analysis apparatus 2002 and the display apparatus 3. As illustrated in FIG. 19, the motion analysis apparatus 2002 (an example of an error estimation apparatus) includes the inertial measurement unit (IMU) 10, a processing unit 2020, a storage unit 2030, a communication unit 40, and a GPS unit 50. However, the motion analysis apparatus 2002 of the present embodiment may have a configuration in which some of the constituent elements are deleted or changed, or other constituent elements may be added thereto.

The inertial measurement unit 10 (an example of a first sensor) includes an acceleration sensor 12, an angular velocity sensor 14, and a signal processing portion 16.

The acceleration sensor 12 detects respective accelerations in the three-axis directions which intersect each other (ideally, orthogonal to each other), and outputs a digital signal (acceleration data) corresponding to magnitudes and directions of the detected three-axis accelerations.

The angular velocity sensor 14 detects respective angular velocities in the three-axis directions which intersect each other (ideally, orthogonal to each other), and outputs a digital signal (angular velocity data) corresponding to magnitudes and directions of the detected three-axis angular velocities.

The signal processing portion 16 receives the acceleration data and the angular velocity data from the acceleration sensor 12 and the angular velocity sensor 14, respectively, adds time information thereto, stores the data items and the time information in a storage unit (not illustrated), generates sensing data in which the stored acceleration data, angular velocity data and time information conform to a predetermined format, and outputs the sensing data to the processing unit 2020.

The acceleration sensor 12 and the angular velocity sensor 14 are ideally installed so as to match three axes of a sensor coordinate system (b frame) with the inertial measurement unit 10 as a reference, but, in practice, an error occurs in an installation angle. Therefore, the signal processing portion 16 performs a process of converting the acceleration data and the angular velocity data into data of the sensor coordinate system (b frame) by using a correction parameter which is calculated in advance according to the installation angle error. Instead of the signal processing portion 16, the processing unit 2020 which will be described later may perform the process.

The signal processing portion 16 may perform a temperature correction process on the acceleration sensor 12 and the angular velocity sensor 14. Instead of the signal processing portion 16, the processing unit 2020 to be described later may perform the temperature correction process, and a temperature correction function may be incorporated into the acceleration sensor 12 and the angular velocity sensor 14.

The acceleration sensor 12 and the angular velocity sensor 14 may output analog signals, and, in this case, the signal processing portion 16 may A/D convert an output signal from the acceleration sensor 12 and an output signal from the angular velocity sensor 14 so as to generate sensing data.

The GPS unit 50 (an example of a second sensor) receives a GPS satellite signal which is transmitted from a GPS satellite which is one type of positioning satellite, performs positioning computation by using the GPS satellite signal so as to calculate a position and velocity (which is a vector including a magnitude and a direction) of the user in n frames, and outputs GPS data in which time information or positioning accuracy information is added to the calculated results to the processing unit 2020. A method of calculating a position or velocity or a method of generating time information by using GPS is well known, and thus detailed description thereof will be omitted.

The processing unit 2020 is constituted of, for example, a central processing unit (CPU), a digital signal processor (DSP), or an application specific integrated circuit (ASIC), and performs various calculation processes or control processes according to various programs stored in the storage unit 2030. Particularly, the processing unit 2020 receives sensing data from the inertial measurement unit 10, and receives GPS data from the GPS unit 50, so as to calculate a velocity, a position, an attitude angle, and the like of the user by using the sensing data and the GPS data. The processing unit 2020 performs various calculation processes by using the calculated information so as to analyze motion of the user and to generate motion analysis information (image data, text data, sound data, and the like) including a movement path or a movement time period. The processing unit 2020 transmits the generated motion analysis information to the display apparatus 3 via the communication unit 40.

The storage unit 2030 is constituted of, for example, recording media including various IC memories such as a read only memory (ROM), a flash ROM, and a random access memory (RAM), a hard disk, and a memory card.

Figure 24:
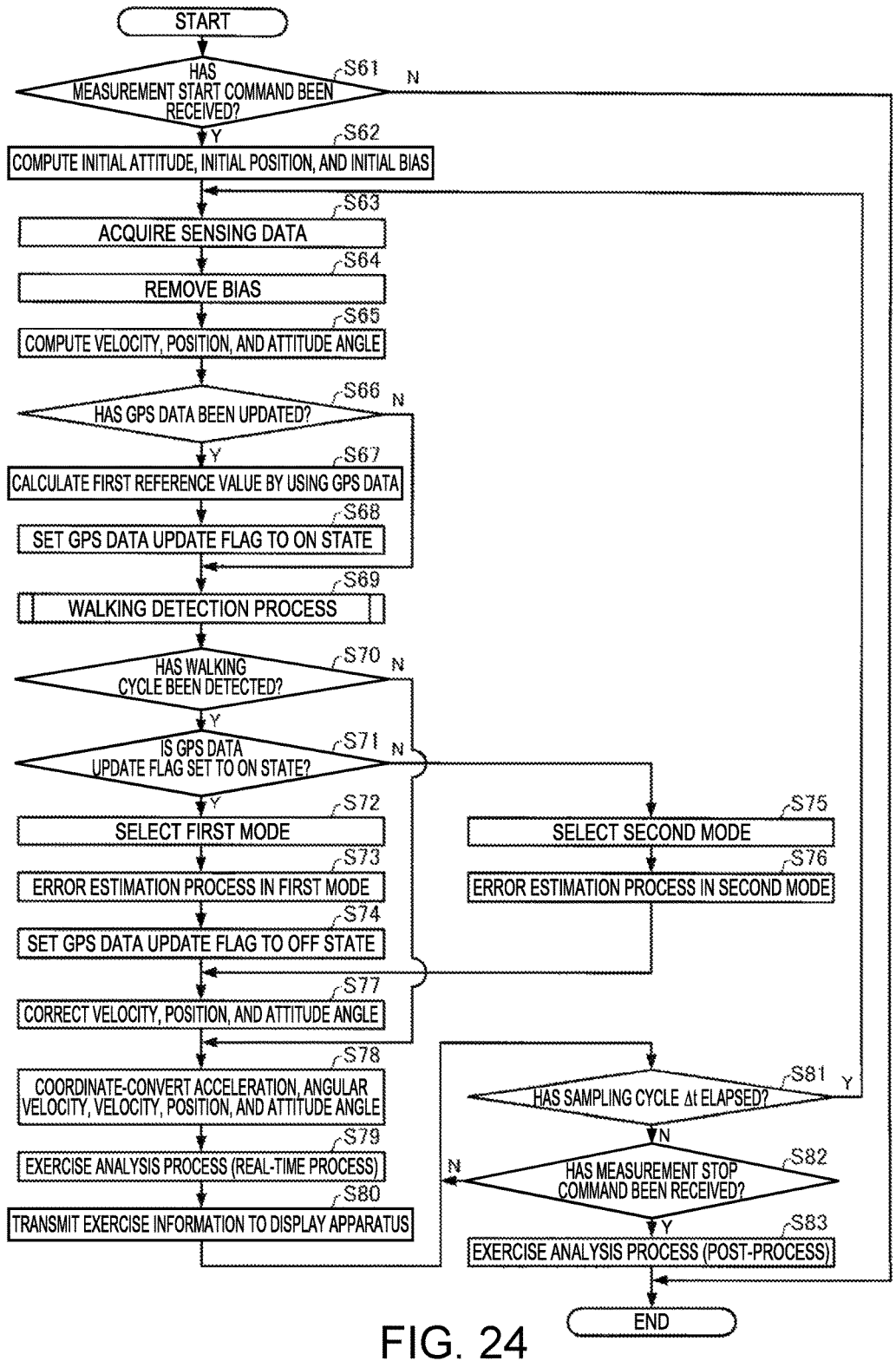
FIG. 24 is a flowchart illustrating examples of procedures of a motion analysis process.

The storage unit 2030 stores a motion analysis program 2300 which is read by the processing unit 2020 and is used to perform a motion analysis process (refer to FIG. 24). The motion analysis program 2300 includes a walking detection program 301 for performing a walking detection process (refer to FIG. 25) as a sub-routine.

The storage unit 2030 stores a sensing data table 310, a GPS data table 320, a calculated data table 330, motion analysis information 350, and the like.

The sensing data table 310 is used by the processing unit 2020 instead of the processing unit 20 of the first embodiment, and remaining configurations thereof are the same as those in the first embodiment.

The sensing data table 310 is a data table which stores sensing data (a detection result in the inertial measurement unit 10) received by the processing unit 2020 from the inertial measurement unit 10 in a time series (refer to FIG. 3). When measurement is started, the processing unit 2020 adds new sensing data to the sensing data table 310 whenever a sampling cycle Δt (for example, 20 ms) elapses. The processing unit 2020 corrects an acceleration and an angular velocity by using an acceleration bias and an angular velocity bias which are estimated according to error estimation (which will be described later) using the extended Karman filter, and updates the sensing data table 310 by overwriting the corrected acceleration and angular velocity to the sensing data table.

The GPS data table 320 is used by the processing unit 2020 instead of the processing unit 20 of the first embodiment, and remaining configurations thereof are the same as those in the first embodiment.

The GPS data table 320 has the same configuration as that in the first embodiment and the second embodiment, and is a data table which stores GPS data (a detection result in the GPS unit (GPS sensor) 50) received by the processing unit 2020 instead of the processing unit 20 from the GPS unit 50 in a time series (refer to FIG. 4). When measurement is started, the processing unit 2020 adds new GPS data whenever the GPS data is acquired (for example, in an asynchronous manner with acquisition timing of sensing data) so as to update the GPS data table 320.

The calculated data table 330 is used by the processing unit 2020 instead of the processing unit 20 of the first embodiment, and remaining configurations thereof are the same as those in the first embodiment.

The calculated data table 330 is a data table which stores a velocity, a position, and an attitude angle calculated by the processing unit 2020 by using the sensing data in a time series (refer to FIG. 5). When measurement is started, the processing unit 2020 calculates a velocity, a position, and an attitude angle whenever new sensing data is acquired, that is, the sampling cycle Δt elapses, and adds new calculated data to the calculated data table 330. The processing unit 2020 corrects a velocity, a position, and an attitude angle by using a velocity error, a position error, and an attitude angle error which are estimated according to error estimation using the extended Karman filter, and updates the calculated data table 330 by overwriting the corrected velocity, position and attitude angle to the calculated data table.

The motion analysis information 350 is various information pieces regarding the motion of the user, and, in the present embodiment, includes information regarding movement due to walking, information regarding an evaluation index of walking motion, and information regarding advice, an instruction, and a warning for walking, calculated by the processing unit 2020.

The communication unit 40 performs data communication with a communication unit 140 of the display apparatus 3, and performs a process of receiving motion analysis information generated by the processing unit 2020 and transmitting the motion analysis information to the display apparatus 3, a process of receiving a command (a command for starting or finishing measurement, or the like) transmitted from the display apparatus 3 and sending the command to the processing unit 2020, and the like.

The display apparatus 3 includes a processing unit 120, a storage unit 130, the communication unit 140, an operation unit 150, a clocking unit 160, a display unit 170, and a sound output unit 180. The display apparatus 3 is the same as that of the first embodiment except that data communication is performed with the motion analysis apparatus 2002 instead of the motion analysis apparatus 2 of the first embodiment, and thus detailed description thereof will not be repeated. In addition, the display apparatus 3 of the present embodiment may have a configuration in which some of the constituent elements are deleted or changed, or other constituent elements may be added thereto.

Figure 20:
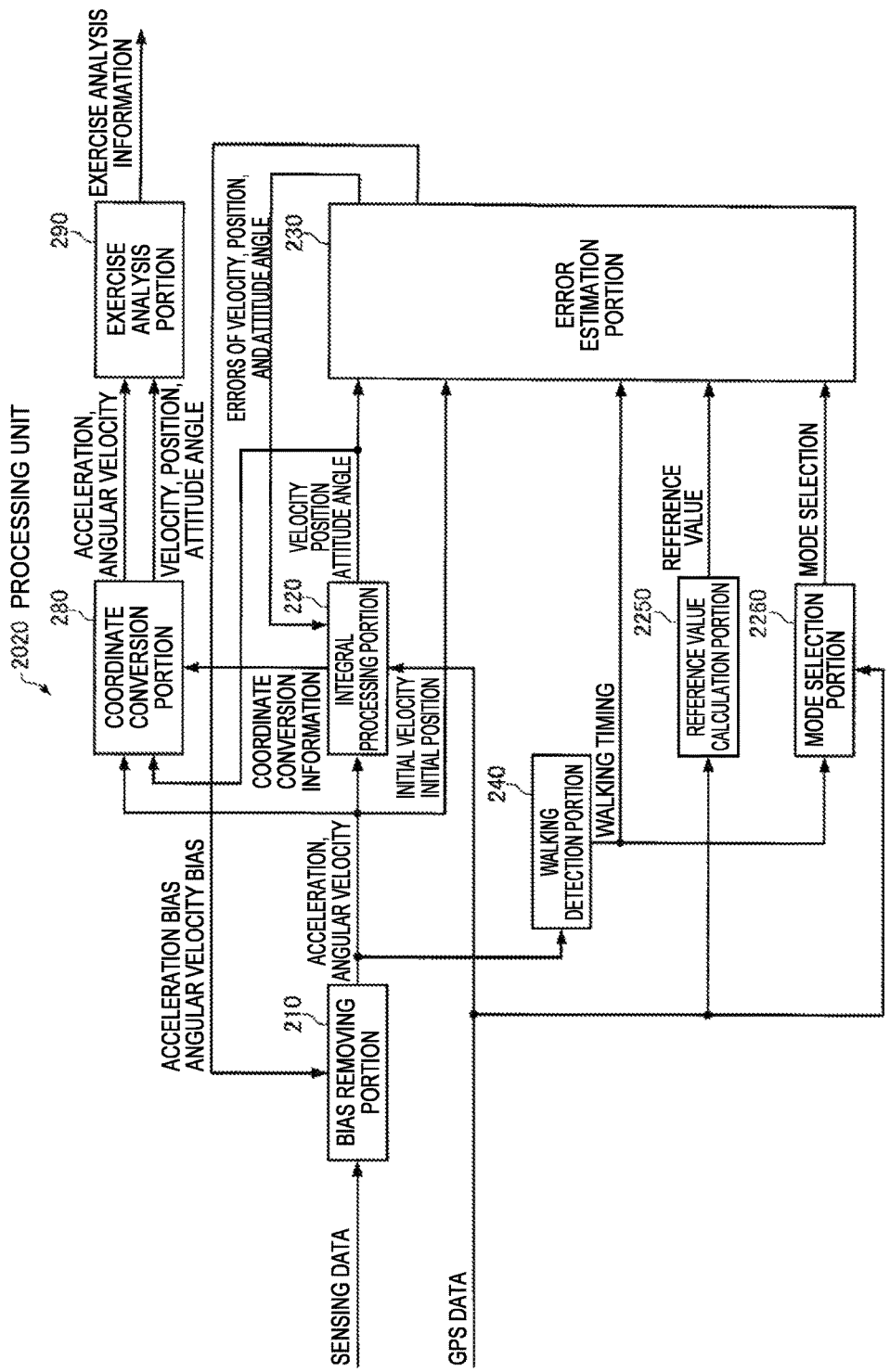
FIG. 20 is a functional block diagram illustrating a configuration example of a processing unit of the motion analysis apparatus.

FIG. 20 is a functional block diagram illustrating a configuration example of the processing unit 2020 of the motion analysis apparatus 2002. In the present embodiment, the processing unit 2020 functions as a bias removing portion 210, an integral processing portion 220, an error estimation portion 230, a walking detection portion 240, a reference value calculation portion 2250, a mode selection portion 2260, a coordinate transformation portion 280, and a motion analysis portion 290, by executing the motion analysis program 2300 stored in the storage unit 2030.

The bias removing portion 210 subtracts an acceleration bias $b_a$ and an angular velocity bias $b_\omega$ estimated by the error estimation portion 230 from accelerations (three-axis accelerations) and angular velocities included in acquired new sensing data, so as to perform a process of correcting the accelerations and the angular velocities. Since the acceleration bias $b_a$ and the angular velocity bias $b_\omega$ are not present in an initial state right after measurement is started, the bias removing portion 210 computes initial biases by using sensing data from the inertial measurement unit assuming that an initial state of the user is a stationary state.

The integral processing portion 220 performs a process of calculating a velocity $v^e$, a position $p^e$, and attitude angles (a roll angle $\phi_{be}$, a pitch angle $\theta_{be}$, and a yaw angle $\psi_{be}$) of the e frame on the basis of the accelerations and the angular velocities corrected by the bias removing portion 210. Specifically, first, the integral processing portion 220 sets an initial velocity to zero assuming that an initial state of the user is a stationary state, or calculates an initial velocity by using the velocity included in the GPS data and also calculates an initial position by using the position included in the GPS data. The integral processing portion 220 specifies a gravitational acceleration direction on the basis of the three-axis accelerations of the b frame corrected by the bias removing portion 210 so as to calculate initial values of the roll angle $\phi_{be}$ and the pitch angle $\theta_{be}$, also calculates an initial value of the yaw angle $\psi_{be}$ on the basis of the velocity including the GPS data, and sets the calculated initial values as initial attitude angles of the e frame. In a case where the GPS data cannot be obtained, an initial value of the yaw angle $\psi_{be}$ is set to, for example, zero. The integral processing portion 220 calculates an initial value of a coordinate transformation matrix (rotation matrix) $C_b^e$ from the b frame into the e frame, expressed by Equation (1) on the basis of the calculated initial attitude angles.

[Expression 30]

$$C_b^e = \begin{bmatrix} \cos\theta_{be} \cdot \cos\varphi_{be} & \cos\theta_{be} \cdot \sin\varphi_{be} & -\sin\theta_{be} \\ \sin\phi_{be} \cdot \sin\theta_{be} \cdot \cos\varphi_{be} - \cos\phi_{be} \cdot \sin\varphi_{be} & \sin\phi_{be} \cdot \sin\theta_{be} \cdot \sin\varphi_{be} + \cos\phi_{be} \cdot \cos\varphi_{be} & \sin\phi_{be} \cdot \cos\theta_{be} \\ \cos\phi_{be} \cdot \sin\theta_{be} \cdot \cos\varphi_{be} + \sin\phi_{be} \cdot \sin\varphi_{be} & \cos\phi_{be} \cdot \sin\theta_{be} \cdot \sin\varphi_{be} - \sin\phi_{be} \cdot \cos\varphi_{be} & \cos\phi_{be} \cdot \cos\theta_{be} \end{bmatrix} \quad (1)$$

Then, the integral processing portion 220 performs integration (rotation calculation) of the three-axis angular velocities corrected by the bias removing portion 210 so as to calculate the coordinate transformation matrix $C_b^e$, and calculates attitude angles by using Equation (2).

[Expression 31]

$$\begin{bmatrix} \phi_{be} \\ \theta_{be} \\ \varphi_{be} \end{bmatrix} = \begin{bmatrix} \arctan2(C_b^e(2,3), C_b^e(3,3)) \\ -\arcsin C_b^e(1,3) \\ \arctan2(C_b^e(1,2), C_b^e(1,1)) \end{bmatrix} \quad (2)$$

The integral processing portion 220 converts the three-axis accelerations of the b frame corrected by the bias removing portion 210 into three-axis accelerations of the e frame by using the coordinate transformation matrix $C_b^e$, and removes an gravitational acceleration component therefrom for integration so as to calculate the velocity $v^e$ of the e frame. The integral processing portion 220 integrates the velocity $v^e$ of the e frame so as to calculate the position $p^e$ of the e frame.

The integral processing portion 220 also performs a process of correcting the velocity $v^e$, the position $p^e$, and the attitude angles by using a velocity error $\delta v^e$, a position error $\delta p^e$, and attitude angle errors $\varepsilon^e$ estimated by the error estimation portion 230.

The integral processing portion 220 also calculates a coordinate transformation matrix $C_b^m$ from the b frame into the m frame, and a coordinate transformation matrix $C_e^m$ from the e frame into the m frame. The coordinate transformation matrices are used for a coordinate transformation process in the coordinate transformation portion 280 which will be described later as coordinate transformation information.

The error estimation portion 230 estimates an error of an index indicating a state of the user by using the velocity and/or the position, and the attitude angles calculated by the integral processing portion 220, the acceleration or the angular velocity corrected by the bias removing portion 210, and GPS data. In the present embodiment, the error estimation portion 230 uses the velocity, the attitude angles, the acceleration, the angular velocity, and the position as indexes indicating a state of the user, and estimates errors of the indexes by using the extended Karman filter. In other words, the error estimation portion 230 uses an error (velocity error) $\delta v^e$ of the velocity $v^e$ calculated by the integral processing portion 220, errors (attitude angle errors) $\varepsilon^e$ of the attitude angles calculated by the integral processing portion 220, the acceleration bias $b_a$, the angular velocity bias $b_\omega$, and an error (position error) $\delta p^e$ of the position $p^e$ calculated by the integral processing portion 220, as state variables of the extended Karman filter, and a state vector X is defined as in Equation (3).

[Expression 32]

$$X = \begin{bmatrix} \delta v^e \\ \varepsilon^e \\ b_a \\ b_\omega \\ \delta p^e \end{bmatrix} \quad (3)$$

The error estimation portion 230 predicts state variables (errors of the indexes indicating a state of the user) included in the state vector X by using the prediction formulae of the extended Karman filter. The prediction formulae of the extended Karman filter are expressed as in Equation (4). In Equation (4), the matrix $\Phi$ is a matrix which associates the previous state vector X with the present state vector X, and is designed so that some elements thereof change every moment while reflecting attitude angles, a position, and the like. Q is a matrix indicating process noise, and each element thereof is set to an appropriate value. P is an error covariance matrix of the state variables.

[Expression 33]

$X = \Phi X$ $P = \Phi P \Phi^T + Q$ (4)

The error estimation portion 230 updates (corrects) the predicted state variables (errors of the indexes indicating a state of the user) by using update formulae of the extended Karman filter. The update formulae of the extended Karman filter are expressed as in Equation (5). Z and H are respectively an observation vector and an observation matrix, and the update formulae (5) indicate that the state vector X is corrected by using a difference between the actual observation vector Z and a vector HX predicted from the state vector X. R is a covariance matrix of observation errors, and may have predefined constant values, and may be dynamically changed. K is a Karman gain, and K increases as R decreases. From Equation (5), as K increases (R decreases), a correction amount of the state vector X increases, and thus P decreases.

[Expression 34]

$K = PH^T(HPH^T + R)^{-1}$ $X = X + K(Z - HX)$ $P = (I - KH)P$ (5)

An error estimation method (a method of estimating the state vector X) may include, for example, the following methods.

(Error Estimation Method Using Correction Based on Attitude Angle Errors)

Figure 21:
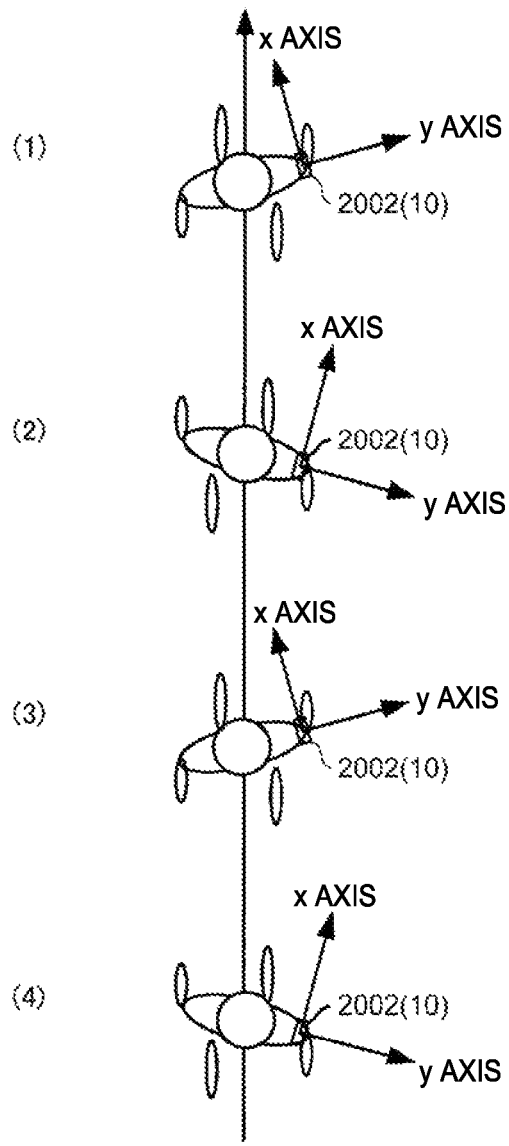
FIG. 21 is a diagram illustrating an attitude during a user's walking.
Figure 22:
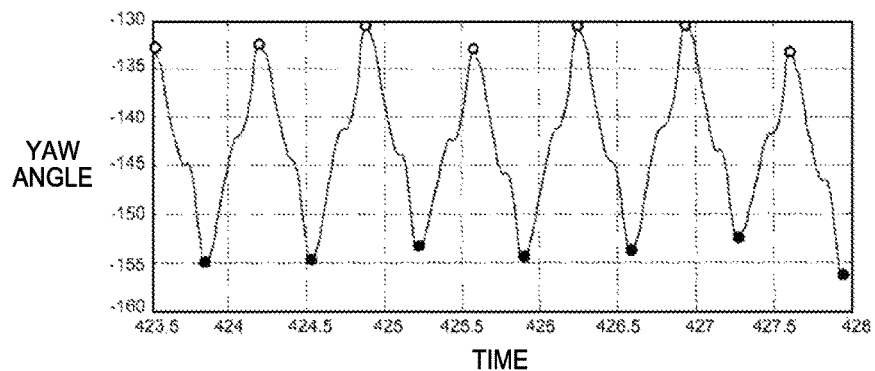
FIG. 22 is a diagram illustrating a yaw angle during the user's walking.

FIG. 21 is an overhead view of movement of the user in a case where the user wearing the motion analysis apparatus 2002 on the user's right waist performs a walking action (advancing straight). FIG. 22 is a diagram illustrating an example of a yaw angle (azimuth angle) calculated by using a detection result in the inertial measurement unit 10 in a case where the user performs the walking action (advancing straight), in which a transverse axis expresses time, and a longitudinal axis expresses a yaw angle (azimuth angle).

An attitude of the inertial measurement unit 10 relative to the user changes at any time due to the walking action of the user. In a state in which the user takes a step forward with the right foot, as illustrated in (2) or (4) of FIG. 21, the inertial measurement unit 10 is tilted to the left side with respect to the advancing direction (the x axis of the m frame). In contrast, in a state in which the user takes a step forward with the left foot, as illustrated in (1) or (3) of FIG. 21, the inertial measurement unit 10 is tilted to the right side with respect to the advancing direction (the x axis of the m frame). In other words, the attitude of the inertial measurement unit 10 periodically changes every two steps including left and right steps due to the walking action of the user. In FIG. 22, for example, the yaw angle is the maximum (indicated by O in FIG. 22) in a state in which the user takes a step forward with the right foot, and is the minimum (indicated by • in FIG. 22) in a state in which the user takes a step forward with the left foot. Therefore, an error can be estimated assuming that the previous (two steps before) attitude angle is the same as the present attitude angle, and the previous attitude angle is a true attitude angle. In this method, the observation vector Z and the observation matrix H are as in Equation (6). In Equation (6), $O_{3,3}$ is a zero matrix of three rows and three columns, $I_3$ is a unit matrix of three rows and three columns, and $O_{3,9}$ is a zero matrix of three rows and nine columns. $\Psi$ in Equation (6) is computed according to Equation (7).

[Expression 35]

$$Z = \begin{bmatrix} \psi(3, 2) \\ \psi(1, 3) \\ \psi(2, 1) \end{bmatrix} \quad (6)$$

$H = [O_{3,3} \quad I_3 \quad O_{3,9}]$

[Expression 36]

$\psi = C_b^e(+) \cdot C_b^e(-)^T - I_3$ (7)

In Equation (7), $C_b^e(+)$ indicates the present attitude angle, and $C_b^e(-)$ indicates the previous attitude angle. The observation vector Z in Equation (6) is a difference between the previous attitude angle and the present attitude angle, and the state vector X is corrected on the basis of a difference between the attitude angle error $\varepsilon^e$ and an observed value according to the update formulae (5) so that an error is estimated.

(Error Estimation Method Using Correction Based on the Angular Velocity Bias)

This method is a method of estimating an error assuming that the previous (two steps before) attitude angle is the same as the present attitude angle, and the previous attitude angle is not required to be a true attitude angle. In this method, the observation vector Z and the observation matrix H are as in Equation (8). In Equation (8), $O_{3,9}$ is a zero matrix of three rows and nine columns, $I_3$ is a unit matrix of three rows and three columns, and $O_{3,3}$ is a zero matrix of three rows and three columns.

[Expression 37]

$$Z = \frac{I_3 - C_b^e(+)^T \cdot C_b^e(-)}{\tau_{-+}} \quad (8)$$

$$H = [O_{3,9} \ I_3 \ O_{3,3}]$$

In Equation (8), $C_b^e(+)$ indicates the present attitude angle, and $C_b^e(-)$ indicates the previous attitude angle. In addition, $\tau_{-+}$ is a time period in which the previous attitude angle changes to the present attitude angle. The observation vector Z in Equation (8) is an angular velocity bias calculated on the basis of the previous attitude angle and the present attitude angle, and, in this method, the state vector X is corrected on the basis of a difference between the angular velocity bias $b_\omega$ and an observed value according to the update formulae (5), so that an error is estimated.

(Error Estimation Method Using Correction Based on Azimuth Angle Error)

This method is a method of estimating an error assuming that the previous (two steps before) yaw angle (azimuth angle) is the same as the present yaw angle (azimuth angle), and the previous yaw angle (azimuth angle) is a true yaw angle (azimuth angle). In this method, the observation vector Z is a difference between the previous yaw angle and the present yaw angle calculated by the integral processing portion 220, and the state vector X is corrected on the basis of a difference between an azimuth angle error $\varepsilon_z^e$ and an observed value according to the update formulae (5) so that an error is estimated.

(Error Estimation Method Using Correction Based on Stoppage)

This method is a method of estimating an error assuming that a velocity is zero when the user stops. In this method, the observation vector Z is a difference between a velocity $v^e$ calculated by the integral processing portion 220 and zero, and the state vector X is corrected on the basis of the velocity error $\delta v^e$ according to the update formulae (5) so that an error is estimated.

(Error Estimation Method Using Correction Based on Standing Still)

This method is a method of estimating an error assuming that a velocity is zero and an attitude change is also zero when the user stands still. In this method, the observation vector Z is an error of the velocity $v^e$ calculated by the integral processing portion 220 and a difference between the previous attitude angle and the present attitude angle calculated by the integral processing portion 220, and the state vector X is corrected on the basis of the velocity error $\delta v^e$ and the attitude angle error $\varepsilon^e$ according to the update formulae (5) so that an error is estimated.

(Error Estimation Method Using Correction Based on Observed Value of GPS)

This method is a method of estimating an error assuming that the velocity $v^e$, the position $p^e$, or the yaw angle $\psi_{be}$ calculated by the integral processing portion 220 is the same as a velocity, a position, or an azimuth angle (a velocity, a position, or an azimuth angle after being converted into the e frame) which is calculated by using GPS data. In this method, the observation vector Z is a difference between a velocity, a position, or a yaw angle calculated by the integral processing portion 220 and a velocity, a positional velocity, or an azimuth angle calculated by using the GPS data, and the state vector X is corrected on the basis of a difference between the velocity error $\delta v^e$, the position error $\delta p^e$, or the azimuth angle errors $\varepsilon_z^e$, and an observed value according to the update formulae (5) so that an error is estimated. Among the method, in the "error estimation method using correction based on azimuth angle of GPS" with an azimuth angle calculated by using GPS data as a reference, the observation vector Z and the observation matrix H are as in Equation (9). In Equation (9), $\psi_{INS}$ is an azimuth angle calculated by using the yaw angle $\psi_{be}$ calculated by the integral processing portion 220, and $\psi_{ref}$ is a reference azimuth angle. In Equation (9), $O_{1,3}$ is a zero matrix of one row and three columns, and $O_{1,9}$ is a zero matrix of one row and nine columns. Each partial differentiation in Equation (9) is computed according to Equation (10). Here, $n_1$, $n_2$, $n_3$, $d_1$, $d_2$, and $d_3$ in Equation (10) are computed according to Equation (11).

[Expression 38]

$$Z = \varphi_{INS} - \varphi_{ref} \quad (9)$$

$$H = \left[ O_{1,3} \ \frac{\partial \hat{\varphi}}{\partial \varepsilon_x} \ \frac{\partial \hat{\varphi}}{\partial \varepsilon_y} \ \frac{\partial \hat{\varphi}}{\partial \varepsilon_z} \ O_{1,9} \right]$$

[Expression 39]

$$\frac{\partial \hat{\varphi}}{\partial \varepsilon_x} = \frac{n_1 \cdot \hat{C}_b^n(1,1) - d_1 \cdot \hat{C}_b^n(2,1)}{\hat{C}_b^n(2,1)^2 + \hat{C}_b^n(1,1)^2} \quad (10)$$

$$\frac{\partial \hat{\varphi}}{\partial \varepsilon_y} = \frac{n_2 \cdot \hat{C}_b^n(1,1) - d_2 \cdot \hat{C}_b^n(2,1)}{\hat{C}_b^n(2,1)^2 + \hat{C}_b^n(1,1)^2}$$

$$\frac{\partial \hat{\varphi}}{\partial \varepsilon_z} = \frac{n_3 \cdot \hat{C}_b^n(1,1) - d_3 \cdot \hat{C}_b^n(2,1)}{\hat{C}_b^n(2,1)^2 + \hat{C}_b^n(1,1)^2}$$

[Expression 40]

$$n_1 = C_e^n(2,2) \cdot C_b^e(3,1) - C_e^n(2,3) \cdot C_b^e(2,1) \quad (11)$$

$$n_2 = C_e^n(2,3) \cdot C_b^e(1,1) - C_e^n(2,1) \cdot C_b^e(3,1)$$

$$n_3 = C_e^n(2,1) \cdot C_b^e(2,1) - C_e^n(2,2) \cdot C_b^e(1,1)$$

$$d_1 = C_e^n(1,2) \cdot C_b^e(3,1) - C_e^n(1,3) \cdot C_b^e(2,1)$$

$$d_2 = C_e^n(1,3) \cdot C_b^e(1,1) - C_e^n(1,1) \cdot C_b^e(1,1)$$

$$d_3 = C_e^n(1,1) \cdot C_b^e(2,1) - C_e^n(1,3) \cdot C_b^e(1,1)$$

Among the methods, the "error estimation method using correction on the basis of attitude angle errors", the "error estimation method using correction based on azimuth angle error", and the "error estimation method using correction based on the angular velocity bias" (hereinafter, collectively referred to as "error estimation methods using attitude angle") do not require external information such as GPS data, and are also advantageous in terms of being applicable to the time of walking. All of these methods have the condition in which the previous (two steps before) attitude angle (azimuth angle) is the present attitude angle (azimuth angle), and thus it is necessary to estimate an error at timings of nearly identical attitude angles every two steps.

Figure 23:
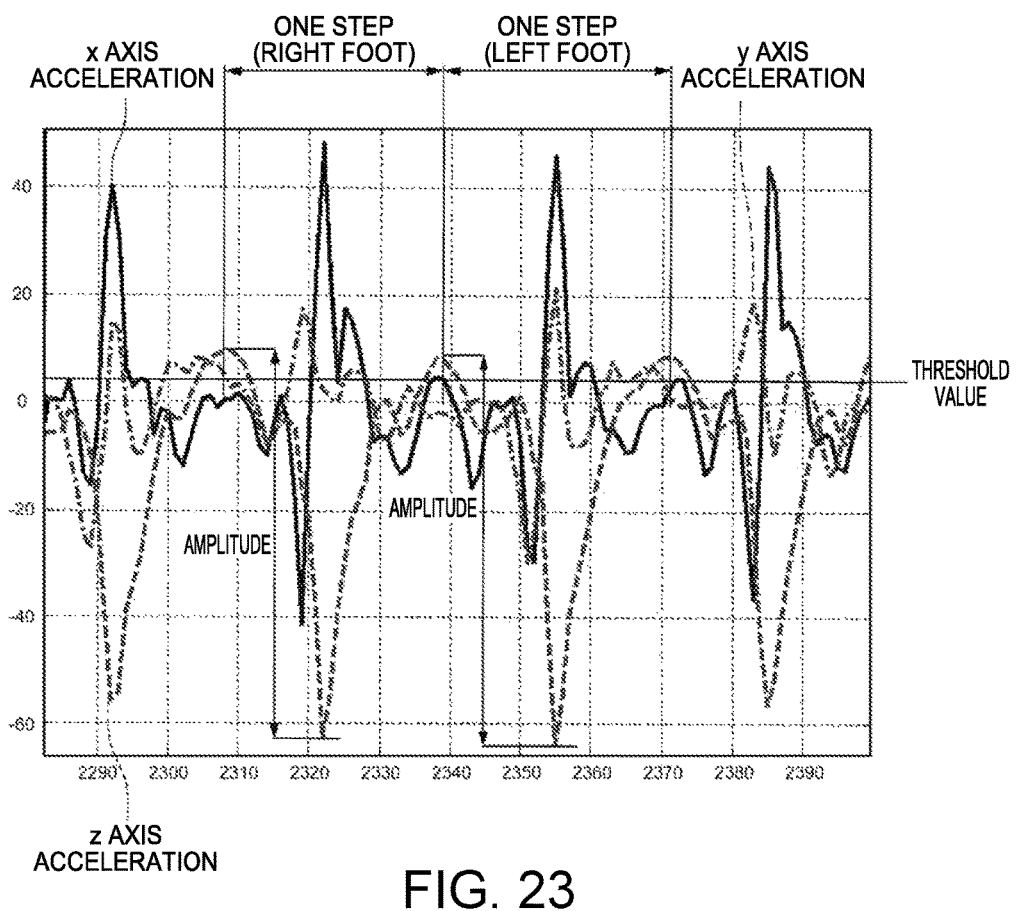
FIG. 23 is a diagram illustrating examples of three-axis accelerations during the user's walking.

Referring to FIG. 20 again, the walking detection portion 240 performs a process of detecting a walking cycle of the user (walking timing) by using a detection result (specifically, sensing data corrected by the bias removing portion 210) in the inertial measurement unit 10. As described in FIGS. 21 and 22, since the user's attitude periodically changes (every two steps (including left and right steps)) while the user is walking, an acceleration detected by the inertial measurement unit 10 also periodically changes. FIG. 23 is a diagram illustrating examples of three-axis accelerations detected by the inertial measurement unit 10 during the user's walking. In FIG. 23, a transverse axis expresses time, and a longitudinal axis expresses an acceleration value. As illustrated in FIG. 23, the three-axis accelerations periodically change, and, particularly, it can be seen that the z axis (the axis in the gravitational direction) acceleration changes periodically and regularly. The z axis acceleration reflects an acceleration obtained when the user moves vertically, and a time period from the time at which the z axis acceleration becomes the maximum value which is equal to or greater than a predetermined threshold value to the time at which the z axis acceleration becomes the maximum value which is equal to or greater than the predetermined threshold value next corresponds to a time period of one step. One step in a state in which the user takes a step forward with the right foot and one step in a state in which the user takes a step forward with the left foot are alternately taken in a repeated manner.

Therefore, in the present embodiment, the walking detection portion 240 detects a walking cycle every other time whenever the z axis acceleration (corresponding to an acceleration obtained when the user moves vertically) detected by the inertial measurement unit 10 becomes the maximum value which is equal to or greater than the predetermined threshold value. However, actually, since a high frequency noise component is included in the z axis accelerations detected by the inertial measurement unit 10, the walking detection portion 240 applies a low-pass filter to the z axis accelerations, and detects a walking cycle by using a z axis acceleration from which noise is removed.

The reference value calculation portion 2250 generates a reference value (reference) for error estimation by using GPS data in synchronization with a timing at which the GPS data (a detection result in the GPS unit 50) is obtained (updated). The reference value calculation portion 2250 calculates, for example, an azimuth angle of the advancing direction of the user as a reference value. In this case, the reference value calculation portion 2250 may calculate the azimuth angle of the advancing direction on the basis of a direction of a velocity included in the GPS data, and may calculate the azimuth angle of the advancing direction on the basis of two positions included in two GPS data items. In a case where information regarding an azimuth angle is included in the GPS data, the azimuth angle may be used as the azimuth angle of the advancing direction.

The mode selection portion 2260 selects one of a first mode and a second mode as an error estimation mode in the error estimation portion 230 on the basis of the GPS data (a detection result in the GPS unit 50). In the present embodiment, the mode selection portion 2260 selects the first mode in a case where GPS data has been updated after the previous walking cycle was detected at a timing at which the walking detection portion 240 detects a walking cycle (a cycle corresponding to two steps), and selects the second mode if the GPS data has not been updated. The mode selection portion 2260 may store, for example, a time point at which a walking cycle was detected, and compare the time point 321 of the most recent GPS data included in the GPS data table 320 with the time point at which the walking cycle was detected so as to determine whether or not GPS data has been updated.

In a case where the mode selection portion 2260 selects the first mode, the error estimation portion 230 corrects the state vector X predicted by using the prediction formulae (4), according to the update formulae (5) by using a first reference value based on the GPS data (a detection result in the GPS unit 50) and a first state variable (an example of a first error among errors of indexes indicating a state of the user) among state variables included in the state vector X without using a second reference value based on sensing data (a detection result in the inertial measurement unit 10). In a case where the mode selection portion 2260 selects the second mode, the error estimation portion 230 corrects the state vector X predicted by using the prediction formulae (4), according to the update formulae (5) by using the second reference value based on sensing data (a detection result in the inertial measurement unit 10) and the first state variable included in the state vector X without using a first reference value based on the GPS data (a detection result in the GPS unit 50). To summarize, in the first mode, the error estimation portion 230 calculates the observation vector Z by using the first reference value which is calculated on the basis of GPS data by the reference value calculation portion 2250 without using the second reference value based on a calculation result in the integral processing portion 220, and sets the observation matrix H in which HX is a value of the first state variable. In the second mode, the error estimation portion 230 calculates the observation vector Z by using the second reference value based on a calculation result in the integral processing portion 220 without using first reference value which is calculated on the basis of GPS data by the reference value calculation portion 2250, and sets the observation matrix H in which HX is a value of the first state variable.

For example, in the first mode, the error estimation portion 230 calculates the observation vector Z according to Equation (9) with an azimuth angle calculated by the reference value calculation portion 2250 as a reference value $\psi_{ref}$ (corresponding to the first reference value) by using the "error estimation method using correction on the basis of azimuth angle of GPS", sets the observation matrix H in Equation (9), calculates an azimuth angle error (corresponding to the first state variable) as HX, and corrects the state vector X according to the update formulae (5). For example, in the second mode, the error estimation portion 230 calculates the observation vector Z according to Equations (6) and (7) with the previous coordinate transformation matrix calculated by the integral processing portion 220 as a reference value $C_b^e(-)$ (corresponding to the second reference value) by using the "error estimation method using correction on the basis of attitude angle error", sets the observation matrix H in Equation (6), calculates a three-dimensional attitude angle error (including an azimuth error as an element) as HX, and corrects the state vector X according to the update formulae (5). In both of the correction of the state vector X in the first mode and the correction of the state vector X in the second mode, an azimuth angle error (corresponding to the first state variable) is computed as Z or HX. To summarize, in a case where two different error estimation methods (hereinafter, referred to as two error estimation methods of performing duplicate correction) of correcting the statistical value by using a difference (Z-HX) of identical state variables included in the state vector X are used together, the error estimation portion 230 exclusively selects only one of the first mode and the second mode. Since one of the two error estimation methods of performing duplicate correction is exclusively selected as mentioned above, double estimation is not performed, and it is possible to suppress a reduction in error estimation accuracy.

In a case where the mode selection portion 2260 selects the first mode, the error estimation portion further corrects the state vector X predicted by using the prediction formulae (4), according to the update formulae (5) by using a third reference value based on sensing data (a detection result in the inertial measurement unit 10) and a second state variable (an example of a second error among errors of the indexes indicating a state of the user) among the state variables included in the state vector X. To summarize, in the first mode, the error estimation portion 230 calculates the observation vector Z by using the first reference value which is calculated on the basis of GPS data by the reference value calculation portion 2250 and the third reference value based on a calculation result in the integral processing portion 220, and sets the observation matrix H in which elements of HX are a value of the first state variable and a value of the second state variable.

For example, in the first mode, the error estimation portion 230 calculates an observation vector in which Z in Equation (9) and Z in Equation (8) are put together, with an azimuth angle calculated by the reference value calculation portion 2250 as a reference value $\psi_{ref}$ (corresponding to the first reference value) by using the "error estimation method using correction on the basis of azimuth angle of GPS", and with the previous coordinate transformation matrix calculated by the integral processing portion 220 as a reference value $C_b^e(-)$ (corresponding to the third reference value) by using the "error estimation method using correction on the basis of attitude angle error". The error estimation portion 230 sets an observation matrix in which the observation matrix H in Equation (9) and the observation matrix H in Equation (8) are put together, calculates HX having a value of an azimuth error (corresponding to the first state variable) and a value of an angular velocity bias (corresponding to the second state variable) as elements, and corrects the state vector X according to the update formulae (5). To summarize, in the first mode, the error estimation portion 230 simultaneously applies two different error estimation methods (hereinafter, referred to as "two error estimation methods of performing non-duplicate correction") of correcting the state vector X by using a difference (Z-HX) between different state variables included in the state vector X. Even if the two error estimation methods of performing non-duplicate correction are simultaneously applied as mentioned above, double estimation is not performed, and it is possible to suppress a reduction in error estimation accuracy.

The coordinate transformation portion 280 performs a coordinate transformation process of converting the accelerations and the angular velocities of the b frame corrected by the bias removing portion 210 into accelerations and angular velocities of the m frame, respectively, by using the coordinate transformation information (coordinate transformation matrix $C_b^m$) from the b frame into the m frame, calculated by the integral processing portion 220. The coordinate transformation portion 280 performs a coordinate transformation process of converting the velocities, the position, and the attitude angles of the e frame calculated by the integral processing portion 220 into velocities, a position, and attitude angles of the m frame, respectively, by using the coordinate transformation information (coordinate transformation matrix $C_e^m$) from the e frame into the m frame, calculated by the integral processing portion 220.

The motion analysis portion 290 performs a process of various calculations by using the accelerations, the angular velocities, the velocities, the position, and the attitude angles of the m frame obtained through coordinate transformation in the coordinate transformation portion 280, so as to analyze the user's motion and to generate the motion analysis information 350. In the present embodiment, the motion analysis portion 290 generates the motion analysis information 350 including information regarding movement such as a movement path, a movement velocity, and a movement time in the user's waling, information regarding an evaluation index of walking motion such as the extent of forward tilt, a difference between left and right motions, propulsion efficiency, an amount of energy consumption, and energy efficiency, information regarding advice or an instruction for better walking, warning information (information for causing the display apparatus 3 to output warning display or warning sound) indicating that an attitude is bad, and the like.

The processing unit 2020 transmits the motion analysis information 350 to the display apparatus 3, and the motion analysis information 350 is displayed on the display unit 170 illustrated in FIG. 3 as text, images, graphics, or the like, or is output as voice or buzzer sound from the sound output unit 180. Fundamentally, the motion analysis information 350 is displayed on the display unit 170, and thus the user can view the display unit 170 and check the motion analysis information when the user wants to know the motion analysis information. Information (warning information) which is desired to attract the user's attention is output as at least sound, and thus the user is not required to walk while normally viewing the display unit 170.

4. Procedure of Process

FIG. 24 is a flowchart illustrating examples (an example of a motion analysis method) of procedures of the motion analysis process performed by the processing unit 2020. The processing unit 2020 performs the motion analysis process according to the procedures of the flowchart illustrated in FIG. 24 by executing the motion analysis program 2300 stored in the storage unit 2030.

As illustrated in FIG. 24, if a command for starting measurement has been received (Y in step S61), first, the processing unit 2020 computes an initial attitude, an initial position, and an initial bias by using sensing data and GPS data measured by the inertial measurement unit 10 assuming that the user stands still (step S62).

Next, the processing unit 2020 acquires the sensing data from the inertial measurement unit 10, and adds the acquired sensing data to the sensing data table 310 (step S63).

Next, the processing unit 2020 removes biases from acceleration and angular velocity included in the sensing data acquired in step S63 by using the initial bias (by using the acceleration bias $b_a$ and an angular velocity bias $b_\omega$ after the acceleration bias $b_a$ and the angular velocity bias $b_\omega$ are estimated in step S75) so as to correct the acceleration and the angular velocity, and updates the sensing data table 310 by using the corrected acceleration and angular velocity (step S64).

Next, the processing unit 2020 integrates the sensing data corrected in step S64 so as to compute a velocity, a position, and an attitude angle, and adds calculated data including the computed velocity, position, and attitude angle to the calculated data table 330 (step S65).

Next, in a case where GPS data has been updated (Y in step S66), the processing unit 2020 calculates a reference value (for example, a reference value of an azimuth angle) on the basis of the GPS data (step S67), and sets a GPS data update flag to an ON state (step S68). On the other hand, in a case where GPS data has not been updated (N in step S66), the processing unit 2020 does not perform the processes in steps S67 and S68.

Next, the processing unit 2020 performs a walking detection process (step S69). Examples of procedures of the walking detection process will be described later.

Next, in a case where a walking cycle is detected in the walking detection process (step S69) (Y in step S70), if the GPS data update flag is set to an ON state (Y in step S71), the processing unit 2020 selects the first mode (step S72), performs an error estimation process in the first mode (step S73), and sets the GPS data update flag to an OFF state (step S74). In step S73, the processing unit 2020 estimates a velocity error $\delta v^e$, an attitude angle error $\epsilon^e$, an acceleration bias $b_a$, an angular velocity bias $b_\omega$, and a position error $\delta p^e$ by applying the Karman filter by using the first reference value calculated in step S67 and a first state variable without using a second reference value calculated on the basis of sensing data. In step S73, the processing unit 2020 calculates a third reference value based on sensing data, and estimates a velocity error $\delta v^e$, an attitude angle error $\epsilon^e$, an acceleration bias $b_a$, an angular velocity bias $b_\omega$, and a position error $\delta p^e$ by applying the Karman filter by using the third reference value and a second state variable.

If the GPS data update flag is set to an OFF state (N in step S71), the processing unit 2020 selects the second mode (step S75), and performs an error estimation process in the second mode (step S76). In step S76, the processing unit 2020 calculates the second reference value based on sensing data, and estimates a velocity error $\delta v^e$, an attitude angle error $\epsilon^e$, an acceleration bias $b_a$, an angular velocity bias $b_\omega$, and a position error $\delta p^e$ by applying the Karman filter by using the second reference value and the first state variable without using the first reference value based on the GPS data.

Next, the processing unit 2020 corrects the velocity, the position, and the attitude angle by using the velocity error $\delta v^e$, the attitude angle error $\epsilon^e$, and the position error $\delta p^e$ estimated in step S73 or S76, and updates the calculated data table 330 by using the corrected velocity, position, and the attitude angle (step S77).

In a case where a walking cycle has not been detected (N in step S70), the processing unit 2020 does not perform the processes in steps S71 to S77.

Next, the processing unit 2020 performs coordinate transformation of the sensing data (the acceleration and the angular velocity of the b frame) stored in the sensing data table 310 and the calculated data (the velocity, the position, and the attitude angle of the e frame) stored in the calculated data table 330 into acceleration, angular velocity, velocity, a position, and an attitude angle of the m frame (step S78). The processing unit 2020 stores the acceleration, the angular velocity, the velocity, the position, and the attitude angle of the m frame in the storage unit 2030 in a time series.

Next, the processing unit 2020 analyzes the user's motion in real time by using the acceleration, the angular velocity, the velocity, the position, and the attitude angle of the m frame obtained through the coordinate conversation in step S78, so as to generate motion analysis information (step S79).

Next, the processing unit 2020 transmits the motion analysis information generated in step S79 to the display apparatus 3 (step S80). The motion analysis information transmitted to the display apparatus 3 is fed back in real time during the user's walking. In the present specification, the "real time" indicates that processing is started at a timing at which processing target information is acquired. Therefore, the "real time" also includes some time difference between acquisition of information and completion of processing of the information.

The processing unit 2020 repeatedly performs the processes in step S63 and the subsequent steps whenever the sampling cycle $\Delta t$ elapses (Y in step S81) from the acquisition of the previous sensing data until a command for finishing the measurement is received (N in step S81 and N in step S82). If the command for finishing the measurement has been received (Y in step S82), the processing unit analyzes motion performed by the user by using the acceleration, the angular velocity, the velocity, the position, and the attitude angle of the m frame which are obtained through the coordinate transformation in step S78 and are stored in a time series, or the analysis result in step S79, so as to generate motion analysis information (step S83). If the command for finishing the measurement has been received, in step S83, the processing unit 2020 may immediately perform the motion analysis process, and may perform the motion analysis process in a case where a motion analysis command has been received through a user's operation. The processing unit 2020 may transmit the motion analysis information generated in step S83 to the display apparatus 3, may transmit the motion analysis information to an apparatus such as a personal computer or a smart phone, and may record the motion analysis information in a memory card.

In FIG. 24, if a command for starting measurement has not been received (N in step S61), the processing unit 2020 does not perform the processes in steps S61 to S83, but may perform the process in step S83 by using the acceleration, the angular velocity, the velocity, the position, and the attitude angle of the m frame stored in the past, or the analysis result in step S79.

Figure 25:
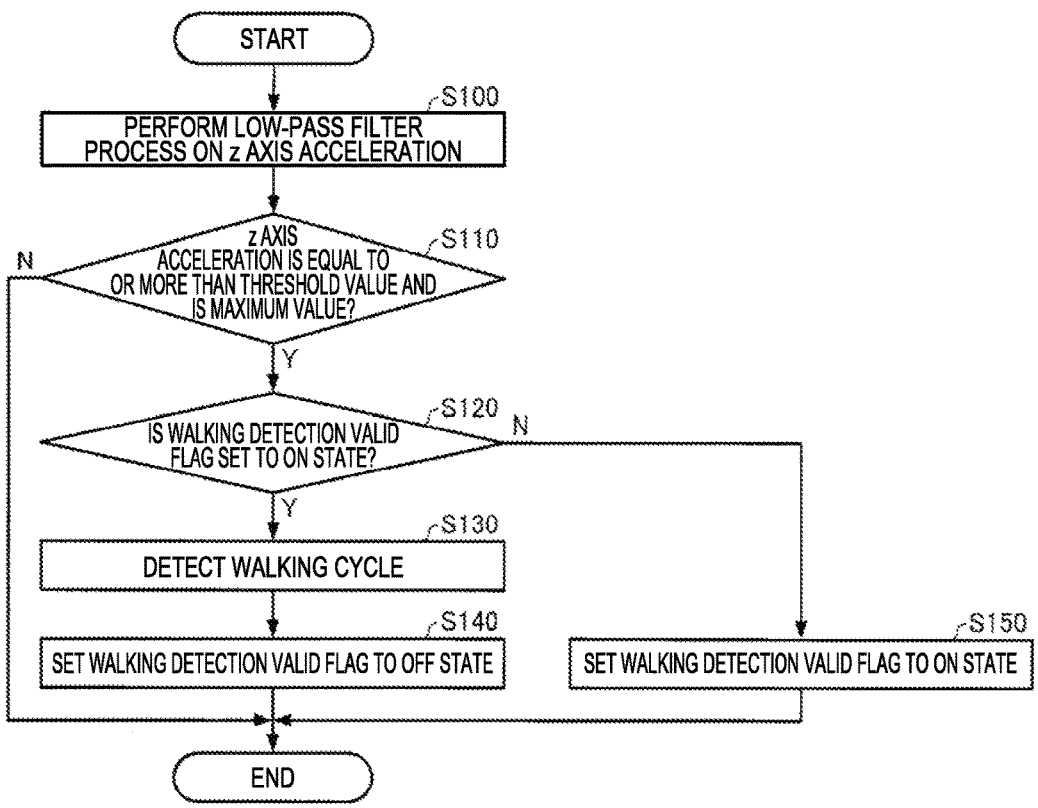
FIG. 25 is a flowchart illustrating examples of procedures of a walking detection process.

FIG. 25 is a flowchart illustrating examples of procedures of the walking detection process (the process in step S69 of FIG. 24). The processing unit 2020 (walking detection portion 240) performs the walking detection process according to the procedures of the flowchart illustrated in FIG. 25 by executing the walking detection program 301 stored in the storage unit 2030.

As illustrated in FIG. 25, the processing unit 2020 performs a low-pass filter process on a z axis acceleration included in the acceleration corrected in step S64 in FIG. 24 (step S100) so as to remove noise therefrom.

Next, in a case where the z axis acceleration having undergone the low-pass filter process in step S100 has a value which is equal to or greater than a threshold value and is the maximum value (Y in step S110), the processing unit 2020 detects a walking cycle at this timing (step S130) if a walking detection valid flag is set to an ON state (Y in step S120). The processing unit 2020 sets the walking detection valid flag to an OFF state (step S140), and finishes the walking detection process.

Next, in a case where the z axis acceleration has a value which is equal to or greater than the threshold value and is the maximum value (Y in step S110), if the walking detection valid flag is set to an OFF state (N in step S120), the processing unit 2020 does not detect a walking cycle, sets the walking detection valid flag to an ON state (step S150), and finishes the walking detection process. If the z axis acceleration has a value which is smaller than the threshold value or is not the maximum value (N in step S110), the processing unit 2020 does not perform the processes in step S120 and the subsequent steps, and finishes the walking detection process.

5. Effects

According to the present embodiment, two error estimation methods of performing duplicate correction are used in combination with each other without being duplicated while one thereof is exclusively selected, and thus it is possible to estimate errors of indexes indicating a state of the user with high accuracy.

According to the present embodiment, at a detection timing of a walking cycle, in a case where GPS data has been obtained most recently, error estimation can be performed in the first mode with relatively high reliability, and, even in a case where GPS data has not been obtained most recently, error estimation can be performed in the second mode.

According to the present embodiment, since two error estimation methods of performing non-duplicate correction are simultaneously applied in the first mode, double estimation is not performed, and it is possible to improve error estimation accuracy in the first mode.

According to the present embodiment, it is possible to correct information such as a velocity, a position, and an attitude angle of the user with high accuracy by using an error which is estimated with high accuracy. According to the present embodiment, it is possible to analyze the user's walking motion with high accuracy by using the information such as the velocity, the position, and the attitude angle of the user which are corrected with high accuracy.

MODIFICATION EXAMPLES

The invention is not limited to the present embodiment, and may be variously modified within the scope of the invention. Hereinafter, modification examples will be described. The same constituent elements as those in the embodiments are given the same reference numerals, and repeated description will be omitted.

(Sensor)

In the above-described embodiments, the acceleration sensor 12 and the angular velocity sensor 14 are integrally formed as the inertial measurement unit 10 and are built into the motion analysis apparatus 2, 1002 or 2002, but the acceleration sensor 12 and the angular velocity sensor 14 may not be integrally formed. Alternatively, the acceleration sensor 12 and the angular velocity sensor 14 may not be built into the motion analysis apparatus 2, 1002 or 2002, and may be directly mounted on the user. In any case, the two sensors may be mounted so that the axes of the sensors are parallel to each other. For example, a sensor coordinate system of one sensor may be set to the b frame of the embodiments, the other sensor coordinate system may be converted into the b frame, and the embodiments may be applied thereto.

In the above-described respective embodiments, a part of which the sensor (the motion analysis apparatus 2, 1002 or 2002 (the IMU 10)) is mounted on the user has been described to be the waist, but the sensor may be mounted on parts other than the waist. A preferable mounting part is the user's trunk (parts other than the limbs). However, a mounting part is not limited to the trunk, and may be mounted on, for example, the user's head or leg other than the arms.

(Walking Detection)

In the first embodiment, the walking detection portion 240 detects a walking cycle by using a combined acceleration of three-axis accelerations detected by the inertial measurement unit 10, but is not limited thereto, and may detect a walking cycle by using, for example, an acceleration obtained when the user moves vertically (a z axis (an axis in the gravitational direction) acceleration detected by the inertial measurement unit 10). In this case, the walking detection portion 240 may detect a walking cycle every other time at timings at which the z axis acceleration becomes the maximum value which is equal to or greater than a threshold value, and may detect a walking cycle every other time at timings at which the z axis acceleration crosses zero while changing from a positive value to a negative value (or a timing at which the z axis acceleration crosses zero while changing from a negative value to a positive value). Alternatively, the walking detection portion 240 may integrate a vertical movement acceleration (z axis acceleration) so as to calculate a vertical movement velocity (z axis velocity), and may detect a walking cycle by using the calculated vertical movement velocity (z axis velocity). In this case, the walking detection portion 240 may detect a walking cycle every other time, for example, at timings at which the velocity crosses a threshold value near the median between the maximum value and the minimum value by increasing or decreasing a value.

In the second embodiment, the walking detection portion 240 detects a walking cycle by using a combined acceleration of three-axis accelerations detected by the inertial measurement unit 10, but is not limited thereto, and may detect a walking cycle by using, for example, an acceleration obtained when the user moves vertically (a z axis (an axis in the gravitational direction) acceleration detected by the inertial measurement unit 10). In this case, the walking detection portion 240 may detect a walking cycle at a timing at which the z axis acceleration becomes the maximum value which is equal to or greater than a threshold value, and may detect a walking cycle at a timing at which the z axis acceleration crosses zero while changing from a positive value to a negative value (or a timing at which the z axis acceleration crosses zero while changing from a negative value to a positive value). Alternatively, the walking detection portion 240 may integrate a vertical movement acceleration (z axis acceleration) so as to calculate a vertical movement velocity (z axis velocity), and may detect a walking cycle by using the calculated vertical movement velocity (z axis velocity). In this case, the walking detection portion 240 may detect a walking cycle, for example, at a timing at which the velocity crosses a threshold value near the median between the maximum value and the minimum value by increasing or decreasing a value.

In the third embodiment, the walking detection portion 240 detects a walking cycle at a timing at which the vertical movement acceleration (z axis acceleration) of the user becomes the maximum value which is equal to or greater than a threshold value, but is not limited thereto, and may detect a walking cycle by using, for example, at a timing at which the vertical movement acceleration (z axis acceleration) crosses zero while changing from a positive value to a negative value (or a timing at which the vertical movement acceleration crosses zero while changing from a negative value to a positive value). Alternatively, the walking detection portion 240 may integrate a vertical movement acceleration (z axis acceleration) so as to calculate a vertical movement velocity (z axis velocity), and may detect a walking cycle by using the calculated vertical movement velocity (z axis velocity). In this case, the walking detection portion 240 may detect a walking cycle, for example, at a timing at which the velocity crosses a threshold value near the median between the maximum value and the minimum value by increasing or decreasing a value. For example, the walking detection portion 240 may calculate a combined acceleration of accelerations in the x axis, the y axis, and the z axis, and may detect a walking cycle by using the calculated combined acceleration. In this case, the walking detection portion 240 may detect a walking cycle, for example, at a timing at which the combined acceleration crosses a threshold value near the median between the maximum value and the minimum value by increasing or decreasing a value.

(Reference Azimuth Angle)

In the first and second embodiments, the azimuth angle transformation portion 270 calculates a reference azimuth angle by using a detection result (GPS data) in the GPS unit 50, but is not limited thereto, and may calculate a reference azimuth angle by using a signal from a positioning satellite of a global navigation satellite system (GNSS) other than the GPS, or a positioning satellite other than the GNSS. For example, one, or two or more satellite positioning systems such as a wide area augmentation system (WAAS), a quasi zenith satellite system (QZSS), a global navigation satellite system (GLONASS), GALILEO, a BeiDou navigation satellite system (BeiDou) may be used. An indoor messaging system (IMES) may also be used.

In the first embodiment and the second embodiment, the azimuth angle transformation portion 270 computes a reference azimuth angle in a case where GPS data is acquired (updated), but, in a case where GPS data is obtained, the azimuth angle transformation portion may calculate a reference azimuth angle only in a case where the positioning accuracy of the GPS data is equal to or more than a standard value (in a case where a DOP value is equal to or smaller than the standard value).

In the first embodiment and the second embodiment, the coordinate transformation matrix calculation portion 260 calculates the coordinate transformation matrix $C_m^b$ from the m frame into the b frame, and the azimuth angle transformation portion 270 calculates the reference azimuth angle gpsYaw($\psi_{nb}$) by using coordinate transformation matrix $C_m^b$, but the coordinate transformation matrix calculation portion 260 may calculate a coordinate transformation matrix $C_b^m$ (a transposed matrix of $C_m^b$) from the b frame into the m frame. In this case, for example, the error estimation portion 230 may convert the azimuth angle insYaw($\psi_{nb}$) of the b frame based on a detection result in the inertial measurement unit 10 into the azimuth angle insYaw ($\psi_{nm}$) of the m frame (the error estimation portion 230 functions as the azimuth angle transformation portion) by using the coordinate transformation matrix $C_b^m$, and may calculate a difference between insYaw($\psi_{nm}$) and gpsYaw ($\psi_{nm}$) as the observation vector Z by using an azimuth angle gpsYaw($\psi_{nm}$) of an advancing direction calculated by using GPS data as a reference azimuth angle.

(Mode Selection)

In the third embodiment, the mode selection portion 2260 selects the first mode in a case where GPS data has been updated, and selects the second mode in a case where the GPS data has not been updated, but, in a case where the GPS data has been updated, if positioning accuracy of the GPS data is equal to or more than a standard value (if a DOP value is equal to or smaller than the standard value), the first mode may be selected, and if the positioning accuracy is less than the standard value (if the DOP value is greater than the standard value), the second mode may be selected.

(Reference Value Calculation)

In the third embodiment, the reference value calculation portion 2250 calculates a reference value by using a signal from a GPS satellite, but may calculate a reference velocity by using a signal from a positioning satellite of a global navigation satellite system (GNSS) other than the GPS, or a positioning satellite other than the GNSS. Alternatively, the reference value calculation portion 2250 may calculate a reference value for an azimuth angle by using a detection signal from a geomagnetic sensor. For example, one, or two or more satellite positioning systems such as a wide area augmentation system (WAAS), a quasi zenith satellite system (QZSS), a global navigation satellite system (GLONASS), GALILEO, a BeiDou navigation satellite system (BeiDou) may be used. An indoor messaging system (IMES) may also be used.

(Selection of Coordinate Transformation Matrix)

In the second embodiment, the azimuth angle transformation portion 270 selects a coordinate transformation matrix $C_m^b$ in which a difference between a time point at which the coordinate transformation matrix $C_m^b$ is calculated and a time point at which the most recent walking cycle has been started is closest to a difference between a time point at which GPS data is obtained and a time point at which the most recent walking cycle has been started, but is not limited thereto. For example, the azimuth angle transformation portion 270 may store a time difference $\Delta T1$ between detection timings of the two most recent walking cycles every time, calculate a difference $\Delta T2$ between a time point at which GPS data is obtained and a time point at which the most recent walking cycle has been started, and may select a coordinate transformation matrix $C_m^b$ in which the relative time point 1341 is closest to $(\Delta T2/T1) \times \Delta T0$ when a length of a creation period of the coordinate transformation matrix table 1340 is indicated by $\Delta T0$.

(Error Estimation)

In the above-described embodiments, the error estimation portion 230 uses a velocity, an attitude angle, an acceleration, an angular velocity, and a position as indexes indicating a user's state, and estimates errors of the indexes by using the extended Karman filter, but may estimate the errors thereof by using some of the velocity, the attitude angle, the acceleration, the angular velocity, and the position as indexes indicating a user's state. Alternatively, the error estimation portion 230 may estimate the errors thereof by using parameters (for example, a movement distance) other than the velocity, the attitude angle, the acceleration, the angular velocity, and the position as indexes indicating a user's state.

In the third embodiment, the error estimation portion 230 exclusively selects two error estimation methods of performing duplicate correction in order to correct the state vector X by using a reference value for an azimuth angle and an azimuth angle error in the first mode and the second mode, but is not limited thereto, and may exclusively select two error estimation methods of performing duplicate error in order to correct the state vector X by using, for example, a reference value for a distance and a distance error. Specifically, a distance error is defined as a state variable of the state vector X, and, in the first mode, the error estimation portion 230 employs the reference value for a distance based on GPS data as a first reference value and the distance error as a first state variable, and corrects the state vector X by using the first reference value and the first state variable. In the second mode, the error estimation portion 230 employs a reference value for a distance (for example, a stride is estimated on the basis of acceleration, and a reference value for a distance is calculated by multiplying the stride by the number of steps) based on sensing data as a second reference value and a distance error as the first state variable, and corrects the state vector X by using the first reference value and the first state variable.

In the above-described embodiments, the extended Karman filter is used to estimate an error in the error estimation portion 230, but other estimation means such as a particle filter or an H∞ (H infinity) filter may be used.

In the first embodiment, the error estimation portion 230 performs an error estimation process at a timing at which the next walking cycle is detected in a case where GPS data has been acquired (updated), but, in a case where GPS data has been acquired, an error estimation process may be performed at a timing at which the next walking cycle is detected only in a case where positioning accuracy is equal to or more than a threshold value.

In the first embodiment, an error estimation process is performed by using the extended Karman filter with a difference between the azimuth angle insYaw($\psi_{nb}$) based on a detection result in the inertial measurement unit 10 and the azimuth angle gpsYaw($\psi_{nb}$) based on GPS data as the observation vector Z, but, for example, a difference between an azimuth angle based on a detection result in a geomagnetic sensor (an example of a first sensor) instead of insYaw ($\psi_{nb}$) and gpsYaw($\psi_{nb}$) may be used as the observation vector Z. In this case, the coordinate transformation matrix $C_m^b$ may be calculated by using the b frame as a coordinate system of three axes of the geomagnetic sensor. In the same manner as in the embodiments, an acceleration sensor may be used to calculate the coordinate transformation matrix $C_m^b$, and the acceleration sensor may be stopped after the coordinate transformation matrix $C_m^b$ is calculated. In the above-described manner, it is possible to reduce power which is wastefully consumed by the acceleration sensor.

In the second embodiment, the error estimation portion 230 performs an error estimation process at a timing at which GPS data is acquired (updated), but may perform the error estimation process only in a case where positioning accuracy is equal to or more than a threshold value at the timing at which the GPS data is obtained.

In the second embodiment, an error estimation process is performed by using the extended Karman filter with a difference between the azimuth angle insYaw($\psi_{nb}$) based on a detection result in the inertial measurement unit 10 and the azimuth angle gpsYaw($\psi_{nb}$) based on GPS data as the observation vector Z, but, for example, a difference between an azimuth angle based on a detection result in a geomagnetic sensor (an example of a first sensor) instead of insYaw ($\psi_{nb}$) and gpsYaw($\psi_{nb}$) may be used as the observation vector Z. In this case, the coordinate transformation matrix $C_m^b$ may be calculated by using the b frame as a coordinate system of three axes of the geomagnetic sensor. In the same manner as in the embodiments, an acceleration sensor may be used to calculate the coordinate transformation matrix $C_m^b$, and the acceleration sensor may be stopped after the coordinate transformation matrix table 1340 is created. In the above-described manner, it is possible to reduce power which is wastefully consumed by the acceleration sensor.

(Others)

In the above-described embodiments, the integral processing portion 220 calculates a velocity, a position, and an attitude angle of the e frame, and the coordinate transformation portion 280 coordinate-converts the velocity, the position, and the attitude angle of the e frame into a velocity, a position, and an attitude angle of the m frame, but the integral processing portion 220 may calculates a velocity, a position, and an attitude angle of the m frame. In this case, the motion analysis portion 290 may perform a motion analysis process by using the velocity, the position, and the attitude angle of the m frame calculated by the integral processing portion 220, and thus coordinate transformation of a velocity, a position, and an attitude angle in the coordinate transformation portion 280 is not necessary. The error estimation portion 230 may perform error estimation based on the extended Karman filter by using the velocity, the position, and the attitude angle of the m frame.

In the above-described embodiments, the processing unit 20, 1020 or 2020 generates motion analysis information such as image data, sound data, and text data, but is not limited thereto, and, for example, the processing unit 20, 1020 or 2020 may transmit a calculation result of propulsion efficiency or an amount of energy consumption, and the processing unit 120 of the display apparatus 3 receiving the calculation result may create image data, sound data, and text data (advice or the like) corresponding to the calculation result.

In the above-described embodiments, the processing unit 20, 1020 or 2020 performs a process (step S25 in FIG. 10, step S52 in FIG. 16, and step S83 in FIG. 24) of analyzing motion performed by the user so as to generate motion analysis information after a command for stopping measurement is received, but the processing unit 20, 1020 or 2020 may not perform this motion analysis process (post-process). For example, the processing unit 20, 1020 or 2020 may transmit various information stored in the storage unit 30, 1030 or 2030 to an apparatus such as a personal computer, a smart phone, or a network server, and such an apparatus may perform the motion analysis process (post-process).

In the above-described embodiments, the display apparatus 3 outputs motion analysis information from the display unit 170 and the sound output unit 180, but is not limited thereto. For example, a vibration mechanism may be provided in the display apparatus 3, and various information may be output by causing the vibration mechanism to vibrate in various patterns.

In the above-described embodiments, the GPS unit 50 is provided in the motion analysis apparatuses 2, 1002 and 2002 but may be provided in the display apparatus 3. In this case, the processing unit 120 of the display apparatus 3 may receive GPS data from the GPS unit 50 and may transmit the GPS data to the motion analysis apparatuses 2, 1002 and 2002 via the communication unit 140, and the processing units 20, 1020 and 2020 of the motion analysis apparatuses 2, 1002 and 2002 may receive the GPS data via the communication unit 40 and may add the received GPS data to the GPS data table 320.

In the above-described embodiments, the motion analysis apparatus 2, 1002 or 2002 and the display apparatus 3 are separately provided, but a motion analysis apparatus in which the motion analysis apparatus 2, 1002 or 2002 and the display apparatus 3 are integrally provided may be used.

In the above-described embodiments, the motion analysis apparatus 2, 1002 or 2002 is mounted on the user but is not limited thereto. For example, an inertial measurement unit (inertial sensor) or a GPS unit may be mounted on the user's body or the like, the inertial measurement unit (inertial sensor) or the GPS unit may transmit a detection result to a portable information apparatus such as a smart phone, or an installation type information apparatus such as a personal computer, and such an apparatus may analyze motion of the user by using the received detection result. Alternatively, an inertial measurement unit (inertial sensor) or a GPS unit which is mounted on the user's body or the like may record a detection result on a recording medium such as a memory card, and an information apparatus such as a smart phone or a personal computer may read the detection result from the recording medium and may perform a motion analysis process.

In the above-described embodiments, motion in human walking is an object of analysis, but the present invention is not limited thereto, and is also applicable to walking of a moving object such as an animal or a walking robot. The present invention is not limited to walking, and is applicable to various motions such as climbing, trail running, skiing (including cross-country and ski jumping), snowboarding, swimming, bicycling, skating, golf, tennis, baseball, and rehabilitation.

The above-described respective embodiments and modification examples are only examples, and are not intended to improperly limit the content of the present invention. In addition, all the above-described constituent elements are not essential constituent elements of the present invention. For example, the respective embodiments and modification examples may be combined with each other as appropriate.

The present invention includes the substantially same configuration (for example, a configuration having the same function, method, and result, or a configuration having the same object and effect) as the configuration described in the embodiments. The present invention includes a configuration in which a non-essential part of the configuration described in the embodiments is replaced. The present invention includes a configuration which achieves the same operation and effect or a configuration which can achieve the same object as the configuration described in the embodiments. The present invention includes a configuration in which a well-known technique is added to the configuration described in the embodiments.

REFERENCE SIGNS LIST 1, 1001, AND 2001 MOTION ANALYSIS SYSTEM
2, 1002, AND 2002 MOTION ANALYSIS APPARATUS
3 DISPLAY APPARATUS
10 INERTIAL MEASUREMENT UNIT (IMU)
12 ACCELERATION SENSOR
14 ANGULAR VELOCITY SENSOR
16 SIGNAL PROCESSING PORTION
20, 1020, AND 2020 PROCESSING UNIT
30, 1030, AND 2030 STORAGE UNIT
40 COMMUNICATION UNIT
50 GPS UNIT
120 PROCESSING UNIT
130 STORAGE UNIT
140 COMMUNICATION UNIT
150 OPERATION UNIT
160 CLOCKING UNIT
170 DISPLAY UNIT
180 SOUND OUTPUT UNIT
210 BIAS REMOVING PORTION
220 INTEGRAL PROCESSING PORTION
230 ERROR ESTIMATION PORTION
240 WALKING DETECTION PORTION
250 STRAIGHT-ADVANCING DETERMINATION PORTION
260 COORDINATE TRANSFORMATION MATRIX CALCULATION PORTION
270 AZIMUTH ANGLE TRANSFORMATION PORTION
280 COORDINATE TRANSFORMATION PORTION
290 MOTION ANALYSIS PORTION

The invention claimed is:

1. An error estimation method comprising:
calculating a coordinate transformation matrix between a first coordinate system with a first sensor mounted on a moving object as a reference and a second coordinate system with a second sensor mounted on the moving object as a reference, at a predetermined timing in a cycle of motion causing movement of the moving object;
converting one of an azimuth angle of the moving object based on a detection result in the first sensor and an azimuth angle of the moving object based on a detection result in the second sensor by using the coordinate transformation matrix in a case where the detection result in the second sensor receiving a signal from a positioning satellite is obtained; and
estimating errors of indexes indicating a state of the moving object by using a difference between the converted azimuth angle and the other azimuth angle at the predetermined timing after a timing at which the detection result in the second sensor is obtained.

2. The error estimation method according to claim 1, wherein a velocity of the moving object in the first coordinate system is calculated by using the detection result in the first sensor, and the coordinate transformation matrix is calculated on the basis of the calculated velocity.

3. The error estimation method according to claim 1, wherein the predetermined timing is a timing at which the detection result in the first sensor satisfies a predetermined condition.

4. The error estimation method according to claim 1, further comprising:
detecting the cycle by using the detection result in the first sensor,
wherein the predetermined timing is a timing at which the cycle is detected.

5. The error estimation method according to claim 1, wherein the coordinate transformation matrix is calculated by using the detection result in the first sensor in a predetermined time period after the moving object starts movement.

6. The error estimation method according to claim 1, further comprising:
determining whether or not the moving object is advancing straight,
wherein, in a case where it is determined that the moving object is not advancing straight between the timing at which the detection result in the second sensor is obtained and the next predetermined timing, the error is not estimated at the next predetermined timing.

7. An error estimation method comprising:
calculating a plurality of coordinate transformation matrices between a first coordinate system with a first sensor mounted on a moving object as a reference and a second coordinate system with a second sensor mounted on the moving object as a reference, at a plurality of timings in periodical motion causing movement of the moving object;
selecting the coordinate transformation matrix corresponding to a timing at which a detection result in the second sensor is obtained from among the plurality of coordinate transformation matrices in a case where a detection result in the second sensor receiving a signal from a positioning satellite is obtained, and converting one of an azimuth angle of the moving object based on a detection result in the first sensor and an azimuth angle of the moving object based on the detection result in the second sensor by using the selected coordinate transformation matrix; and estimating errors of indexes indicating a state of the moving object by using a difference between the converted azimuth angle and the other azimuth angle.

8. The error estimation method according to claim 7, wherein, at each of the plurality of timings, a velocity of the moving object in the first coordinate system is calculated by using the detection result in the first sensor, and the plurality of coordinate transformation matrices are calculated by calculating a coordinate transformation matrix on the basis of the calculated velocity.

9. The error estimation method according to claim 7, further comprising:
    detecting the cycle of the motion by using the detection result in the first sensor,
    wherein the coordinate transformation matrix is selected on the basis of a timing at which the detection result in the second sensor is obtained, and a timing which is closest to the timing at which the detection result in the second sensor is obtained and at which the cycle is detected.

10. The error estimation method according to claim 7, wherein the plurality of coordinate transformation matrices are calculated by using the detection result in the first sensor in a predetermined time period after the moving object starts movement.

11. The error estimation method according to claim 1, wherein the first sensor includes at least one of an acceleration sensor and an angular velocity sensor.

12. The error estimation method according to claim 1, wherein the first sensor is a geomagnetic sensor.

13. A motion analysis method comprising:
    estimating the errors by using the error estimation method according to claim 1;
    correcting the indexes by using the estimated errors; and
    analyzing motion of the moving object by using the corrected indexes.

14. An error estimation method using a first sensor and a second sensor, the method comprising:
    selecting one of a first mode and a second mode on the basis of a detection result in the second sensor; and
    estimating errors of indexes indicating a state of a moving object,
    wherein the estimating of the errors includes
        predicting the errors;
        correcting the predicted errors by using a first reference value based on the detection result in the second sensor and a first error among the errors without using a second reference value based on a detection result in the first sensor in a case where the first mode is selected; and
        correcting the predicted errors by using the second reference value and the first error without using the first reference value in a case where the second mode is selected.

15. The error estimation method according to claim 14, wherein the first sensor includes at least one of an acceleration sensor and an angular velocity sensor.

16. The error estimation method according to claim 14, wherein the second sensor is a sensor receiving a signal from a positioning satellite, or a geomagnetic sensor.

17. The error estimation method according to claim 14, wherein, in a case where the detection result in the second sensor is obtained, the first mode is selected, and, in a case where the detection result in the second sensor is not obtained, the second mode is selected.

18. The error estimation method according to claim 14, wherein, in a case where accuracy of the detection result in the second sensor is equal to or more than a standard value, the first mode is selected, and, in a case where the accuracy of the detection result in the second sensor is less than the standard value, the second mode is selected.

19. The error estimation method according to claim 14, further comprising:
    correcting the predicted errors by using a third reference value based on the detection result in the first sensor, and a second error which is different from the first error among the errors, in a case where the first mode is selected.

20. A motion analysis method comprising:
    estimating the errors by using the error estimation method according to claim 1;
    correcting the indexes by using the estimated errors; and
    analyzing motion of the moving object by using the corrected indexes.

* * * * *